(12) United States Patent
Chien

(10) Patent No.: US 7,248,625 B2
(45) Date of Patent: Jul. 24, 2007

(54) COMPENSATION OF I-Q IMBALANCE IN DIGITAL TRANSCEIVERS

(75) Inventor: Charles Chien, Newbury Park, CA (US)

(73) Assignee: Silicon Storage Technology, Inc., Sunnyvale, CA (US)

( * ) Notice: Subject to any disclaimer, the term of this patent is extended or adjusted under 35 U.S.C. 154(b) by 822 days.

(21) Appl. No.: 10/235,389

(22) Filed: Sep. 5, 2002

(65) Prior Publication Data

US 2004/0203472 A1    Oct. 14, 2004

(51) Int. Cl.
  *H04B 1/38*    (2006.01)
  *H04B 1/00*    (2006.01)
  *H04B 17/00*   (2006.01)

(52) U.S. Cl. .................. 375/219; 455/68; 455/232.1

(58) Field of Classification Search ............... 375/219, 375/346, 327, 376, 324; 455/78, 83, 68, 455/232.1
  See application file for complete search history.

(56) References Cited

U.S. PATENT DOCUMENTS

| | | | | |
|---|---|---|---|---|
| 4,003,054 | A * | 1/1977 | Goldstone | 342/174 |
| 4,885,799 | A * | 12/1989 | Van Horn | 455/78 |
| 5,263,196 | A | 11/1993 | Jasper | |
| 5,617,240 | A * | 4/1997 | Hergault et al. | 398/209 |
| 5,705,949 | A | 1/1998 | Alelyunas et al. | |
| 5,774,792 | A * | 6/1998 | Tanaka et al. | 455/78 |
| 5,930,286 | A | 7/1999 | Walley | |
| 5,991,603 | A * | 11/1999 | Aoki et al. | 455/73 |
| 6,009,317 | A | 12/1999 | Wynn | |
| 6,212,397 | B1 * | 4/2001 | Langston et al. | 455/500 |
| 6,330,290 | B1 * | 12/2001 | Glas | 375/324 |
| 6,351,628 | B1 * | 2/2002 | Leizerovich et al. | 455/83 |
| 6,366,622 | B1 * | 4/2002 | Brown et al. | 375/322 |
| 6,400,233 | B1 * | 6/2002 | Thomas | 332/103 |
| 6,452,983 | B1 * | 9/2002 | Asahara et al. | 375/324 |
| 6,490,326 | B1 * | 12/2002 | Bastani et al. | 375/317 |
| 6,606,483 | B1 * | 8/2003 | Baker et al. | 455/126 |
| 6,625,111 | B1 * | 9/2003 | Sudo | 370/203 |
| 6,654,595 | B1 * | 11/2003 | Dexter | 455/323 |
| 6,683,926 | B2 * | 1/2004 | Zarubinsky et al. | 375/345 |
| 6,717,981 | B1 * | 4/2004 | Mohindra | 375/219 |
| 6,819,938 | B2 * | 11/2004 | Sahota | 455/522 |
| 6,940,916 | B1 * | 9/2005 | Warner et al. | 375/261 |
| 6,968,167 | B1 * | 11/2005 | Wu et al. | 455/251.1 |
| 6,987,956 | B2 * | 1/2006 | Yoon | 455/133 |
| 2001/0049264 | A1 * | 12/2001 | Balech | 455/69 |

(Continued)

*Primary Examiner*—Emmanuel Bayard
*Assistant Examiner*—Lawrence Williams
(74) *Attorney, Agent, or Firm*—DLA Piper US LLP

(57) ABSTRACT

A transceiver includes a switching unit configurable for isolating an input of a receiver from an output of a transmitter during a local calibration mode. A known signal present at the output at a first power level during the calibration mode will also be present at the input at a second power level lower than the first power level and will be converted by the quadrature demodulator. A compensation factor is estimated for compensating the receiver section for imbalances in the in-phase and quadrature phase signals resulting from conversion of the known signal. Remote calibration is implemented using a method for remotely compensating for I-Q imbalance wherein a data packet having a known signal is transmitted to a receiver for conversion by a quadrature demodulator and compensation factors are estimated for compensating for imbalances in the in-phase and quadrature phase signals resulting from conversion of the known signal.

105 Claims, 45 Drawing Sheets

U.S. PATENT DOCUMENTS

| | | | |
|---|---|---|---|
| 2003/0007574 A1* | 1/2003 | Li et al. | 375/316 |
| 2003/0031273 A1* | 2/2003 | Mohindra | 375/324 |
| 2003/0067359 A1* | 4/2003 | Darabi et al. | 331/46 |
| 2003/0109241 A1* | 6/2003 | Kim | 455/324 |
| 2003/0174641 A1* | 9/2003 | Rahman | 370/206 |
| 2003/0186665 A1* | 10/2003 | Black et al. | 455/240.1 |
| 2003/0206603 A1* | 11/2003 | Husted | 375/324 |
| 2004/0018819 A1* | 1/2004 | Coan | 455/83 |
| 2004/0038649 A1* | 2/2004 | Lin et al. | 455/130 |

* cited by examiner

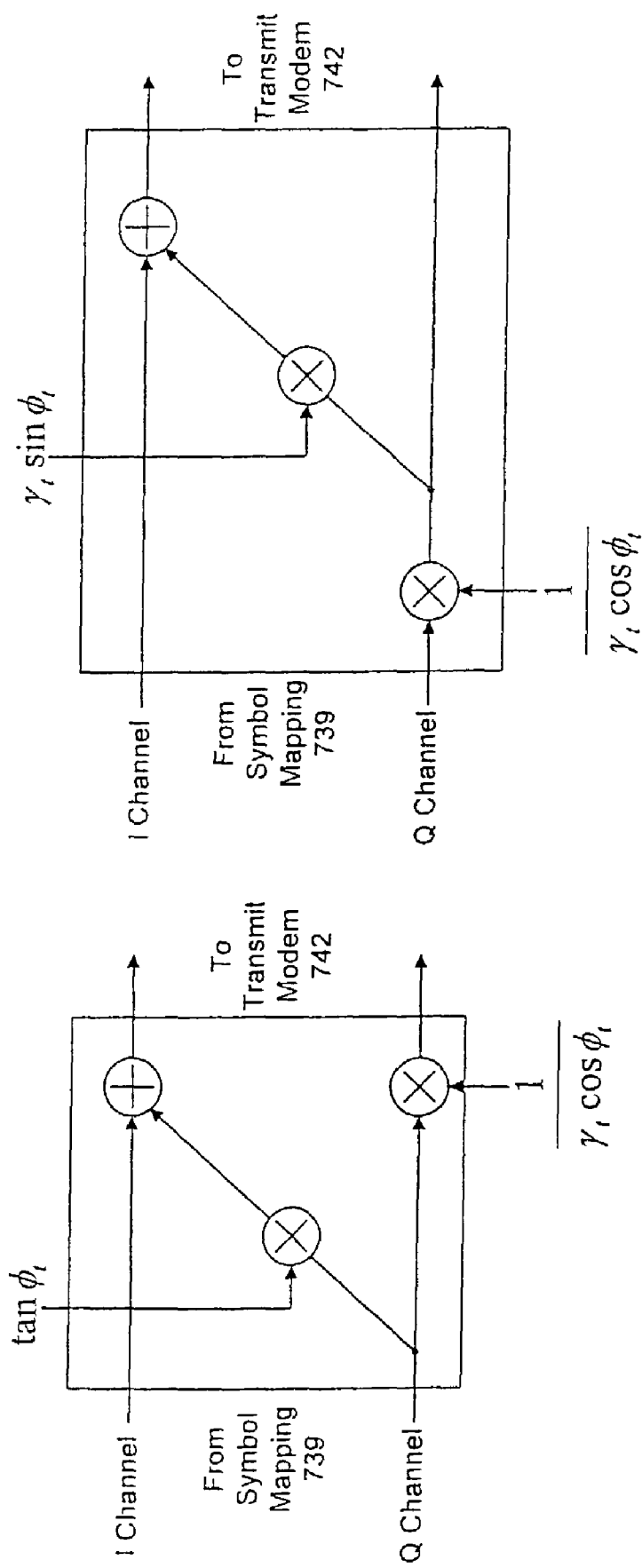

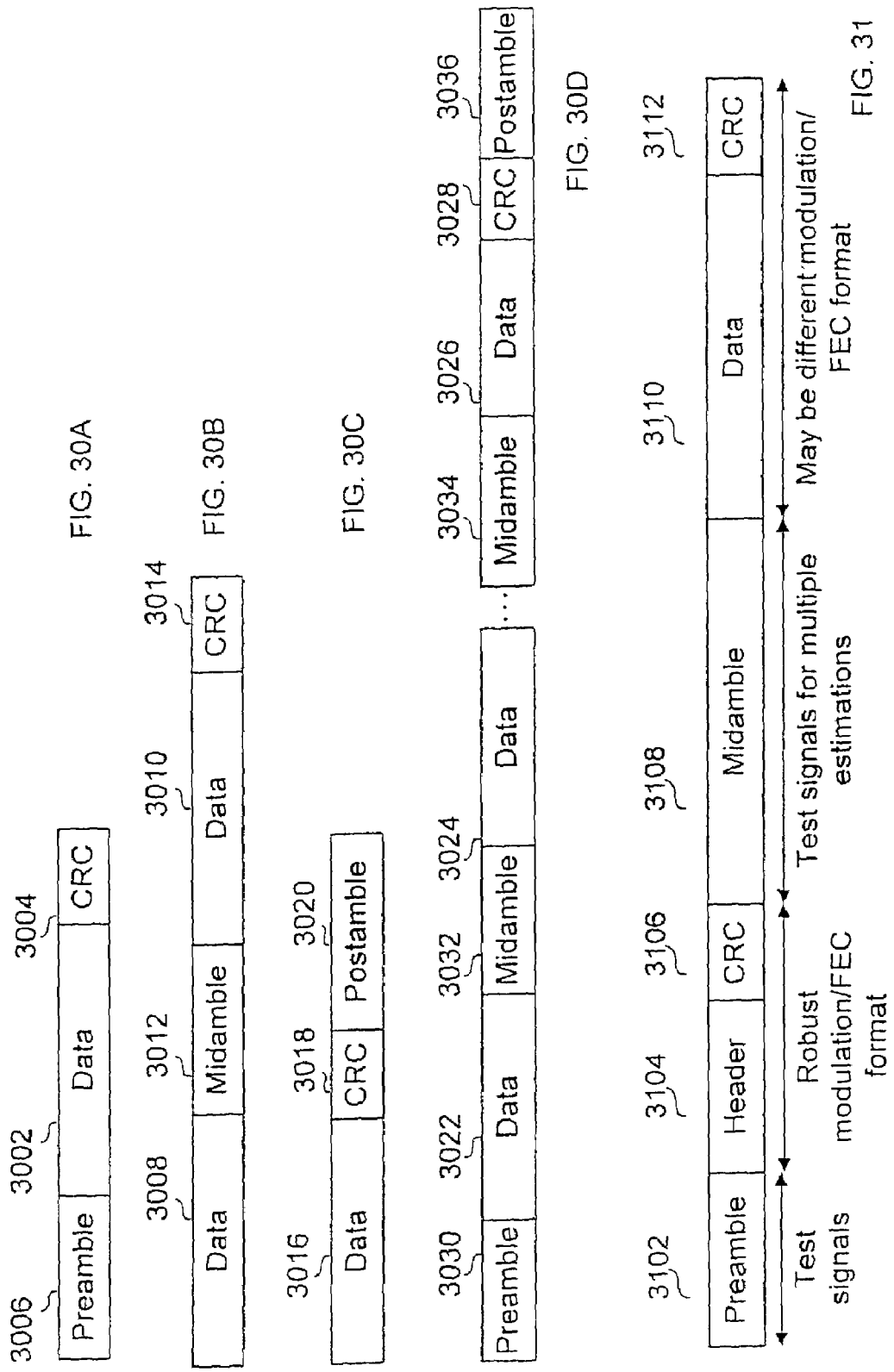

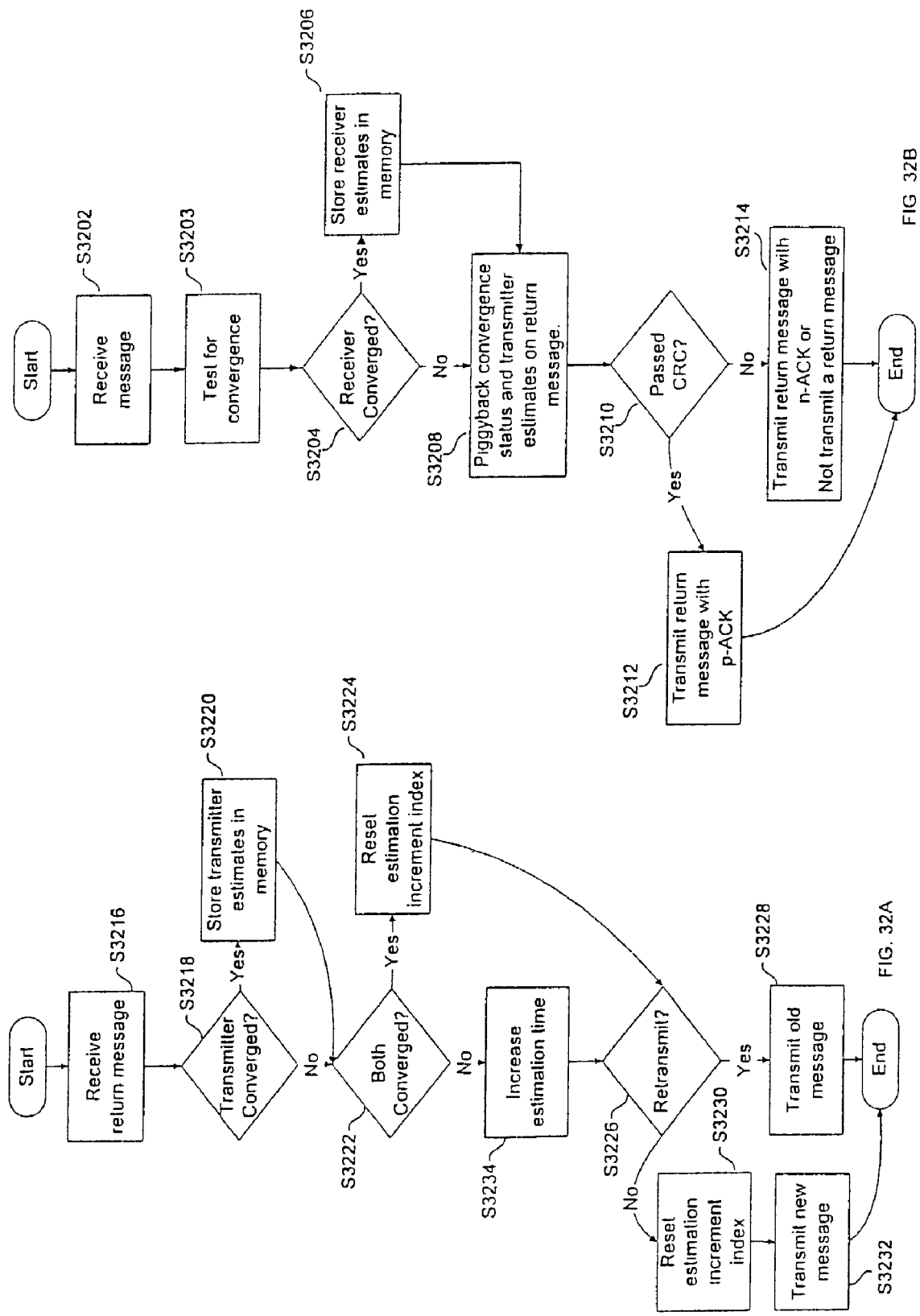

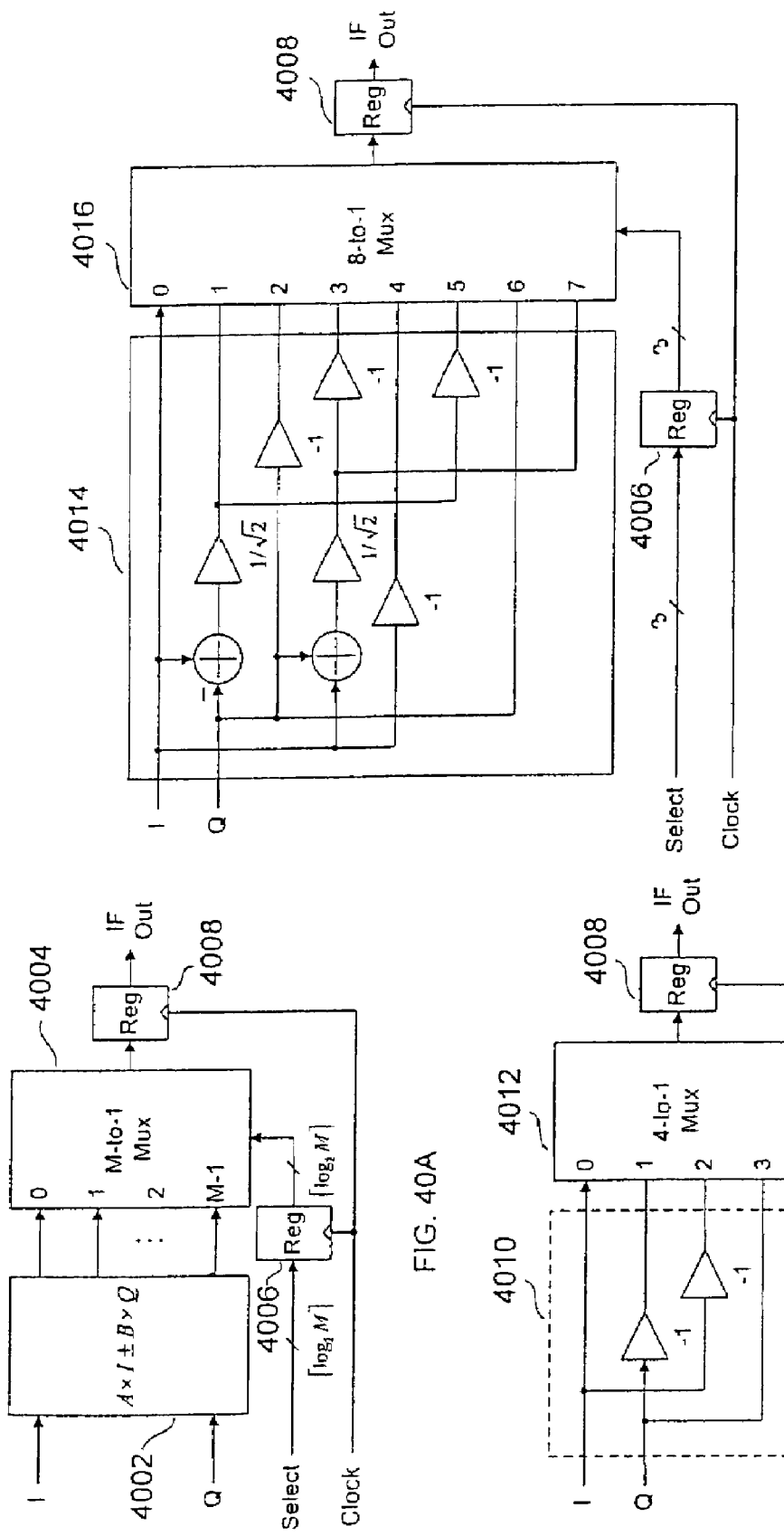

COMPENSATION OF I-Q IMBALANCE IN DIGITAL TRANSCEIVERS

BACKGROUND OF THE INVENTION

1. Field of the Invention

Embodiments of the present invention relate to digital transceivers for use in communication systems, and in preferred embodiments, to systems and methods for providing compensation for I-Q imbalance in digital transceivers.

2. Description of Related Art

In communication systems, quadrature up and down-conversion are needed to perform frequency translations. In general, the transmitter uses a quadrature up converter to convert a signal to a higher frequency while the receiver uses a quadrature down converter to convert a signal to a lower frequency. An example of a quadrature converter 102 is shown in FIG. 1. Quadrature converter 102 includes two mixers 104, 106 and an oscillator 108. The paths that are associated with the x and y inputs to mixers 104 and 106, respectively, are referred to as the I-channel and Q-channel. The oscillator 108 provides a $\cos\omega_0 t$ signal input to mixer 104 and a $k\sin\omega_0 t$ signal input to mixer 106, where k is an arbitrary constant. The output of the quadrature converter 102 may be viewed as a complex signal $x\cos\omega_0 t + jky\sin\omega_0 t$.

The quadrature converter may be used in multiple configurations. One common configuration is shown in FIG. 2, which shows quadrature down-converter 202. Quadrature down-converter 202 includes two mixers 204, 206 and an oscillator 208. For the configuration of the quadrature down-converter shown in FIG. 2, the inputs to mixers 204, 206 are $x=y=r(t)\cos(\omega_i t)$, where $\omega_i$ is the input carrier frequency. The oscillator 208 provides a $\cos w_0 t$ signal input to mixer 204 and a $k\sin w_0 t$ signal input to mixer 206, where k=−1. The output of quadrature down-converter 202 then becomes $r(t)\cos(\omega_i t)e^{-j\omega_0 t}$.

In the configuration shown in FIG. 2, the quadrature down-converter 202 may be viewed as a single sideband mixer because the quadrature oscillator behaves like a complex sinusoid $e^{-j\omega_0 t}$ that has spectral content only at $-\omega_0$. A real sinusoid would have spectral content at $\omega_0$ as well as at $-\omega_0$. The positive frequency component causes images to be folded in-band at the mixer output. In-band signal refers to the lower portion of the frequency content around DC (i.e. where the frequency equals zero Hz).

An image is defined as the spectral components located at $2\omega_0 - \omega_i$ and $-2\omega_0 + \omega_i$ as shown in FIG. 3A, where the results of double sideband mixing are illustrated. In FIG. 3A, a real sinusoid $\cos\omega_0 t$ is used instead of $e^{-j\omega_0 t}$. FIG. 3A shows desired signals and images before mixing (top of FIG. 3A) and after mixing (bottom of FIG. 3A). It can be seen in FIG. 3A that, after mixing, the images are folded in-band at the mixer output.

FIG. 3B illustrates single sideband mixing and similarly shows desired signals and images before mixing (top of FIG. 3B) and after mixing (bottom of FIG. 3B). As can be seen in FIG. 3B, a single sideband mixer has the advantage that it reduces half of the spectral products and therefore eliminates the effect of image folding in-band. Folding of image in-band is a problem especially if the value of $\omega_i - \omega_0$ is small. Such a situation arises in a low-IF super-heterodyne receiver. In a direct-conversion receiver, where $\omega_i = \omega_0$, an image does not exist. Thus, the single sideband mixer may function as a quadrature down converter in low-IF or direct-conversion receivers.

Yet another configuration of a quadrature converter is shown in FIG. 4. FIG. 4 shows quadrature up-converter 402. Quadrature up-converter 402 includes two mixers 404, 406, an oscillator 408 and an adder 410. For the configuration of the quadrature up-converter shown in FIG. 4, x is set to I and y is set to Q and the Q-channel output is either added to or subtracted from the I-channel output. In the case of quadrature up-converter 402, the output is real and has the form $I\cos\omega_{tx}t \pm Q\sin\omega_{tx}t$. Quadrature up-converter 402 functions as a quadrature modulator that modulates the baseband I and Q signals to a carrier frequency of $\omega_{tx}$. Such a quadrature modulator is frequently used to generate digital modulations, such as phase shift keying (PSK), quadrature amplitude modulation (QAM), frequency shift keying (FSK), orthogonal frequency division multiplexing (OFDM), and spread spectrum.

Many other configurations of quadrature converters exist. For instance, as shown in FIG. 5, two quadrature converters may be cross-coupled to form a converter 502. Converter 502 includes four mixers 504, 506, 508 and 510, an oscillator 512 and two adders 514, 516. Both the input and the output of converter 502 are complex signals. Thus, with the converter 502, true single sideband processing may be performed because the negative image of both the input as well as the output may be eliminated.

In practice, it is not possible to generate a perfect complex sinusoid using analog circuits due to process variation and asymmetry in layouts. In general, the I and Q channels will have different amplitudes and phases whereby the output of the quadrature converter will have $xa\cos(\omega_0 t + \alpha) + jykb\sin(\omega_0 t + \beta)$, where a is the gain of the I-channel, b is the gain of the Q-channel, $\alpha$ is the phase of the I-channel, and $\beta$ is the phase of the Q-channel. In the case of a single sideband mixer configuration as shown in FIG. 2, the output may be represented by $$\frac{(ae^{-j\alpha} + be^{-j\beta})u(t)}{2}e^{-j\omega_0 t} + \frac{(ae^{j\alpha} - be^{j\beta})u(t)}{2}e^{+j\omega_0 t} \quad \text{Equation (1)}$$

where u(t) is the input to the mixer. It is apparent that an unwanted signal $$\frac{(ae^{j\alpha} - be^{j\beta})u(t)}{2}e^{+j\omega_0 t}$$

has been generated. In a super-heterodyne receiver, this unwanted signal corresponds to signal contents at $-\omega_i$ and $-2\omega_0 + \omega_i$ as shown in FIG. 3B. In a direct-conversion receiver, this unwanted signal corresponds to the negative sidebands of the received baseband signal r(t). In both cases, the desired signal has been distorted. The amount of desired signal relative to the distortion is referred to as the image-reject ratio and may be expressed by $$20\log_{10}\left(\frac{1 + \gamma^2 + 2\gamma\cos(\phi)}{1 + \gamma^2 - 2\gamma\cos(\phi)}\right) \quad \text{Equation (2)}$$

where $\gamma = b/a$ is the amplitude mismatch and $\phi = \beta - \alpha$ is the phase mismatch. These two parameters constitute the I-Q imbalance in the receiver.

At the transmitter, a quadrature modulator is typically used. With imbalanced phase and amplitude, the output of the modulator, assuming subtraction at the output, will have aI cos($\omega_{tx}t+\alpha$)−bQ sin($\omega_{tx}t+\beta$), which may be represented by $$\frac{(aIe^{j\alpha} + jbQe^{j\beta})}{2}e^{j\omega_{tx}t} + \frac{(aIe^{-j\alpha} - jbQe^{-j\beta})}{2}e^{-j\omega_{tx}t}. \quad \text{Equation (3)}$$

The distortion due to the imbalance is clear in Equation 3 because the ideal transmitted baseband signal is I+jQ while the actual baseband signal has become aI$e^{j\alpha}$+jbQ$e^{j\beta}$. Similarly, the parameters $\gamma$=b/a and $\phi$=$\beta$−$\alpha$ constitute the I-Q imbalance in the transmitter.

To distinguish between the imbalance parameters at the receiver and transmitter, parameters associated with the receiver will have a subscript r and those associated with the transmitter will have a subscript t. For instance, $\gamma_r$=$b_r$/$a_r$ and $\phi_r$=$\beta_r$−$\alpha_r$ denote the gain and phase mismatches at the receiver whereas $\gamma_t$=$b_t$/$a_t$ and $\phi_t$=$\beta_t$−$\alpha_t$ denote the gain and phase mismatches at the transmitter. Ignoring the higher order frequency terms, the following general model may be derived for the signal at the receiver output given both transmitter and receiver imbalance $$\frac{G_c a_r a_t e^{j(\alpha_t - \alpha_r)}(1 + \gamma_r e^{-j\phi_r})(1 + j\gamma_t Q e^{j\phi_t})}{4} e^{j(\omega_{IF}t + \Delta\omega t + \Delta\theta)} + \quad \text{Equation (4)}$$

$$\frac{G_c a_r a_t e^{-j(\alpha_t - \alpha_r)}(1 - \gamma_r e^{j\phi_r})(I - j\gamma_t Q e^{-j\phi_t})}{4} e^{-j(\omega_{IF}t + \Delta\omega t + \Delta\theta)}$$

where $G_c$ is the gain of the transmission channel, $\omega_{IF}$=$\omega_{tx}$−$\omega_0$ is the IF frequency, $\Delta\omega$ is the frequency offset, and $\Delta\theta$ is the phase offset. This model is used extensively to determine the appropriate compensation factors in the receiver and transmitter to reduce the distortions due to I-Q imbalance.

I-Q imbalances introduce distortions in the transmitter and receiver. Imbalances are the result of asymmetry in circuit layouts and non-uniformity in IC fabrication processes (such as threshold mismatch and device mismatches). Typical RF transceivers operating at a few GHz may achieve 2 degrees and 2% of phase and amplitude mismatches even with careful layouts. While the mismatches seem small, they introduce additional distortions in RF systems so that bit-error rate is increased. Also, the mismatches worsen for higher carrier frequencies, for example millimeter wave. I-Q imbalance is especially detrimental to high-performance RF systems that use high-order modulations. Such high-performance RF systems include wireless local area networks such as IEEE 802.11a, broadband personal area networks such as IEEE 802.15.3, fixed wireless access such as Local Multi-point Distribution System (LMDS) and IEEE 802.16, and 2.5G/3G cellular systems.

SUMMARY OF THE DISCLOSURE

Therefore, embodiments of the present invention provide systems and methods for providing compensation for I-Q imbalance in digital transceivers. According to embodiments of the present invention, a system is provided comprising a radio transceiver having an antenna, a receiver section having a quadrature demodulator for receiving various signals and converting the various signals into in-phase and quadrature phase signals and a transmitter section for transmitting a known signal to an input of the quadrature demodulator for conversion by the quadrature demodulator.

The system is further provided with a switching unit configurable for isolating an input port of a receiver section from an output port of a transmitter section during a local calibration mode. When the known signal is present at the output port at a first power level, it will also be present at the input port at a second power level lower than the first power level and will be converted by the quadrature demodulator. In one embodiment, the amount of isolation provided is approximately 20-40 dB.

The system further comprises at least one receiver compensation factor estimation unit coupled to an output of the quadrature demodulator for estimating, after conversion of the known signal into in-phase and quadrature phase signals, at least one receiver compensation factor for compensating the receiver section for an imbalance in subsequently received in-phase and quadrature phase signals. Embodiments of the present invention my further comprise at least one transmitter compensation factor estimation unit for estimating at least one transmitter compensation factor for compensating the transmitter section for an imbalance in-phase and quadrature phase signals.

According to other embodiments of the present invention, a method for remotely compensating for I-Q imbalance in in-phase and quadrature phase signals is provided wherein a data packet having at least one of a preamble portion, a midamble portion and a postamble portion including a known signal is transmitted from a transmitter to a receiver for conversion by a quadrature demodulator in the receiver. After conversion by the quadrature demodulator of the known signal into in-phase and quadrature phase signals, a compensation factor for compensating for an imbalance in the in-phase and quadrature phase signals resulting from conversion of the known signal by the quadrature demodulator is estimated. The compensation factor may then be used to compensate for imbalances in subsequent in-phase and quadrature phase signals in both local and remote radio units.

Embodiments of the present invention may be employed with various transceiver architectures, including, but not limited to, direct conversion, high IF and low IF super-heterodyne, and wideband IF (also known as indirect zero-IF) architectures. Moreover, embodiments of the invention may be easily employed in various communication modes, such as, but not limited to, time-division duplex (TDD) systems and frequency-division duplexed (FDD) systems.

Embodiments of the present invention provide a complete solution to compensate for both receiver as well as transmitter imbalance and enables calibration in local radio units as well as real-time compensation over-the-air during normal operation, or a combination of both.

These and other features and advantages of embodiments of the invention will be apparent to those skilled in the art from the following detailed description of embodiments of the invention, when read with the drawings and appended claims.

BRIEF DESCRIPTION OF THE DRAWINGS

The present invention is illustrated by way of example, and not by way of limitation, in the figures of the accompanying drawings and in which:

FIGS. 17A and 17B illustrate exemplary implementations of a transmitter I-Q compensation unit, according to embodiments of the present invention;

FIGS. 30A through 30D illustrate exemplary message formats, according to embodiments of the present invention;

FIG. 31 illustrates an exemplary message format for protocol exchange, according to embodiments of the present invention;

FIG. 32A shows a flowchart illustrating an exemplary control flow for a sender state machine for error control and convergence testing, according to embodiments of the present invention;

FIG. 32B shows a flowchart illustrating an exemplary control flow for a receiver state machine for error control and convergence testing, according to embodiments of the present invention;

FIGS. 40A through 40C illustrate exemplary implementations for the digital quadrature up-converter of FIG. 39, according to embodiments of the present invention;

DETAILED DESCRIPTION OF PREFERRED EMBODIMENTS

Figure 1:
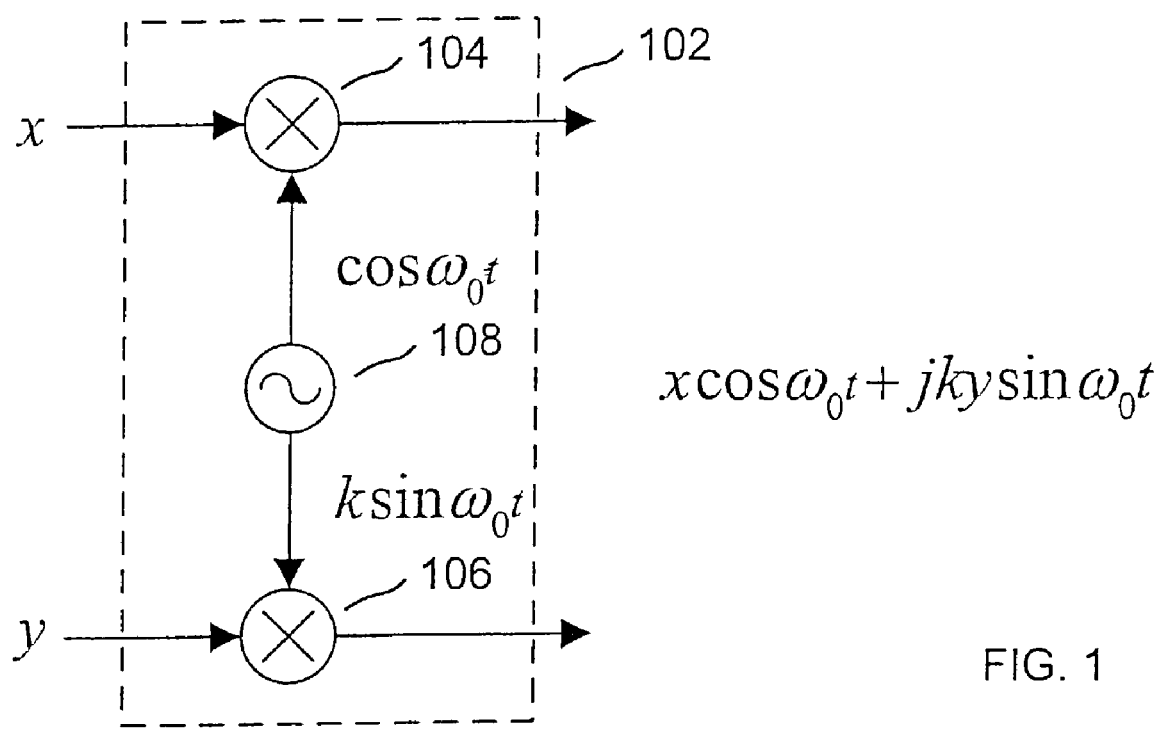
FIG. 1 illustrates an exemplary quadrature converter.
Figure 2:
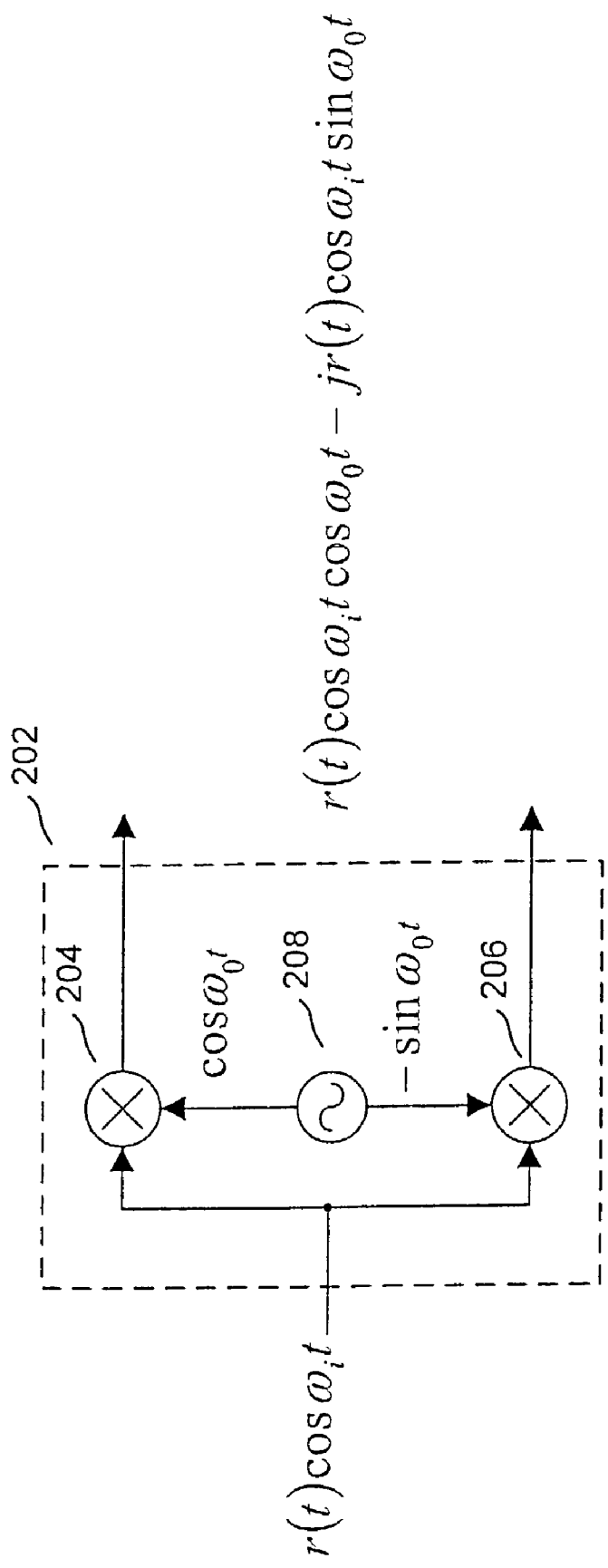
FIG. 2 illustrates an exemplary quadrature down-converter.
Figure 3A:
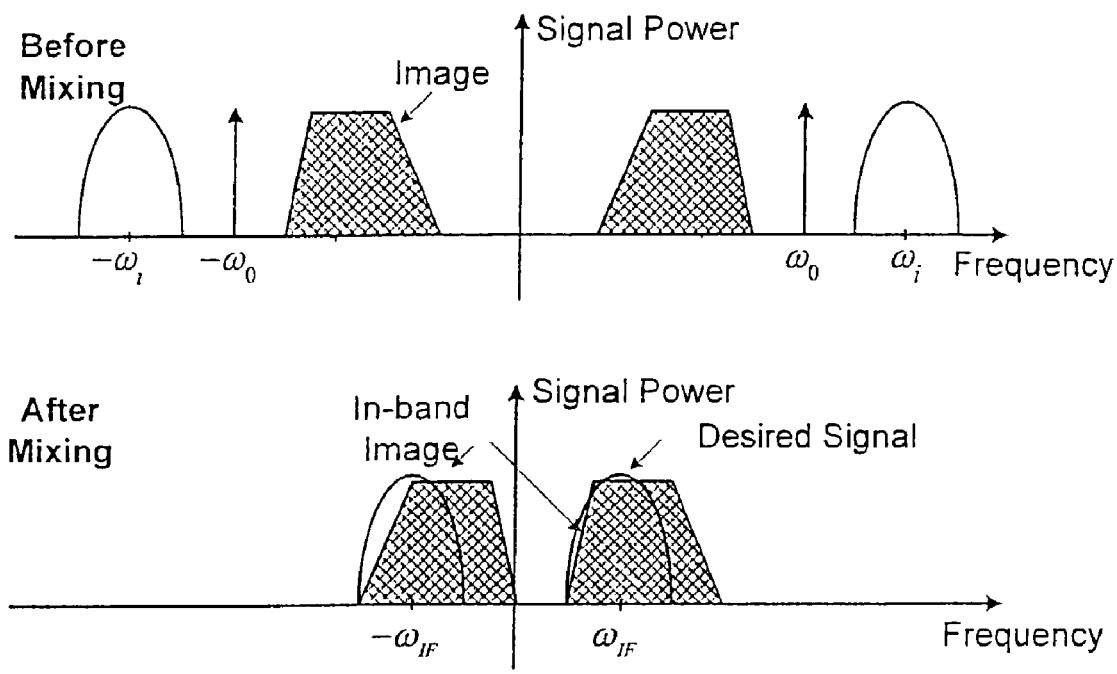
FIG. 3A illustrates an example of spectral components before and after double sideband mixing.
Figure 3B:
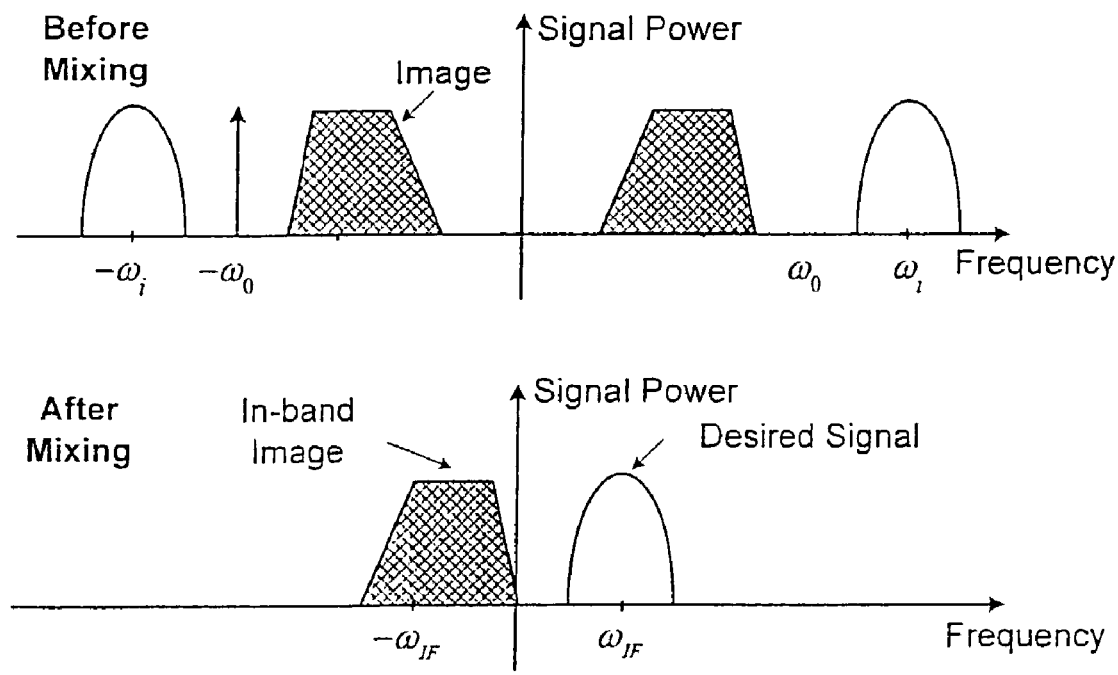
FIG. 3B illustrates an example of spectral components before and after single sideband mixing.
Figure 4:
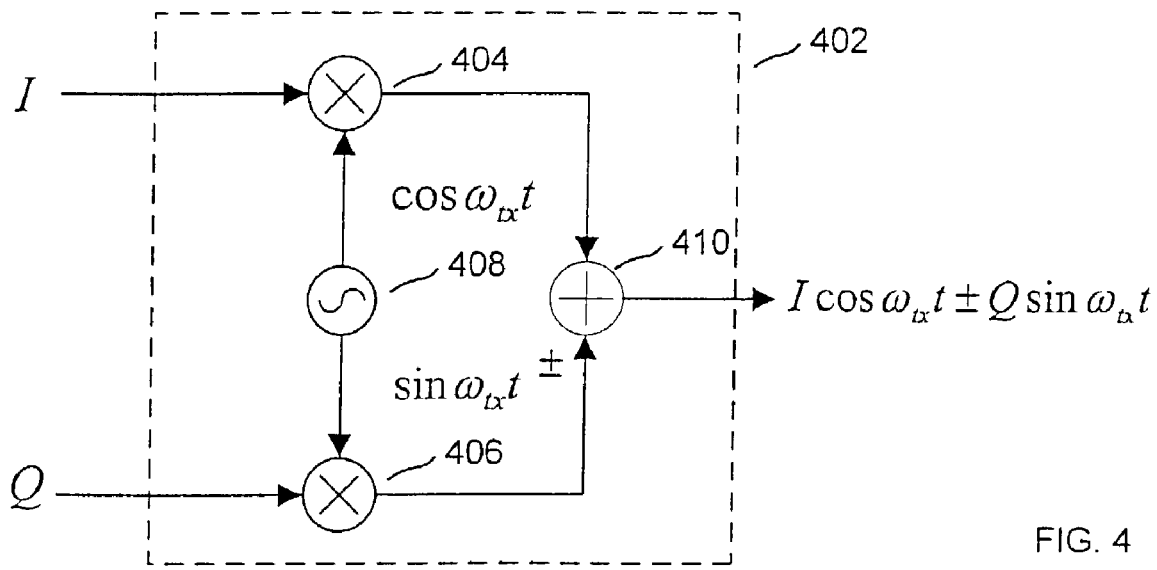
FIG. 4 illustrates an exemplary quadrature up-converter.
Figure 5:
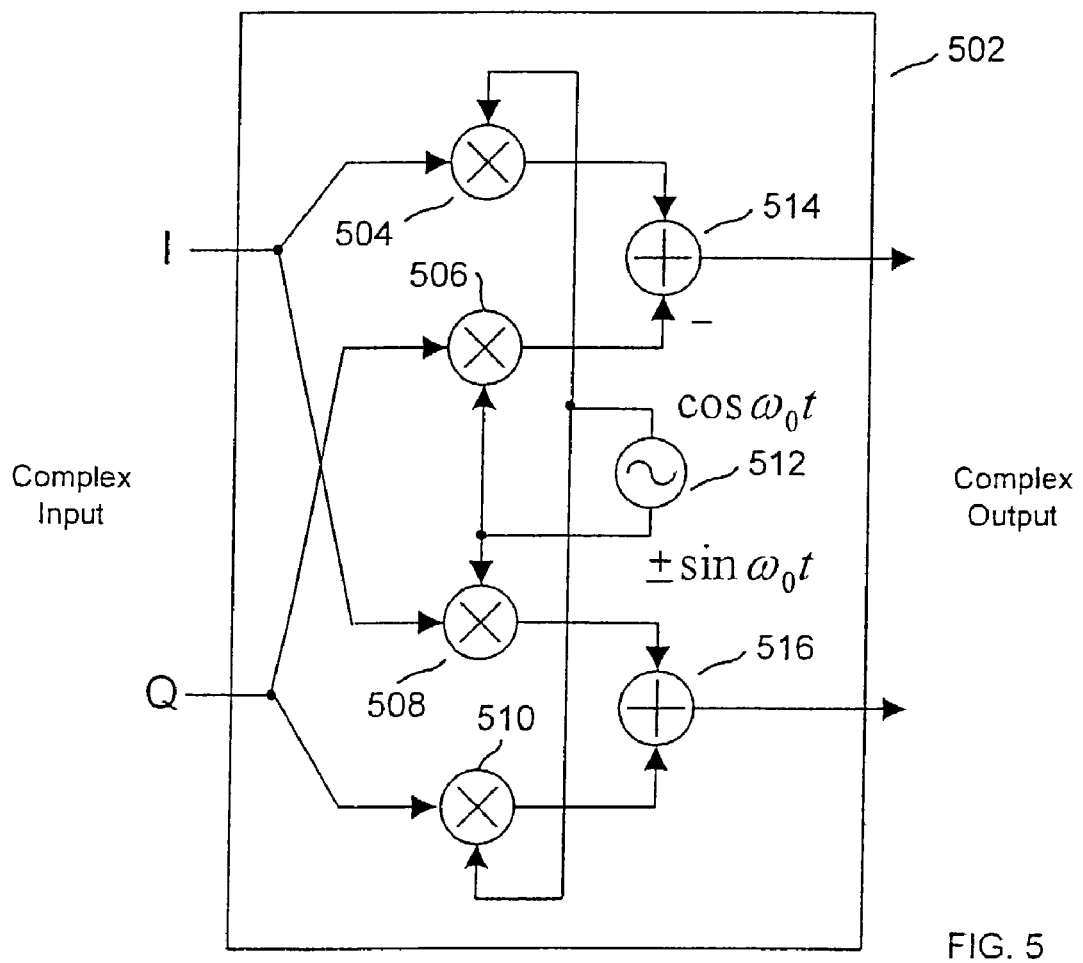
FIG. 5 illustrates an example of two cross-coupled quadrature converters.
Figure 6A:
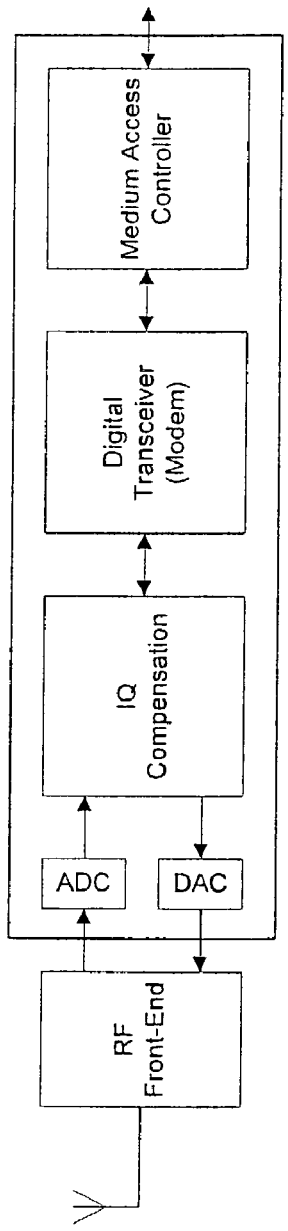
FIG. 6A illustrates a mixed signal chip having digital I-Q compensation on the baseband side, according to embodiments of the present invention.
Figure 6B:
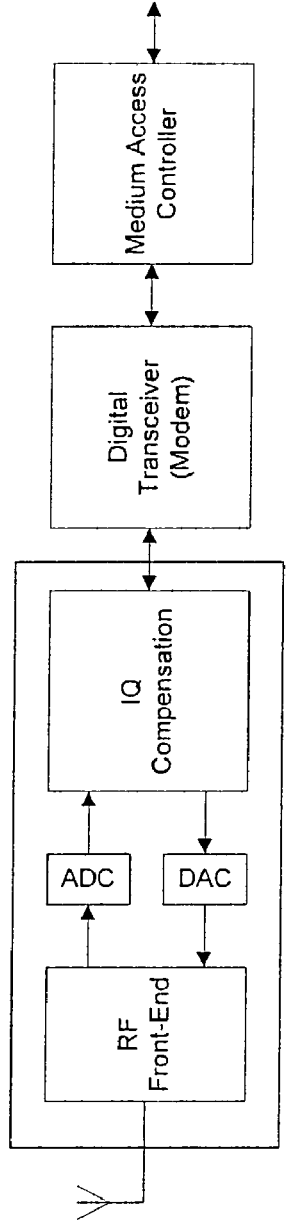
FIG. 6B illustrates a RF chip having digital I-Q compensation on the RF side, according to embodiments of the present invention.
Figure 6C:
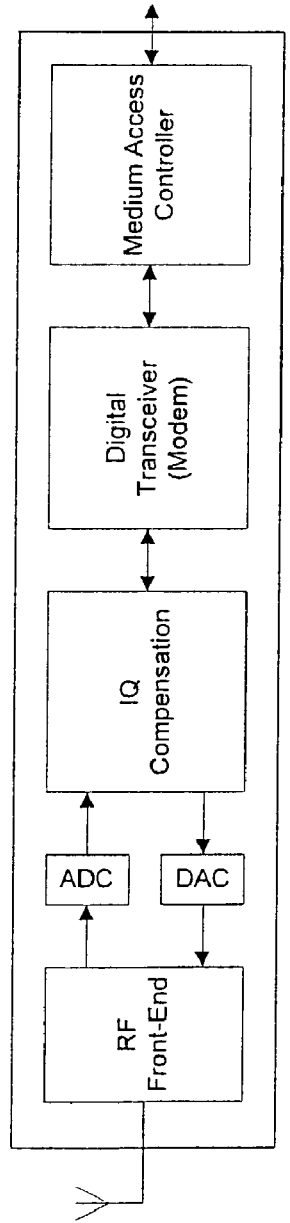
FIG. 6C illustrates a single chip radio having digital I-Q compensation, according to embodiments of the present invention.

Embodiments of the present invention reduce I-Q imbalances through compensation using systems and methods that may be implemented with low-complexity and low-cost using existing IC technologies. Moreover, because the present invention lends well to a digital implementation, it may be easily integrated with the existing digital processing that occurs in a RF radio system in one of several possible ways. Non-limiting examples of possible implementations of embodiments of the present invention are shown in FIGS. 6A, 6B and 6C. A two chip solution is shown in FIG. 6A where the compensation is part of a mixed-signal chip that interfaces to the RF with analog-to-digital converters (ADC) and digital-to-analog converters (DAC). The digital function performs modem and medium access (MAC) processing. Another approach is shown in FIG. 6B where the compensation is part of the RF front-end with a general programmable digital interface bus, that may be serial, parallel, or a mixture of both, connected to a digital chip that performs the modem and MAC functions. Finally, a more aggressive approach would be to integrate the modem, MAC, and compensation together with the RF front-end in one chip as shown in FIG. 6C. Many other approaches are possible, including, but not limited to, a MAC chip and a modem chip, where the compensation is part of the modem chip.

A. Direct-Conversion Transceiver

According to embodiments of the present invention, calibration may be performed either locally or remotely. As an example embodiment of the present invention, local calibration will first be described in relation to a direct-conversion transceiver architecture in TDD mode. However, embodiments of the present invention may be employed with other transceiver architectures, including, but not limited to, high IF and low IF super-heterodyne, and wideband IF (also known as indirect zero-IF) architectures. Moreover, embodiments of the invention may be easily employed in other communication modes, such as, but not limited to, full-duplex TDD systems and frequency-division duplexed (FDD) systems.

Figure 7:
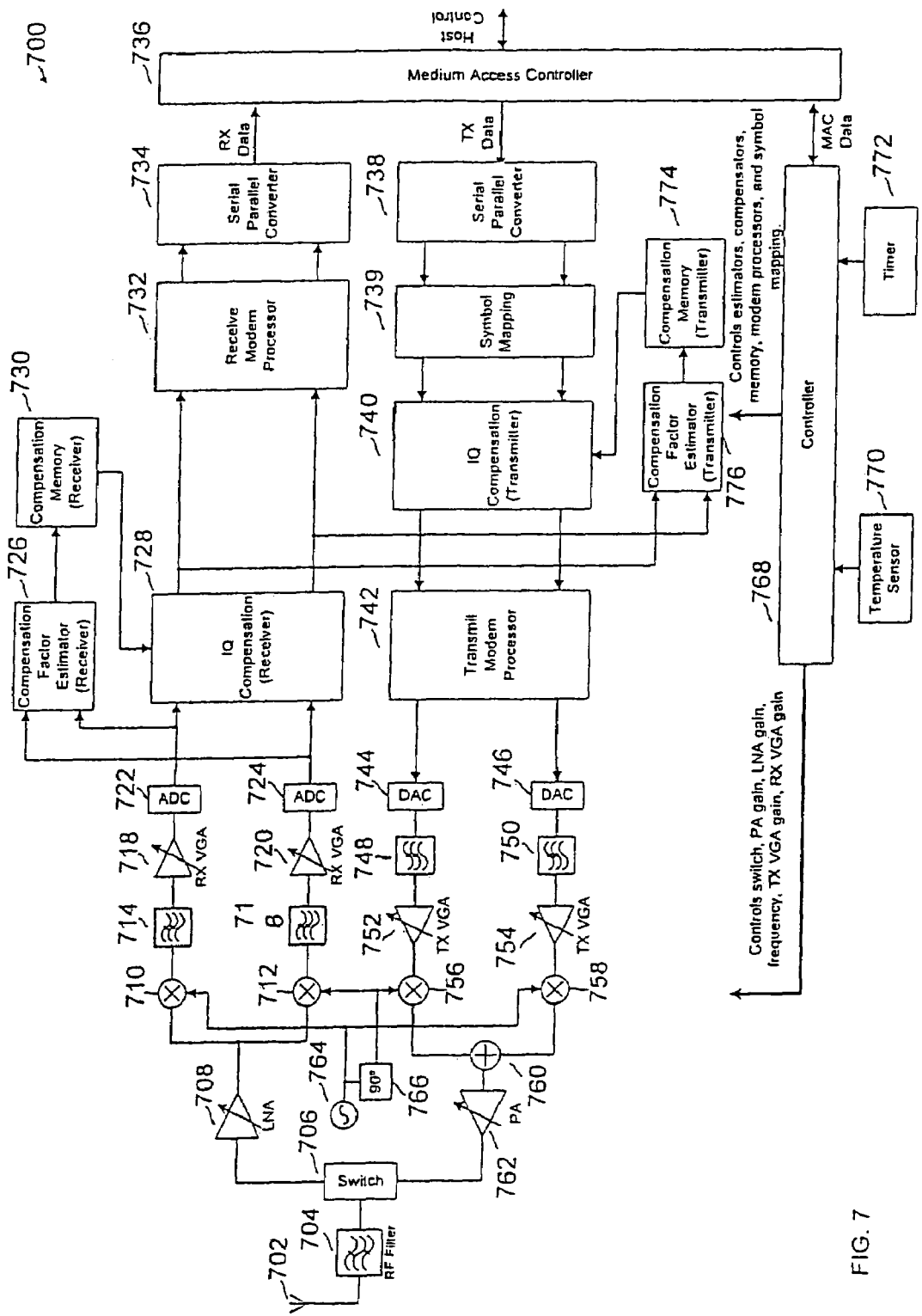
FIG. 7 illustrates a block diagram of an direct-conversion transceiver, according to embodiments of the present invention.

A block diagram of a direct-conversion transceiver 700 in which an embodiment of the present invention is employed is shown in FIG. 7. On the receiver side, antenna 702 is coupled to the input of low noise amplifier (LNA) 708 through RF filter 704 and switching unit 706. The output of LNA 708 is coupled to inputs of mixers 710, 712 of a quadrature down-converter. Oscillator 764 provides a first signal input to mixer 710 and a second signal input to mixer 712. The second signal input is phase shifted 90 degrees by phase shifter 766.

A first arm of the quadrature down-converter output is coupled to the input of receiver variable gain amplifier (VGA) 718 through filter 714. The output of the VGA 718 is coupled to the input of analog to digital converter (ADC) 722. Similarly, a second arm of the quadrature converter output is coupled to the input of receiver VGA 720 through filter 716. The output of the VGA 720 is coupled to the input of ADC 724. The outputs of ADC 722 and ADC 724 are provided as inputs to receiver compensation factor estimator 726. The outputs of ADC 722 and ADC 724 are also provided as inputs to the receiver I-Q compensation block 728. An output of receiver compensation factor estimator 726 is provided as an input to receiver compensation memory 730. Receiver compensation memory 730 may be random-access memory (RAM) or non-volatile memory. An output of receiver compensation memory 730 is, in turn, provided to an input of receiver I-Q compensation block 728. Outputs of receiver I-Q compensation block 728 are coupled to medium access controller (MAC) 736 through receive modem processor 732 and serial-parallel converter 734. The outputs of receiver I-Q compensation block 728 are also coupled to inputs of the transmitter compensation factor estimator 776. An output of transmitter compensation factor estimator 776 is provided as an input to transmitter compensation memory 774. Transmitter compensation memory 774 may be a RAM or non-volatile memory. An output of transmitter compensation memory 774 is, in turn, provided to an input of transmitter I-Q compensation block 740.

On the transmitter side, MAC 736 is coupled to inputs of transmitter I-Q compensation block 740 through serial-parallel converter 738 and symbol mapping block 739. Outputs of the transmitter I-Q compensation block 740 are coupled to inputs of the transmit modem processor 742. A first output of transmit modem processor 742 is provided to an input of mixer 756 of a quadrature up-converter through digital to analog converter (DAC) 744, filter 748 and transmitter VGA 752. A second output of transmit modem processor 742 is provided to an input of mixer 758 of the quadrature up-converter through DAC 746, filter 750 and transmitter VGA 754. The first and second arms of the quadrature up-converter output are coupled to inputs of adder 760. The output of combiner 760 is provided as an input to power amplifier (PA) 762. The output of PA 762 is provided to the antenna 702 through switching unit 706 and RF filter 704.

A controller 768 provides sequencing of processes in the transceiver 700 during calibration. In a local calibration, the test signal is generated in the local transmitter whereas in remote calibration, the test signal is sent via a remote transmitter to a local receiver. Local calibration requires calibration during times other than normal operation whereas remote calibration may occur real-time on a per-packet basis, whereby the test signal is transmitted as part of a transmitted message.

According to embodiments of the present invention, during local calibration, a test signal is generated from the transmit modem processor 742 and coupled to the receiver through the switching unit 706 in the RF front-end. The controller 768 sets the switching unit 706 to a calibration mode whereby the switching unit 706 couples a transmitted signal from the transmitter to the receiver, while providing isolation between the LNA 708 and the output of the PA 762, as well as the antenna 702. Depending on the technology, switching unit 706 may provide approximately 20-40 dB isolation when set in this calibration mode. The controller 768 may then set the transmitter VGA 752, 754 and PA 762 gains such that when a test signal is generated by the transmit modem processor 742, the output power from the PA 762 after attenuation by the switching unit 706 is within the operating range of the LNA 708. In an alternative embodiment, the controller 768 may, in addition, set precisely a test signal with a specified amplitude value generated digitally in the transmit modem processor 742. If necessary, the controller 768 may reduce the gain of the LNA 708 to facilitate the reception of the test signal, whose power may still be quite large even with switch isolation and gain adjustments in the transmitter. The determination of the gain settings may be performed using existing power control loop in the transmitter or via a table look up whose entries are determined apriori based on transceiver gain and power specifications.

Figure 8F:
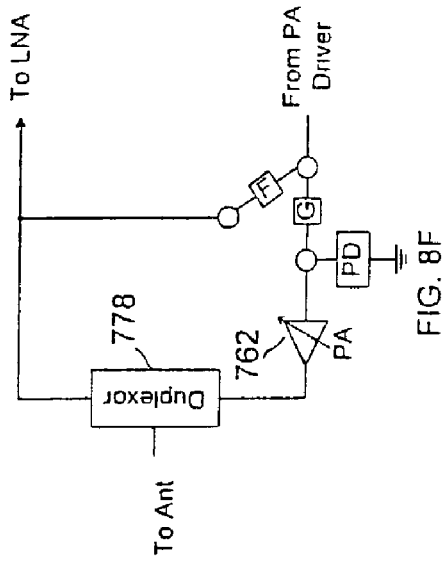
FIG. 8A through 8F illustrate exemplary configurations of a switching unit, according to embodiments of the present invention.
Figure 8C:
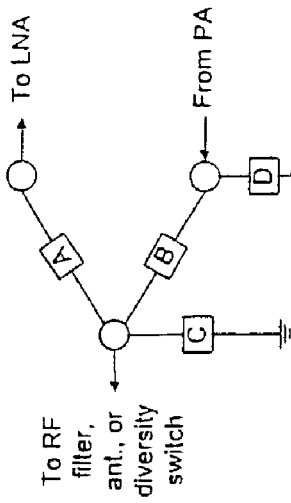
Figure 8E:
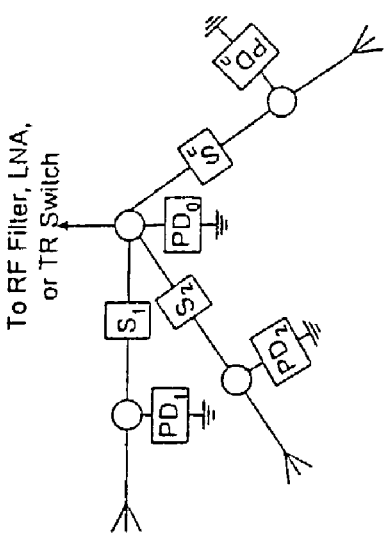

FIGS. 8A through 8E show different switch configurations of switching unit 706 that may be used, according to embodiments of the present invention, for calibration as well as normal operation. In FIGS. 8A through 8D, the switches may be used in TDD mode. The antenna diversity switch with pull down switches shown in FIG. 8E provides further isolation between the antenna 702 and the receiver during calibration. The arrangement including duplexor 778 shown in FIG. 8F may be used in the FDD mode. In all cases, the switch element may be implemented with technology well known in the art, including but not limited to microelectromechanical systems (MEMS), field effect transistors (FET's), bipolar junction transistors (BJT's), hetero junction transistors (HBT's), GaAs transistors, and pin-diodes.

Figure 8B:
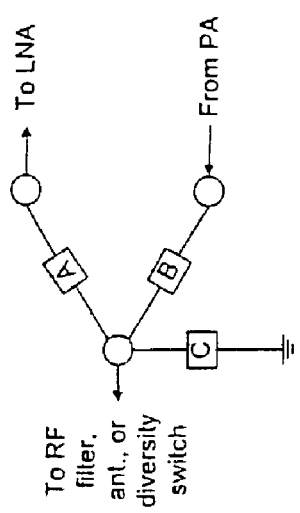
Figure 8A:
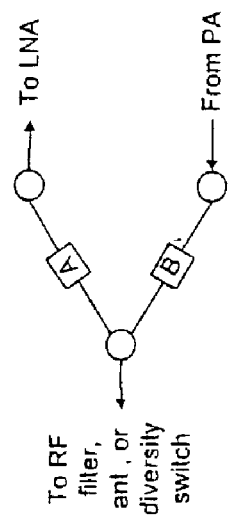

More specifically, as shown in FIG. 8A, according to one embodiment, switching unit 706 may be a standard TDD switch which may be used for calibration by setting the switches A and B to the states shown in Table 1. In the states where switch A is on (i.e., "closed") and switch B is off (i.e., "open"), switch A may be used for the receive mode during normal operation, and during calibration this configuration allows the output of the PA 762 to couple into the input of the LNA 708 through the high but finite isolation of switch B, which is off.

Similarly, the configuration where switch A is off and the switch B is on, may be used for the transmit mode during normal operation, and during calibration the output of the PA 762 may couple to the input of the LNA 708 through the finite isolation of switch A. Alternatively, both switches A and B may be turned off so that during calibration, there is more isolation between the PA 762 and the LNA 708 ports, which helps to attenuate the signal (i.e., lower the power level of the signal) that gets coupled, from the PA 762 output to the LNA 708 input. In a case where the transmitter has large dynamic range, both switches A and B may be turned on to connect the PA 762 output to the LNA 708 input, provided that the transmitter can turn down the signal power to within the LNA 708 input range.

TABLE 1

Standard TDD switch states for calibration.

| Switch A | Switch B | Functions |
|---|---|---|
| On | Off | Receive mode |
|  |  | Calibration by coupling between PA and antenna ports |
| Off | On | Transmit mode |
|  |  | Calibration by coupling between antenna and LNA ports |
| Off | Off | Calibration by coupling between PA, antenna, and LNA ports |
| On | On | Calibration by connecting PA and LNA |

According to another embodiment of the present invention, switching unit 706 may comprise a third switch C, as shown in FIG. 8B. If further attenuation of the coupled signal is required during calibration, the antenna 702 port of the switch may be pulled down to ground by turning on switch C. During normal operation, switch C is turned off and switches A and B may be set according to the first two rows of Table 1 for the receive and transmit modes.

Depending on the PA design, leaving the PA driving an open circuit may cause instability. Thus, according to embodiments of the present invention, switching unit 706 may comprise a switch D, as shown in FIG. 8C, in addition to switches A, B and C shown in FIG. 8B. Pull down switch D is added to the PA 762 port and is terminated to a well defined impedance (typically 50 ohms) to eliminate the potential for oscillation. During calibration, both switches C and D are turned on, while switches A and B are turned off. During normal operation, switches C and D are turned off and switches A and B may be set according to the first two rows of Table 1 for the receive and transmit modes.

Figure 8D:
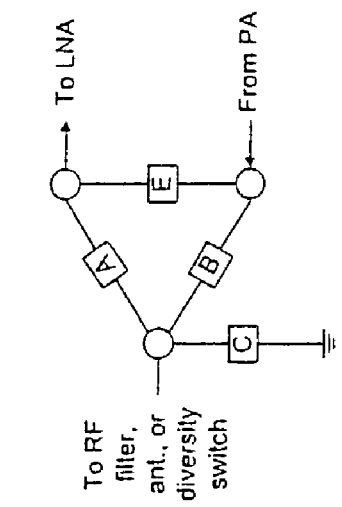

According to further embodiments of the present invention, as an alternative method of eliminating potential instability, switching unit 706 may comprise a switch E, as shown in FIG. 8D, in addition to switches A, B and C shown in FIG. 8B. Switch E may be added between the PA 762 and LNA 708 port as shown in FIG. 8D, so that during calibration switch E is turned on to allow the PA 762 output to connect to the LNA 708 input, while switches A and B are turned off and switch C is turned on. During normal operation, switches C and E are turned off and switch A and B may be set according to the first two rows of Table 1 for the receive and transmit modes.

Note that while not shown in FIGS. 8A, 8B, and 8D, it is also possible to add a switch that connects the PA port of switch B through a terminating resistor to ground so that the PA is prevented from oscillation due to instability.

According to yet further embodiments of the present invention, switching unit 706 may comprise an antenna diversity switch network, as shown in FIG. 8E. The antenna diversity switch network allows the transceiver 700 to select one or more antennas (such as antenna 702) using switches $S_1$ through $S_n$. The one or more antennas are selected such that the highest received signal to noise ratio (SNR) is achieved. In addition, by using the pull down switches $PD_0$ through $PD_n$, additional isolation is provided between the antenna 702 and the transceiver 700 during calibration.

Thus far embodiments of the switch configurations for switching unit 706 that have been discussed are applicable to a time-division duplexed (TDD) system, whereby the transceiver is either transmitting or receiving at any one time. However, embodiments of the present invention may also be applied to a frequency-division duplexed (FDD) system in which both the transmitter and the receiver are on at the same time but with different carrier frequencies. In such a case, the switching unit 706 (seen in FIG. 7) may be replaced by a duplexor 778, as shown in FIG. 8F, which behaves like a pair of bandpass filters isolating the receiver from the transmitter. In addition, switches F and G may be added. Switch F may be located prior to the PA 762, where one port of switch F is connected to the receive path and one port is connected to the input of the PA 762. During calibration, switch F is turned on to pass the test signal to the receive path and switch G is turned off to isolate the test signal from the PA 762. During normal operation, switch G is turned on and switch F is turned off. Moreover, the PA 762 may be shut down or an additional pull down switch PD may be provided at the input port of PA 762 to provide further isolation. During calibration, the pull down switch PD is turned on and during normal operation it is turned off. Because an FDD system uses different carrier frequencies for the transmitter and receiver, during calibration the synthesizer may be set appropriately to set the frequency to be the same for the transmitter as well as the receiver.

Referring again to FIG. 7, on the receiver side the controller 768 sets the gains of the LNA 708 and the receiver VGAs 718, 720 so that the ADC 722, 724 inputs are as close to full range as possible. This may be done automatically, for example, via an automatic gain control (AGC) loop to adjust the gain of the receiver VGAs based on the received signal strength computed in the receiver modem processor. Alternatively, the appropriate gain settings both in the transmitter and the receiver may also be determined a priori, because the gain and power parameters are well specified in a transceiver once it is designed. Another constraint on the gain settings is that the leakage out of the antenna 702 must be lower than that required by regulation. For instance, in the Industrial, Scientific, and Medial (ISM) band in the US, the FCC requires that transmissions be less than 1 mW if non-spread-spectrum waveforms are used.

Table 2 shows a set of gain values which may be set, according to embodiments of the present invention, and still have the power of the test signal fall within the operating range of the LNA 708, which in this example is −50 dBm to −10 dBm in the minimum gain state. The test signal may be a tone with 20 mV amplitude or −24 dBm referenced to 50 ohms. The switching unit 706 has an isolation of 20 dB and the LNA 708 has a minimum gain of −5 dB. The receive and transmit mixers 710, 712, 756 and 758 have 0-dB gain. Similarly, both receive and transmit filters 714, 716, 748 and 750 have 0-dB gain. The full range of the ADCs 722, 724 is −6 dBV. Given the above conditions, the gain settings may be determined as shown in Table 2 for a gain resolution of 5 dB. Table 2 may be easily extended to greater resolution (e.g. 1 dB). Even though the gain and other related parameters may vary with process variation, some margin may be introduced in the gain of receiver VGAs 718, 720 so that the ADCs 722, 724 do not clip for different gain settings. As noted earlier, the receiver gain setting could also be determined automatically via the AGC loop.

TABLE 2

Example gain settings for the transceiver during local calibration.

| PA Output (dBm) | PA Gain (dB) | TX VGA Gain (dB) | LNA Gain (dB) | LNA Input (dBm) | RX VGA Gain (dB) |
|---|---|---|---|---|---|
| −30 | 0 | −6 | −5 | −50 | 59 |
| −25 | 0 | −1 | −5 | −45 | 54 |
| −20 | 0 | 4 | −5 | −40 | 49 |
| −15 | 0 | 9 | −5 | −35 | 44 |
| −10 | 0 | 14 | −5 | −30 | 39 |
| −5 | 0 | 19 | −5 | −25 | 34 |
| 0 | 0 | 24 | −5 | −20 | 29 |
| 5 | 20 | 9 | −5 | −15 | 24 |
| 10 | 20 | 14 | −5 | −10 | 19 |

After the controller 768 sets a particular gain setting, it may issue an enable signal to the transmit modem processor 742 and symbol mapping block 739 to generate a test signal. It then may generate a delayed enable signal to the receiver compensation factor estimator 726 to initiate the process for estimating the compensation factors based on the transmitted test signal. The delay may be used to postpone the estimation until the test signal becomes available at the output of ADCs 722, 724. Once the estimated compensation factors are computed, the controller 768 writes the estimated factors into compensation memories 730 and 774 with an appropriate address. The process may then be repeated for different test signals at different frequencies and gain values for I-Q imbalances at both the transmitter and receiver. Because the imbalance can vary with temperature and frequency, the calibration just described may be needed for different temperatures and frequencies. In one embodiment, a temperature sensor 770 output is used to determine the address space of the memory wherein the imbalance data is located corresponding to the current temperature. Timer 772 is used to determine if an update is required for one or more compensation factors as well as to provide timing signals needed for testing the convergence of the estimated imbalances.

According to embodiments of the present invention, the above procedure is applied to determine the compensation factors for both the transmitter and the receiver. When determining the compensation factors for the transmitter imbalance, multiple test signals may be transmitted with different I-Q symbols. The transmitter imbalance estimation process is discussed in detail in a later section.

Figure 9:
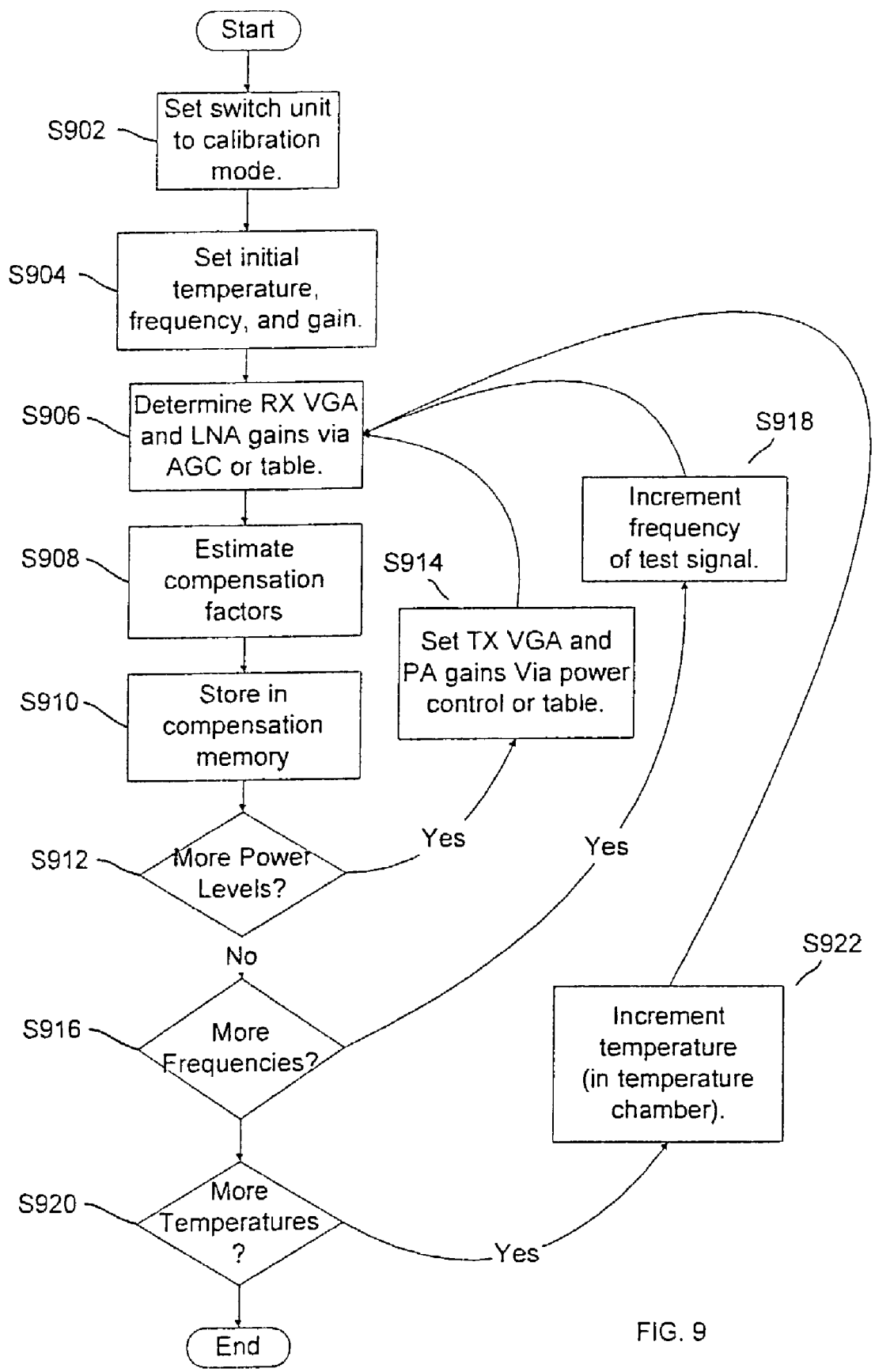
FIG. 9 shows a flowchart illustrating an example of a control flow used for local calibration, according to embodiments of the present invention.

FIG. 9 shows a flowchart which illustrates an example embodiment of a control flow used for local calibration. At S902, the controller 768 sets the switching unit 706 to the calibration mode. At S904, the controller 768 sets the initial temperature, frequency and gain for calibration. At S906, the controller 768 determines the receiver VGA 718, 720 gain and the LNA 708 gain using the AGC loop or Table 1. At S908, the receiver compensation factor estimator 726 estimates the compensation factors for the receiver and the transmitter compensation factor estimator 776 estimates the compensation factors for the transmitter. At S910, controller 768 stores the receiver compensation factors in the receiver compensation memory 730 and the transmitter compensation factors in the transmitter compensation memory 774.

After the compensation factors have been stored, a determination is made at S912 whether or not there are more power levels for which compensation factors should be estimated. If there are additional power levels (Yes), the controller 768 sets the gains of transmitter VGAs 752, 754 and PA 762 at S914 using an existing power control loop or Table 1. The control flow then repeats S906 through S912 for the new power level.

If there are no more power levels (No), a determination is made at S916 whether or not there are more frequencies of the test signal for which compensation factors should be estimated. If there are additional frequencies (Yes), at S918 the controller 768 sets the new frequency of the test signal (for example by incrementing the current frequency). The control flow then repeats S906 through S916 for the new frequency.

If there are no more frequencies (No), a determination is made at S920 whether or not there are more temperatures for which compensation factors should be estimated. If there are additional temperatures (Yes), at S922 the controller 768 sets the new temperature (for example by incrementing the current temperature in a temperature chamber). The control flow then repeats S906 through S920 for the new temperature.

A.1 Update of Compensation Factors

According to embodiments of the present invention, during operation, the controller 768 accepts inputs from an external controller, such as the MAC 736 shown in FIG. 7, to set the transceiver 700 to the appropriate mode or state.

Figure 10:
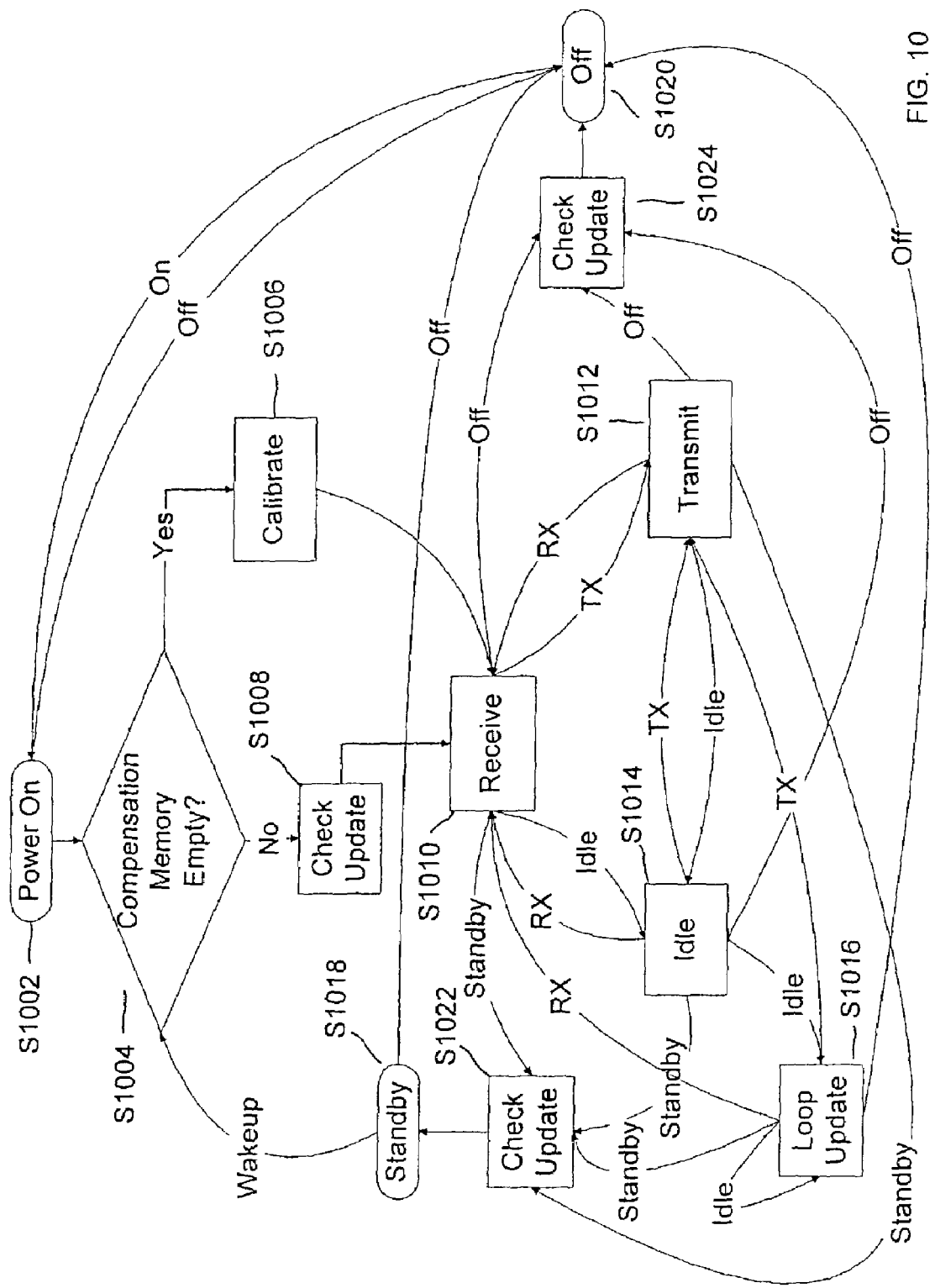
FIG. 10 shows a flowchart illustrating an example embodiment of the overall control flow during operation of a transceiver, according to embodiments of the present invention.

MAC 736 may, in turn, be controlled by a host controller (not shown). FIG. 10 shows a flowchart illustrating an example embodiment of the overall control flow during operation of transceiver 700. When the transceiver 700 is powered on at S1002, the controller 768 determines if calibration is required by determining at S1004 whether or not the compensation memory 730 or 774 that stores the compensation factors is empty. If the compensation memory 730 or 774 is empty (Yes), then calibration occurs at S1006. If compensation memory 730 is not empty (No), then the controller 768 goes to the check update state at S1008.

Figure 11:
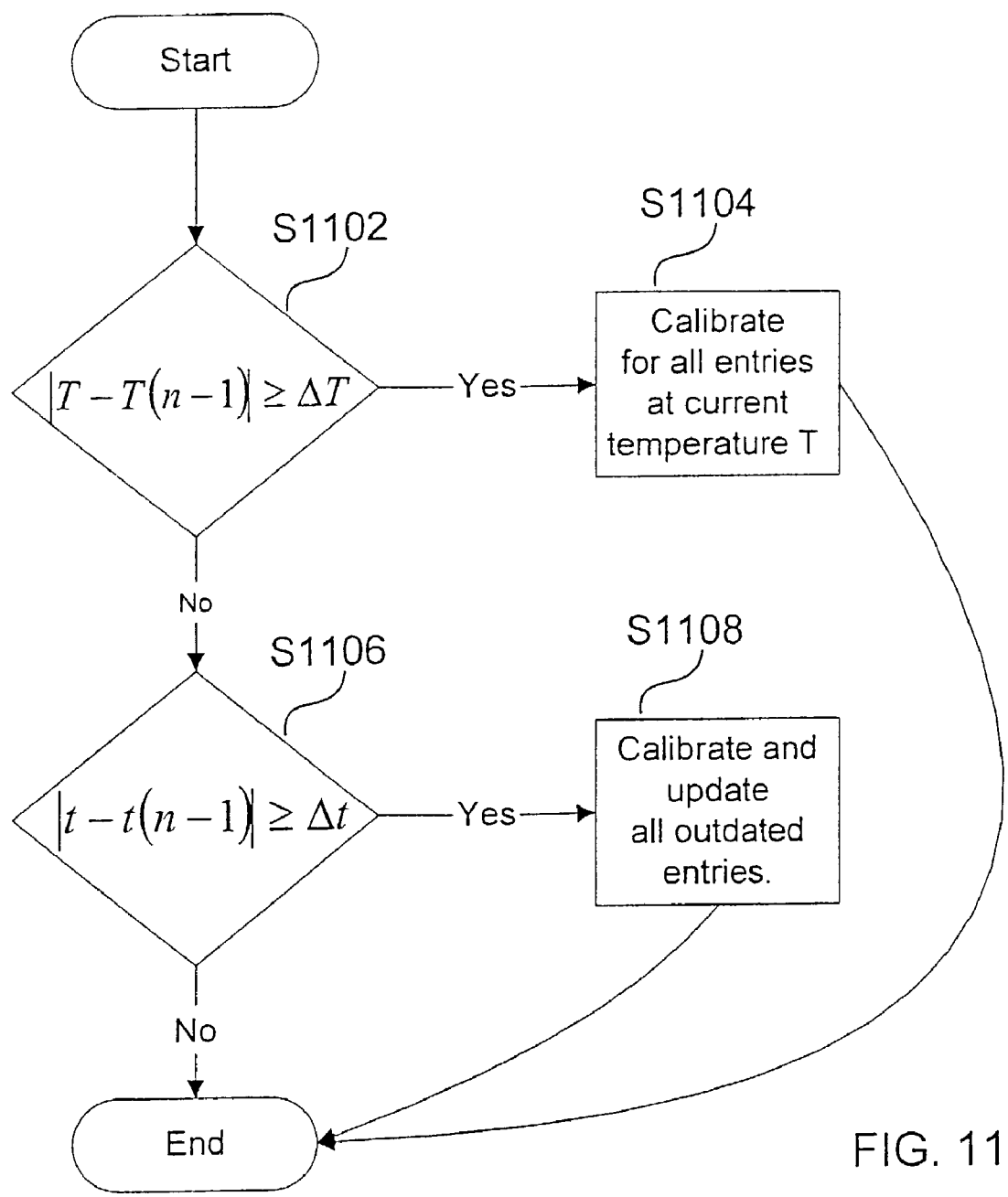
FIG. 11 shows a flowchart illustrating an example of a control flow of a check update state, according to embodiments of the present invention.

FIG. 11 shows a flowchart illustrating an example embodiment of the control flow of the check update state. As shown in FIG. 11, in the check update state, the controller 768 checks at S1102 whether or not there are compensation factor entries for which the temperature T during the last update T(n−1) has exceeded the current temperature by more than ΔT. If this condition is true (Yes), then at S1104 a calibration for the current temperature is initiated for all such compensation factor entries and the control flow may proceed to S1010 in FIG. 10. If this condition is not true (No), then it is next determined at S1106 whether or not there are any entries whose timestamps from the last update t(n−1) are at least Δt past the current time. If this condition is true (Yes), then at S1108 all outdated entries will be calibrated and updated and the control flow may then return to S1010 in FIG. 10. If this condition is not true (No), then the control flow may return directly to S1010 in FIG. 10.

Figure 12A:
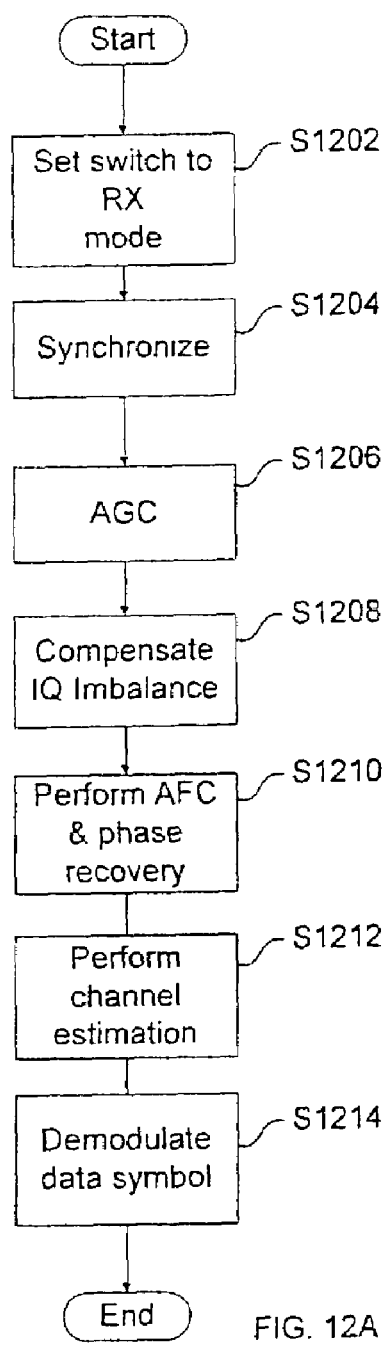
FIGS. 12A and 12B show flowcharts illustrating exemplary control flows of a receive state, according to embodiments of the present invention.
Figure 12B:
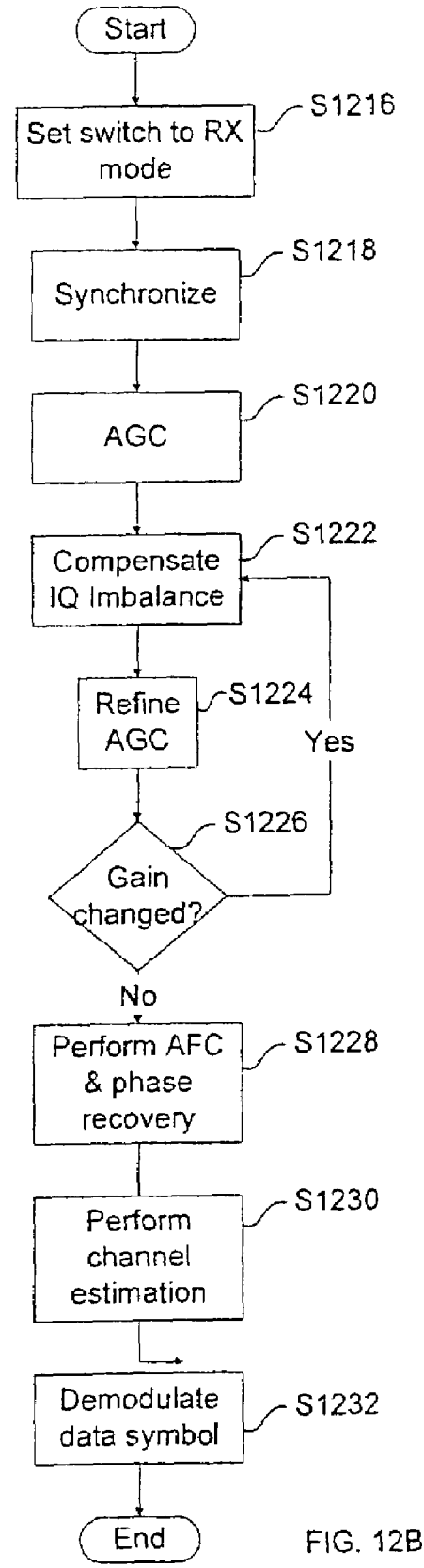

Referring again to FIG. 10, the controller 768 may place transceiver 700 in the receive state at S1010. FIGS. 12A and 12B show alternative exemplary embodiments of the control flow of the receive state. According to the first alternative embodiment shown in FIG. 12A, when in the receive state, at S1202 the controller 768 enables the receiver with the switching unit 706 terminated to the LNA 708 input. The receive modem processor 732 may then, at S1204, attempt to synchronize with the transmitted signal. After synchronization is achieved, the receive modem processor 732 may perform AGC at S1206 to determine the appropriate receiver gain setting. Next, the controller 768 may retrieve the appropriate compensation factors for the receiver based on the current gain settings, frequency channel, and temperature reading and perform I-Q compensation at S1208 based on the compensation factors. The receive modem processor 732 may then perform automatic frequency control (AFC), phase recovery, and channel estimation at S1210 and S1212 prior to recovering the actual data at S1214.

The AGC loop requires the received signal strength indicator (RSSI) values, which may be corrupted by I-Q imbalance. Therefore, in an alternative embodiment of the receive state control flow shown in FIG. 12B, in order to achieve more precise AGC control, the AGC loop may be allowed to re-converge after the I-Q imbalance has been corrected. Thus, at S1216 the controller 768 enables the receiver with the switching unit 706 terminated to the LNA 708 input. The receive modem processor 732 may then, at S1218, attempt to synchronize with the transmitted signal. After synchronization is achieved, the receive modem processor 732 may perform a coarse AGC setting at S1220 initially (prior to I-Q compensation). Next, the controller 768 may retrieve the appropriate compensation factors for the receiver from the receiver compensation memory 730 based on the current gain settings, frequency channel, and temperature reading and perform I-Q compensation at S1222 based on the compensation factors. Then, after I-Q compensation, the AGC setting is refined at S1224. A determination is then made at S1226 whether or not the gain has changed after I-Q compensation. If this condition is true (Yes), then S1222 through S1226 are repeated. If the condition is not true (No), then the receive modem processor 732 performs automatic frequency control (AFC), phase recovery, and channel estimation at S1228 and S1230 prior to recovering the actual data at S1232.

According to either of the alternative embodiments illustrated in FIGS. 12A and 12B, the synchronization, AGC, I-Q compensation, and AFC and phase recovery process may be done in a separate control channel, which may be implemented in the time, frequency, or code domain. The control channel allows synchronization, gain, I-Q compensation factors, frequency offset, and phase offset to be determined prior to the reception of user data so that immediately upon entering the receive state, the receiver may perform channel estimation and data recovery.

Figure 13A:
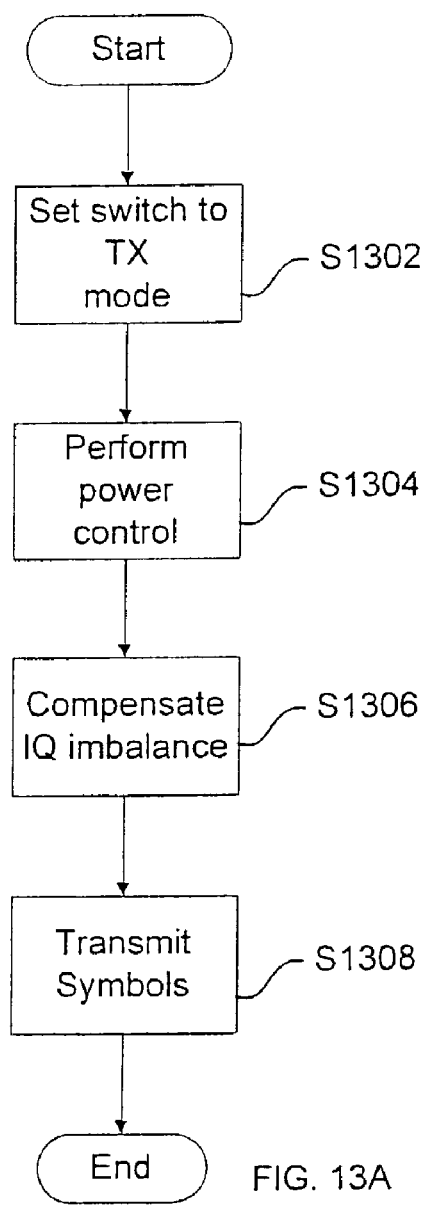
FIGS. 13A and 13B show flowcharts illustrating exemplary control flows of a transmit state, according to embodiments of the present invention.
Figure 13B:
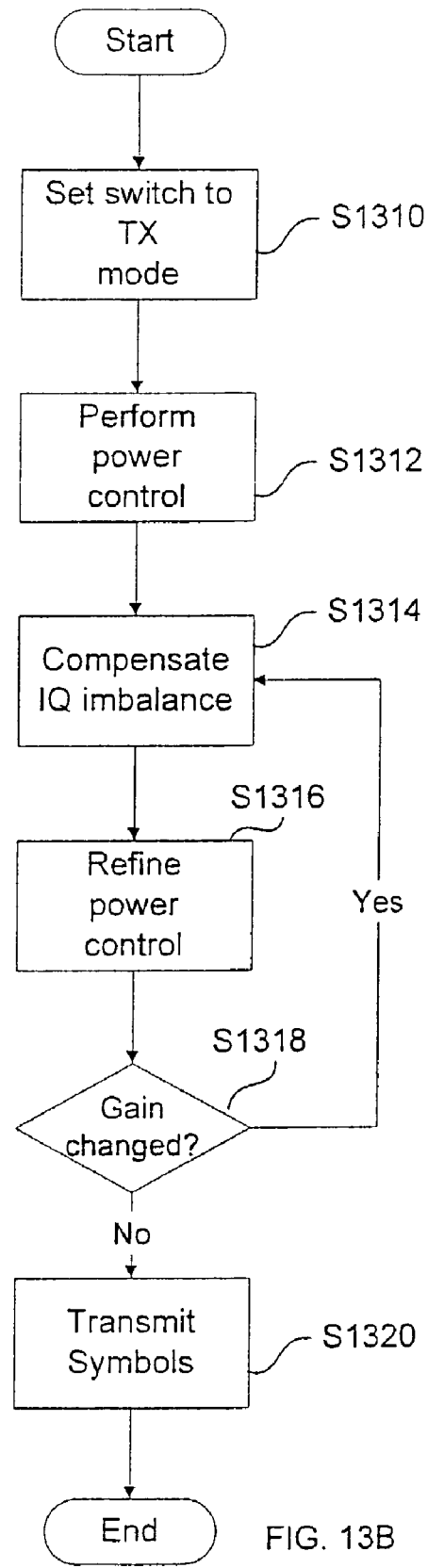

Referring again to FIG. 10, the controller 768 may place the transceiver 700 in the transmit state at S1012. FIGS. 13A and 13B show alternative exemplary embodiments of the control flow of the transmit state. According to the first alternative embodiment shown in FIG. 13A, when in the transmit state, at S1302 the controller 768 connects the switching unit 706 to the output of the PA 762. Then, at S1304, the controller 768 sets the appropriate gain values determined, for example, via a power control protocol. At S1306 the controller 768 then retrieves the appropriate I-Q compensation factors for the transmitter from the transmitter compensation memory 774 based on the current gain settings, frequency channel, and temperature and performs I-Q compensation based on the compensation factors. The controller 768, at S1308, then enables the transmit modem processor 742 to generate transmitted symbols which are compensated and up-converted by the transmitter front-end.

As described above in reference to FIGS. 12A and 12B, in the receive state the received signal strength indicator (RSSI) values may be corrupted by I-Q imbalance. Therefore, in the embodiment described above in relation to FIG. 12B, more precise AGC control is achieved in the receive state by re-converging of the AGC loop after the I-Q imbalance has been corrected. Similarly, in the transmit state the I-Q imbalance at the transmitter affects the precision of the power control loop which sets the gains within the transmitter so that a given output power is achieved. Therefore, in an alternative embodiment of the control flow of the transmit state shown in FIG. 13B, in order to achieve more precise power control, a coarse power control setting may be obtained initially prior to imbalance compensation at the transmitter and may be refined after the I-Q imbalance has been corrected. Thus, according to the alternative embodiment shown in FIG. 13B, when in the transmit state the controller 768 powers down or disables the receiver and terminates the switching unit 706 to the output of the PA 762 at S1310. Then, at S1312, the controller 768 performs a coarse power control setting. The controller 768 then retrieves the appropriate I-Q compensation factors for the transmitter from the transmitter compensation memory 774 based on the current gain settings, frequency channel, and temperature and performs I-Q compensation at S1314 based on the compensation factors. Then, after I-Q compensation, the power setting is refined at S1316. A determination is then made at S1318 whether or not the gain has changed after I-Q compensation. If this condition is true (Yes), then S1314 through S1318 are repeated. If the condition is not true (No), the controller 768, at S1320, then enables the transmit modem processor 742 to generate transmitted symbols which are compensated and up-converted by the transmitter front-end.

Figure 14:
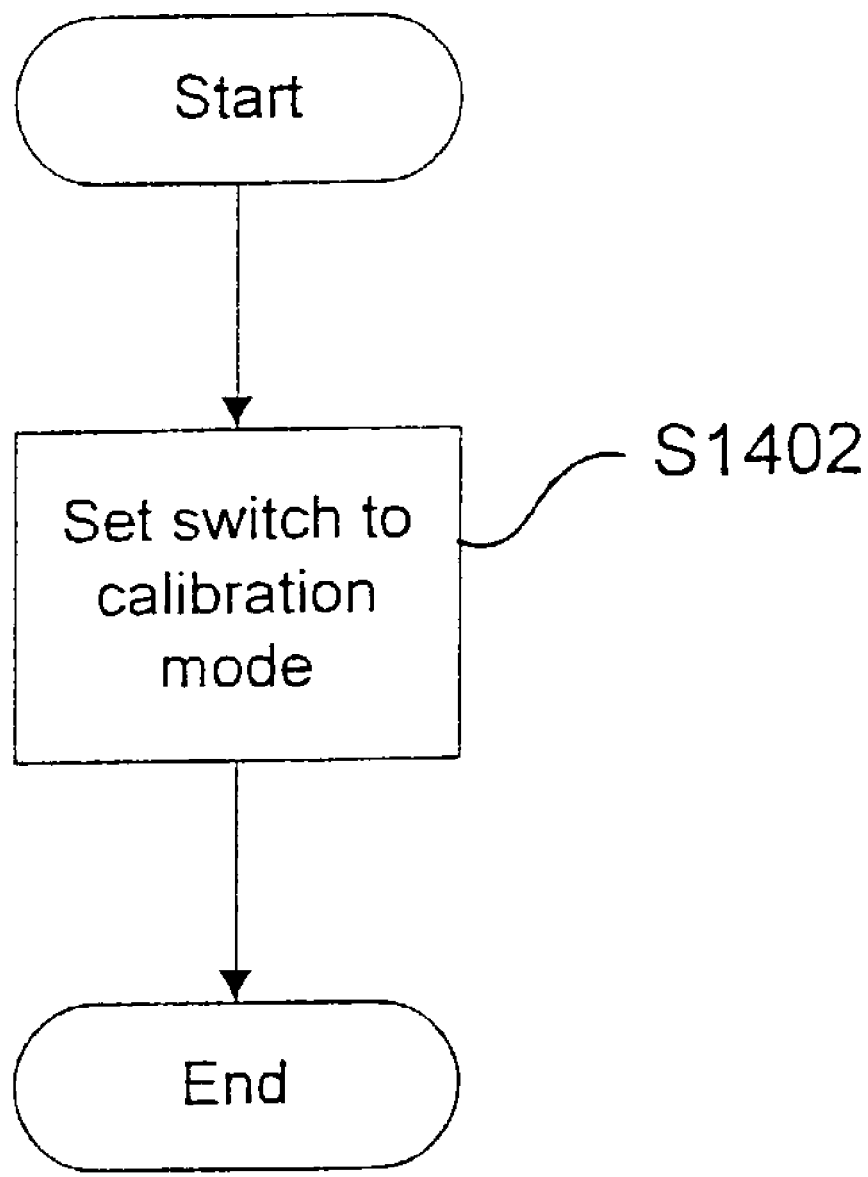
FIG. 14 shows a flowchart illustrating an example of a control flow of a idle state, according to embodiments of the present invention.

Referring again to FIG. 10, when the transceiver 700 is neither receiving nor transmitting, the controller 768 may place transceiver 700 in the idle state at S1014. FIG. 14 shows an example embodiment of the control flow of the idle state. In the idle state, the switching unit 706 may be configured, at S1402, to a calibration mode so that if a loop update State at S1016 (See FIG. 10) determines that the receiver compensation memory 730 or transmitter compensation memory 774 should be updated, it may be performed immediately.

Figure 15:
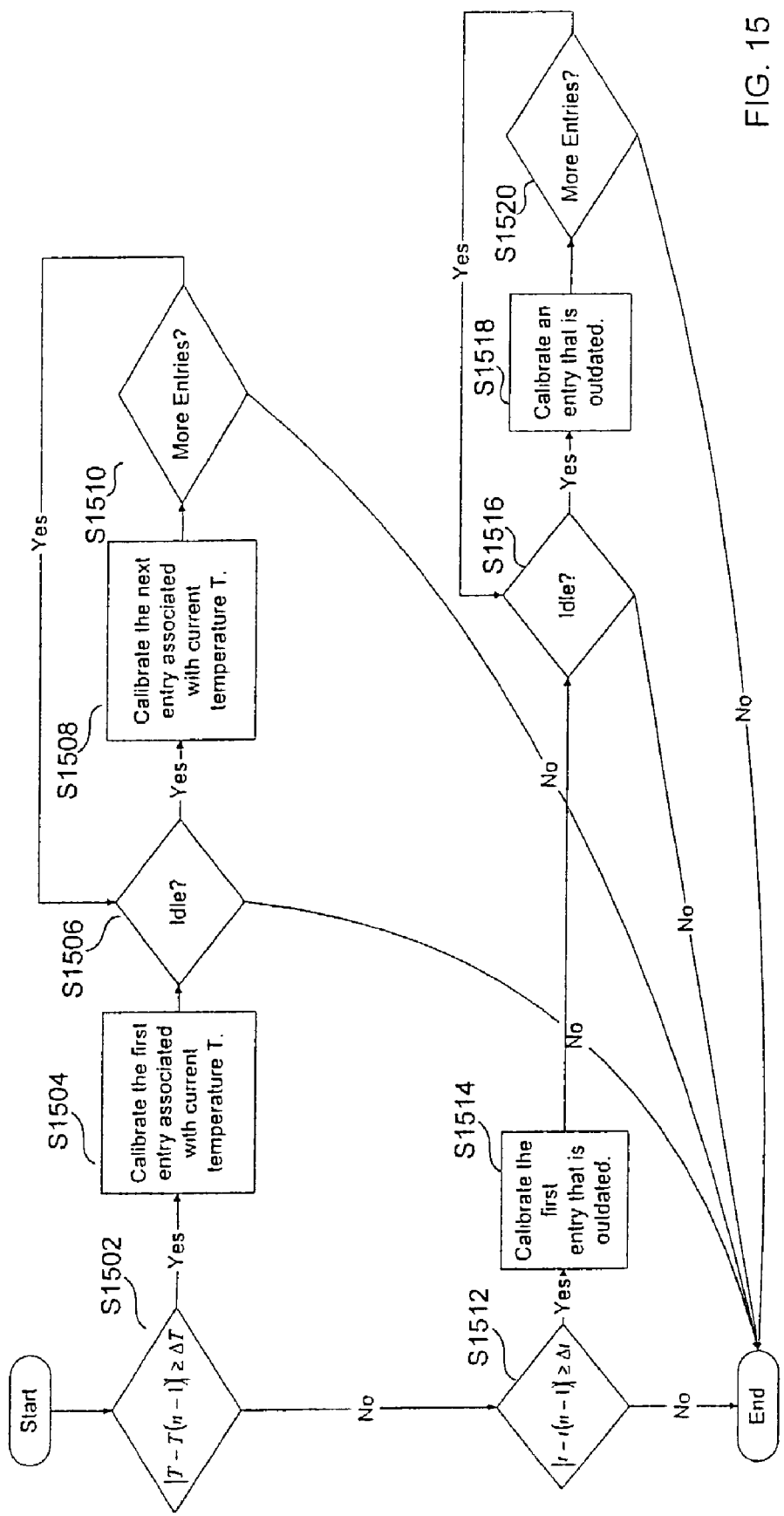
FIG. 15 shows a flowchart illustrating an example of a control flow of a loop update state, according to embodiments of the present invention.

FIG. 15 is a flowchart illustrating an exemplary embodiment of the loop update state. It is first determined at S1502 whether or not the temperature T during the last update T(n−1) is equal to or greater than ΔT. If this condition is true (Yes), then at S1504 the first entry associated with the current temperature is calibrated. It is then determined at S1506 whether or not transceiver 700 is still in the idle state. If it is (Yes), then at S1508 the next entry associated with the current temperature is calibrated. If transceiver 700 in no longer in the idle state (No), then controller 768 exits from the loop update state. After S1508, it is determined at S1510 whether or not more entries exist to be calibrated. If more entries exist (Yes), then the process is repeated beginning at S1506. If there are no more entries (No), then controller 768 exits from the loop update state. If it is determined at S1502 that the temperature T during the last update T(n−1) is not equal to or greater than ΔT (No), then it is determined at S1512 whether or not there are any entries whose timestamps from the last update t(n−1) are at least Δt past the current time. If this condition is true (Yes), then at S1514, the first entry that is outdated is calibrated. It is then determined at S1516 whether or not transceiver 700 is still in the idle state. If it is (Yes), then at S1518 the next entry that is outdated is calibrated. If transceiver 700 in no longer in the idle state (No), then controller 768 exits from the loop update state. After S1518, it is determined at S1520 whether or not more entries exist to be calibrated. If more entries exist (Yes), then the process is repeated beginning at S1516. If there are no more entries (No), then controller 768 exits from the loop update state. If it is determined at S1512 that there are not any entries whose timestamps from the last update t(n−1) are at least Δt past the current time (No), then controller 768 exits from the loop update state.

Note that in between each update, the controller 768 checks whether or not the transceiver 700 is still in the idle state. If transceiver 700 is out of the idle state, the update process is halted and the idle state is exited. According to embodiments of the present invention, for power saving purposes, the controller 768 may power down both the transmitter and receiver except for the receiver compensation memory 730, the transmitter compensation memory 774, and other control functions while it is in the idle state. Note that if non-volatile memory should be used for the compensation memories, the compensation memories 730 and 774 could be powered down when not used.

The idle state assumes that the medium access protocol has a scheduler that determines the time at which to set the transceiver 700 to the receive, transmit, or idle states. In certain cases, the medium access protocol is not scheduled. For instance, in carrier-sense multiple access, the transceiver 700 is either in transmit or in receive mode even if it is not receiving any messages destined for it. According to embodiments of the present invention, in the unscheduled case, the controller may allocate a low duty cycle during the receive or transmit states to force the transceiver into the idle state. Otherwise, calibration is performed only at power on and before the transceiver 700 goes into the standby or the off states.

The transceiver 700 in any of the receive, transmit, or idle states may transition into either the standby state or off state, at S1018 and S1020, respectively, as controlled by the MAC 736. As shown in FIG. 10, prior to entering either the off state or standby state, the compensation memories are checked, at S1022 or S1024, respectively, for update in the check update state so that when the transceiver 700 is turned back on, the compensation memory is as up-to-date as possible.

A.2 Test Signal

Figure 18:
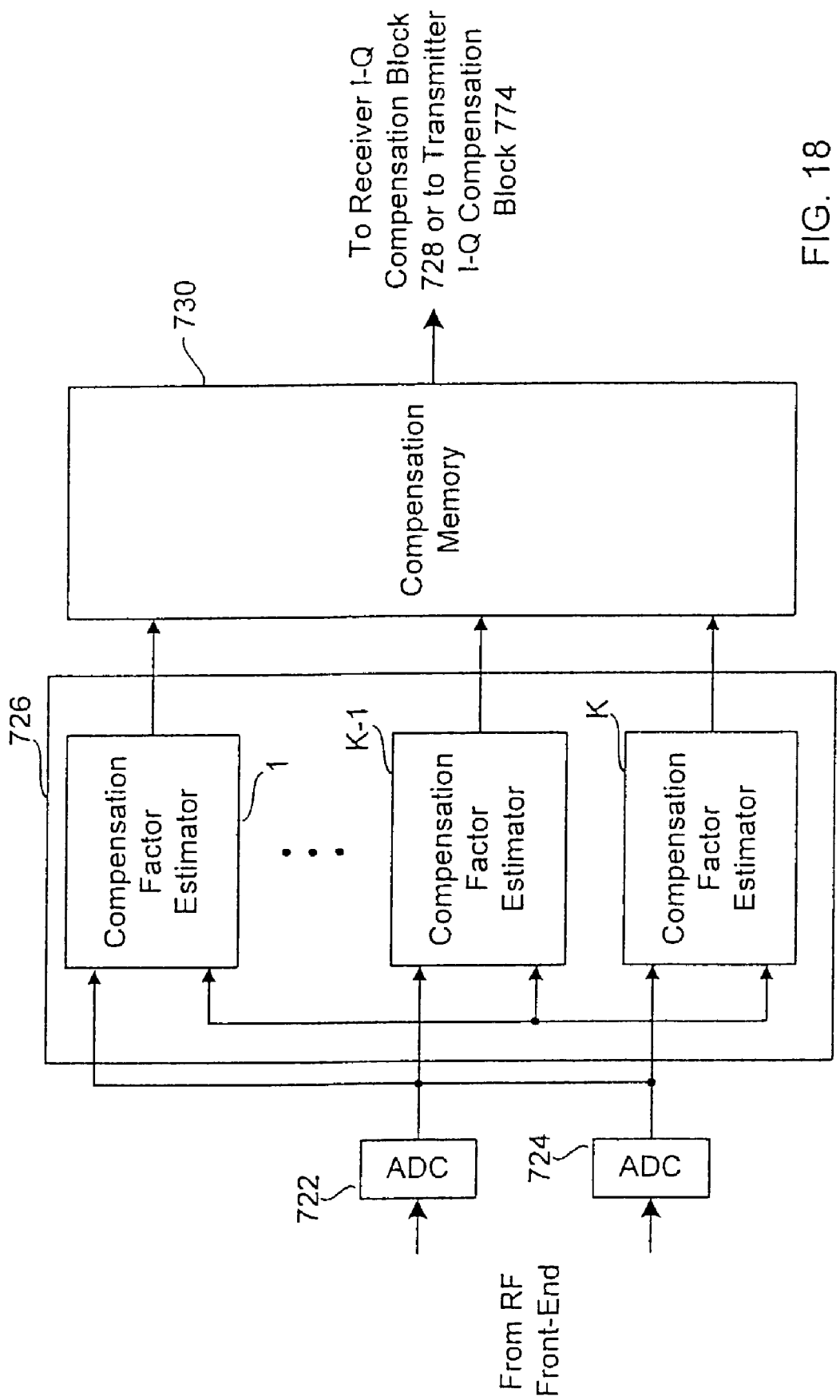
FIG. 18 illustrates an exemplary compensation factor estimator using multiple tones, according to embodiments of the present invention.

According to embodiments of the present invention, the test signal may be a single complex tone $c_1 e^{j\omega_1 t}$ or $c_1 e^{-j\omega_1 t}$, where $c_1$ is a constant. Thus, calibration may be performed sequentially for each frequency. In further embodiments of the present invention, calibration may be accelerated by providing a compensation factor estimator that estimates the imbalance at different frequencies concurrently using multiple complex tones $\{c_k e^{j\omega_k t}\}$ or $\{c_k e^{-j\omega_k t}\}$ as the test signal, where k indexes the different frequencies and constants. An example embodiment of such a compensation factor estimator using multiple tones is shown in FIG. 18. According to one embodiment, receiver compensation factor estimator 726 includes K compensation factor estimators (1, ..., K−1, K), each of which receives the outputs of ADCs 722, 724. The test signal may be created by the transmit modem processor 742 digitally, for example with a Fast Fourier Transform (FFT) or an Inverse FFT (IFFT). Other methods well known in the art may also be applied, such as, but not limited to, a direct-digital frequency synthesizer.

When using an FFT, the sampling rate and the number of points of the FFT should be set such that the transmitted tones fall on the center of the frequency bins of the FFT. The constant $c_k$ may be used as the weighting factor in the frequency bin corresponding to the tone $e^{j\omega_k t}$ or $e^{-j\omega_k t}$. Those frequency bins that do not correspond to the transmitted tone or tones may have weighting factors set to zero.

A.3 The Compensator

Figures 16A, 16B:
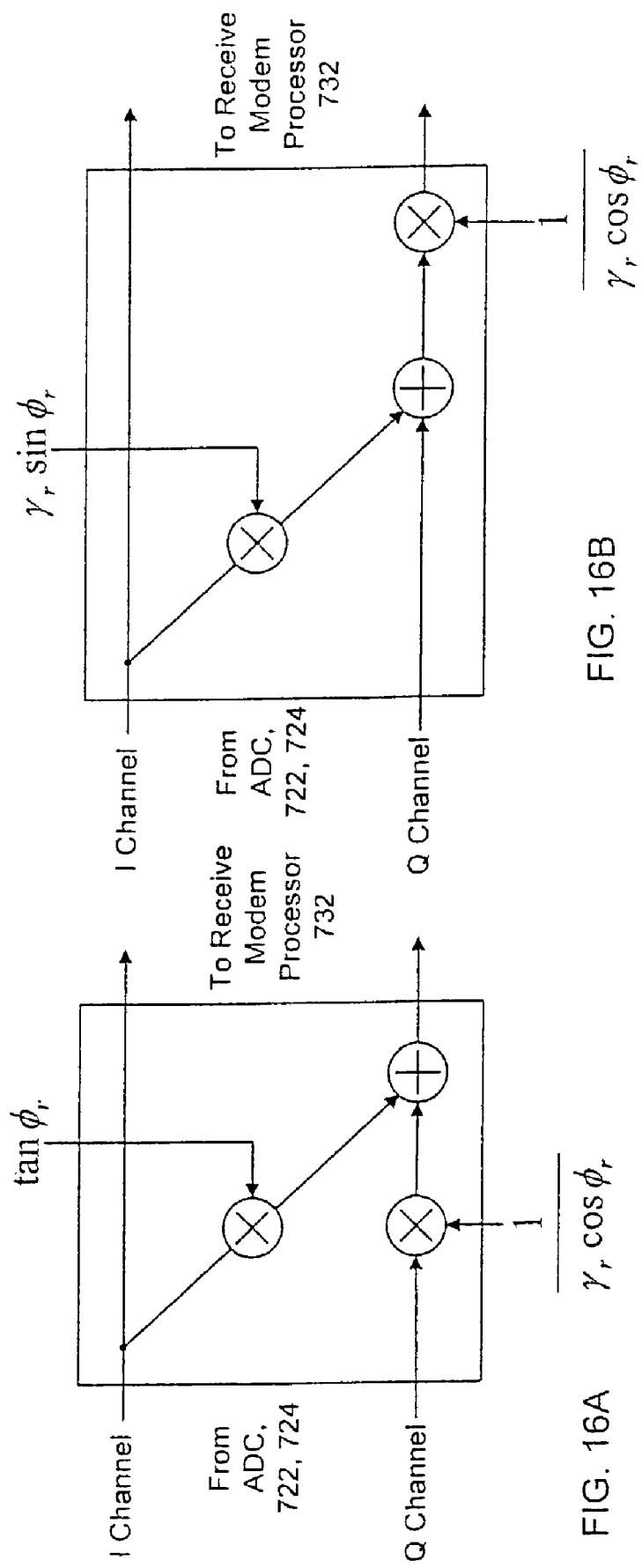
FIGS. 16A and 16B illustrate exemplary implementations of a receiver I-Q compensation unit, according to embodiments of the present invention.

According to embodiments of the present invention, the receiver I-Q compensation block 728 and the transmitter I-Q compensation block 740 may be implemented as shown in FIGS. 16A and 17A, respectively. In the embodiment shown in FIGS. 16A and 17A, the compensation factors for the receiver are $\tan\phi_r$ and $(\gamma_r \cos \phi_r)^{-1}$, and those for the transmitter are $\tan\phi_t$ and $(\gamma_t \cos \phi_t)^{-1}$, respectively.

In an alternative embodiment, the receiver I-Q compensation block 728 and the transmitter I-Q compensation block 740 may be implemented as shown in FIGS. 16B and 17B, respectively. In the embodiment shown in FIGS. 16B and 17B, the compensation factors $\gamma_r \sin\phi_r$ and $\gamma_t \sin\phi_t$ are used in place of $\tan\phi_r$ and $\tan\phi_t$, respectively.

A.4 Estimation of I-Q Imbalance at the Receiver with a Single Mean

According to embodiments of the present invention, estimation of I-Q imbalance may be based on the following operation:

$$\text{mean}\left(\frac{w(t)^2}{|w(t)|^2}\right) = E_{RI} + jE_{II} \qquad \text{Equation (5)}$$

where w(t) represents the received signal at the receiver output expressed by Equation 4.

By expanding Equation 5, it can be shown that $\phi_r$ and $\gamma_r$ may be determined by solving the following set of equations $$E_{RI} = \frac{1 - \gamma_r^2}{1 + 2\gamma_r \cos\phi_r + \gamma_r^2} \quad \text{Equation (6)}$$

$$E_{II} = \frac{-2\gamma_r \sin\phi_r}{1 + 2\gamma_r \cos\phi_r + \gamma_r^2}. \quad \text{Equation (7)}$$

There are many possible methods for solving $\phi_r$ and $\gamma_r$ in Equation 6 and Equation 7, including, but not limited to, applying Newton Raphson method; applying the two-dimensional Taylor's approximation to simplify Equation 6 and Equation 7; applying one-dimensional Taylor's approximation to estimate cos $\phi_r$, and sin$\phi_r$ as polynomials; or a combination of the above-described methods.

When the one-dimensional Taylor's approximation is used to simplify cos $\phi_r$ as one and sin$\phi_r$ as $\phi_r$, it follows that the amplitude and phase mismatch at the receiver may be estimated as $$\gamma_r \approx \frac{1 - E_{RI}}{1 + E_{RI}} \quad \text{Equation (8)}$$

$$\phi_r \approx -E_{II} \frac{(1 + \gamma_r)^2}{2\gamma_r}. \quad \text{Equation (9)}$$

Figure 19:
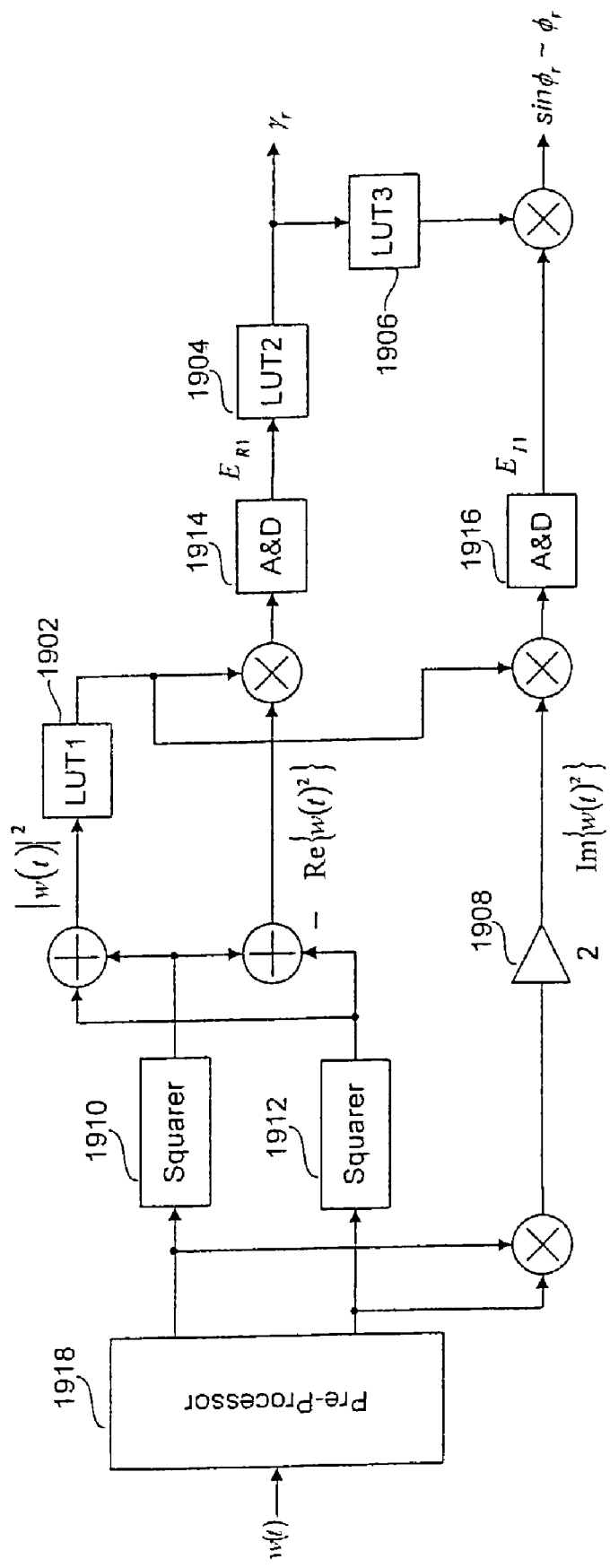
FIG. 19 illustrates an exemplary implementation of a receiver compensation factor estimator, according to embodiments of the present invention.

According to an embodiment of the present invention, the estimations shown in Equation 8 and Equation 9 may be implemented by the circuit shown in FIG. 19. The first look-up table (LUT1) block 1902 may be based on read-only memory (ROM) that maps the input $|w(t)|^2$ to its inverse (i.e. $1/|w(t)|^2$. The second look-up table (LUT2) block 1904 and third look-up table (LUT3) block 1906 may be ROMs that map their inputs $E_{R1}$ and $\gamma_r$ to $$\frac{1 - E_{RI}}{1 + E_{RI}}$$

and $$-\frac{(1 + \gamma_r)^2}{2\gamma_r},$$

respectively. The multiplication by 2 block 1908 may be implemented as a right shift by one bit position on the signal line. The accumulate-and-dump (A&D) blocks 1914, 1916 output the accumulated result after N clock cycles and scale the output by 1/N, effectively implementing the mean of the input over N samples. The squarer blocks 1910, 1912 may be implemented directly as a multiplier with its inputs shorted together. However, because it effectively has only one input rather than two inputs as in a multiplier, optimization well-known in the art may be applied to reduce its complexity compared to that of a direct implementation with a multiplier.

Figure 20C:
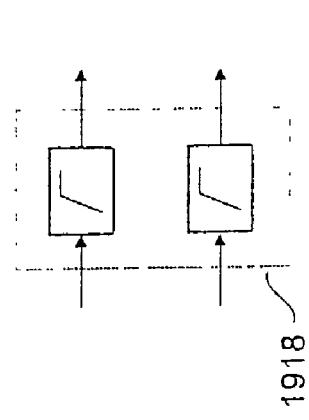
FIGS. 20A through 20E illustrate exemplary implementations of a pre-processor for use with a compensation factor estimator, according to embodiments of the present invention.

Because the receiver compensation factor estimator 726 is sensitive to noise as well as DC offsets generated by the RF front-end and the ADCs 722, 724, in one embodiment a pre-processor 1918 is used to remove the DC offsets and/or to reduce noise. Various implementations of the pre-processor 1918 may be used, examples of which are shown in FIGS. 20A through 20E. FIG. 20A shows an implementation of the pre-processor 1918 based on a pair of bandpass filters with programmable taps that may be used to both remove the DC offset as well as to reduce the noise. The programmable taps are used to center the passband on the transmitted test signal. According to another embodiment, to reduce complexity, a cascade of highpass and lowpass filters may be used, where the highpass filter defines the upper corner frequency and the lowpass filter defines the lower corner frequency of the passband. Each filter accepts either the real (i.e. I-channel) or the imaginary part (i.e. Q-channel) of the received complex signal. In embodiments where multiple tones are used as the test signal, a filter bank should be applied where each filter's passband centers on one of the transmitted tones.

Figure 20B:
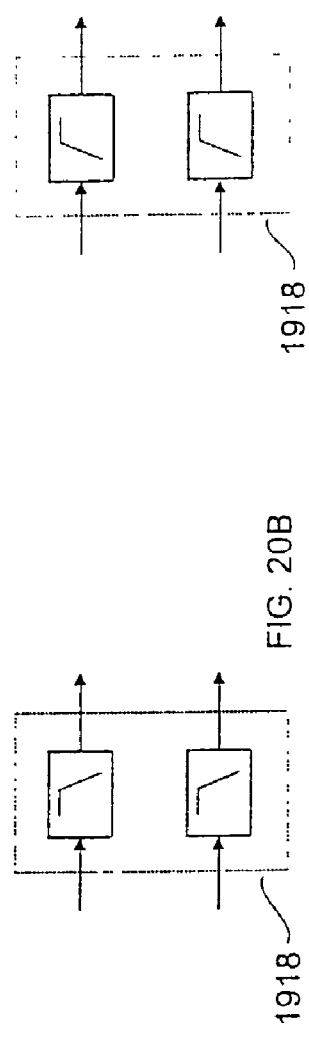
Figure 20A:
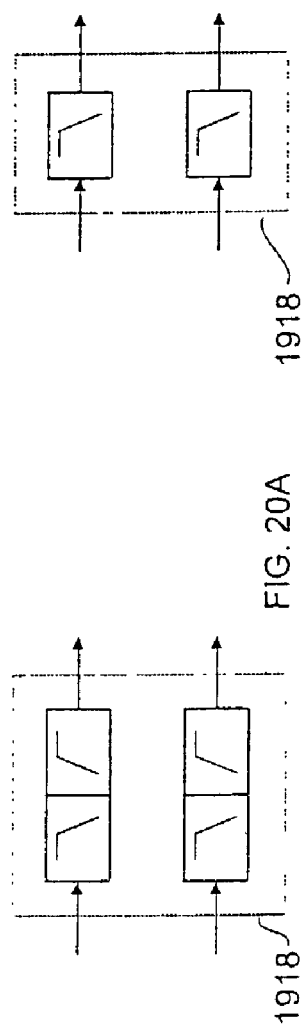

Another embodiment of the pre-processor 1918 is shown in FIG. 20B, which shows an implementation where only lowpass filters are used. Such implementation would be applicable when the RF front-end and ADCs 722, 724 have low DC offset. This would be true, for example, in superheterodyne receivers and receivers with built in DC offset cancellation.

Yet another embodiment of the pre-processor 1918 is shown in FIG. 20C, which shows an implementation where only highpass filters are used, assuming that the test signal has a high signal-to-noise ratio (SNR). This usually is true for local calibration but is not true for remote calibration where the test signal is transmitted by a remote transmitter.

Figure 20E:
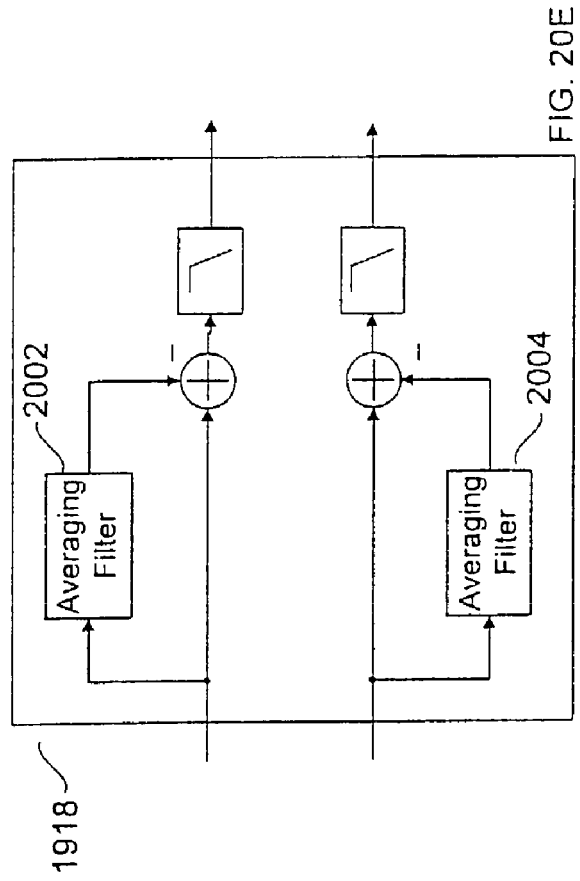
Figure 20D:
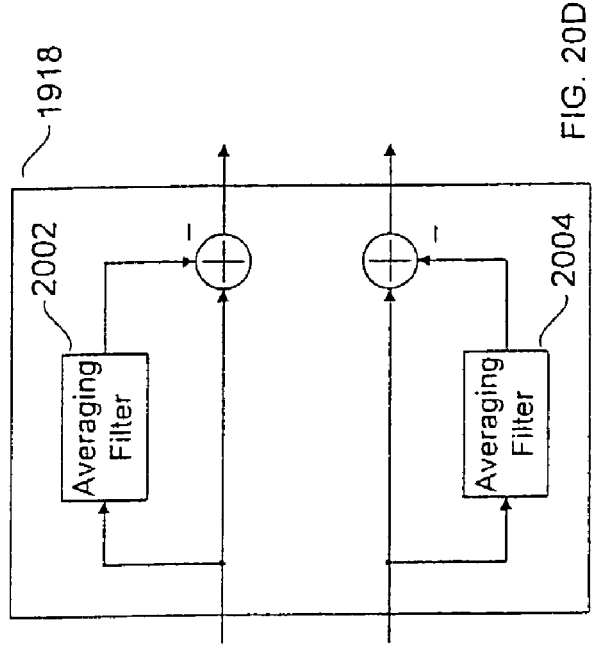

For a remote transmitter, FIG. 20A or FIG. 20E should be used. In FIG. 20E, the highpass filter has been replaced by a feed-forward DC cancellation circuit that measures the DC offset using averaging filters 2002 and 2004 and uses the estimated DC offset to cancel out the DC offset in the incoming signal. The averaging filters 2002 and 2004 may be implemented with low complexity, for example, as an accumulator or accumulate and dump. FIG. 20D shows an implementation with the DC offset cancellation circuit only, which may be used when the transmitted test signal has a high SNR.

Many other variations exist in the implementation of Equation 8 and Equation 9. According to another embodiment of the present invention, one variation may be obtained by substituting Equation 8 into Equation 9, which may be implemented by the circuit shown in FIG. 21. The first look up table block (LUT1) 2102 is a look-up table based on read-only memory (ROM) that maps the input $|w(t)|^2$ to its multiplicative inverse (i.e. $1/|w(t)|^2$). The second and third look up table blocks 2104 and 2106 (LUT2 and LUT3, respectively) are ROM's that map their inputs $E_{R1}$ to $$\frac{1 - E_{RI}}{1 + E_{RI}}$$

and $$-\frac{2}{1 - E_{RI}^2},$$

respectively. Pre-processor 2118, A&D blocks 2114, 2116, multiplication by 2 block 2108 and squarer blocks 2110, 2112 perform similar functions to those described for similar blocks in relation to FIG. 19.

Figure 21:
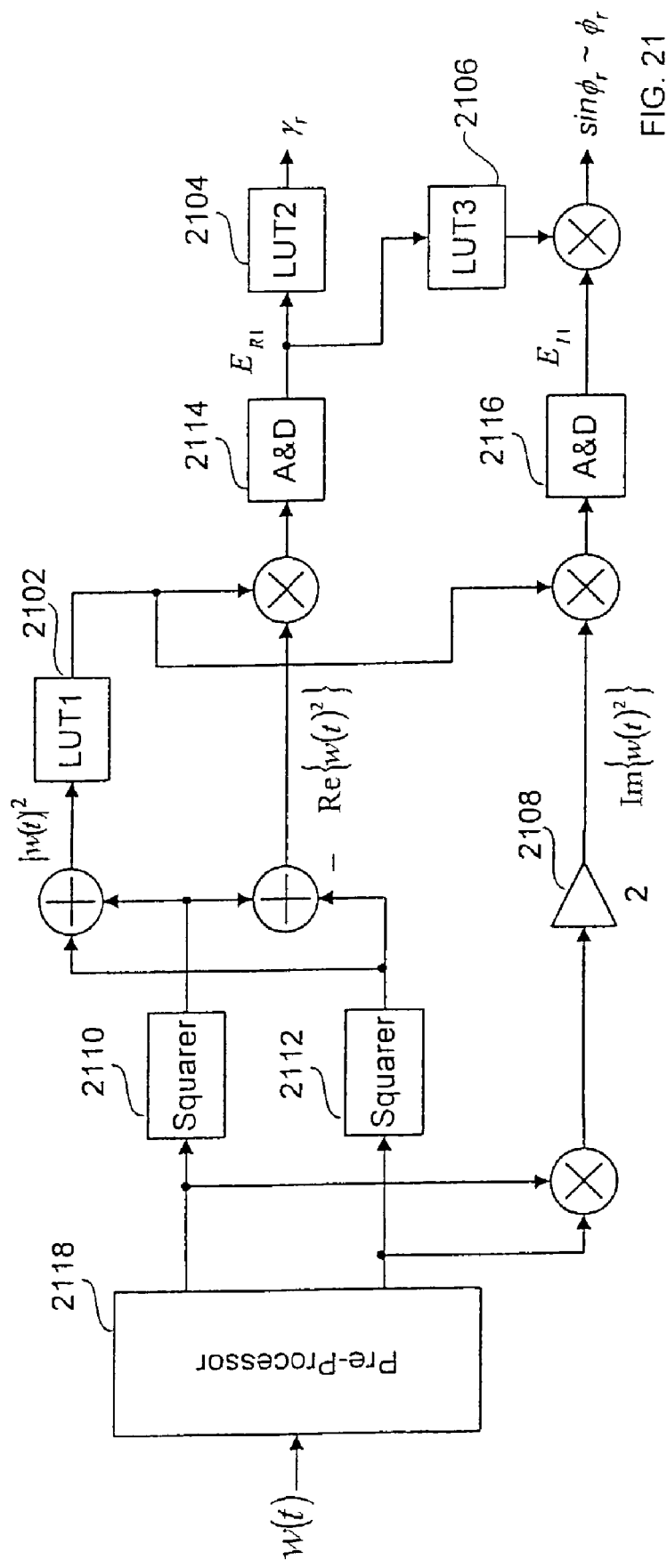
FIGS. 21 through 25 illustrate exemplary implementations of a receiver compensation factor estimator, according to embodiments of the present invention.
Figure 22:
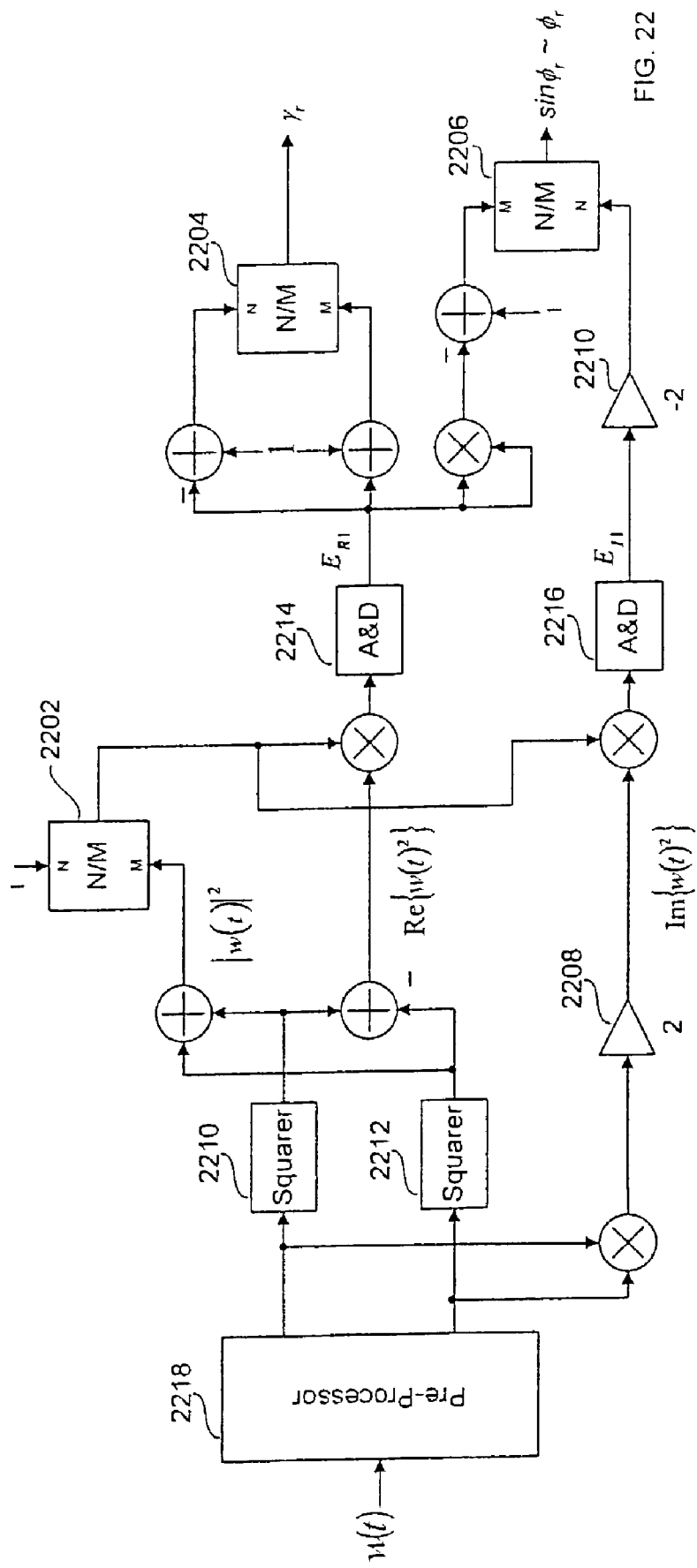

Yet another embodiment of the present invention is shown in FIG. 22. As shown in FIG. 22, another variation may be derived by implementing the divide function directly using dividers 2202, 2204 and 2206 rather than using the table-look-up approach illustrated in FIG. 19 and FIG. 21. Pre-processor 2218, A&D blocks 2214, 2216, multiplication by 2 block 2208 and squarer blocks 2210, 2212 perform similar functions to those described for similar blocks in relation to FIG. 19. The squarer blocks 2210 and 2212 receive an input and multiply the input by itself to generate the square of the input.

Finally, if the application requires the receiver to operate with large phase mismatches, the phase may be more precisely computed by taking the arcsine of the expression in Equation 9, namely $$\arcsin\left(-E_{I1}\frac{(1+\gamma_r)^2}{2\gamma_r}\right).$$

The arcsine may be implemented using, for example, a look-up table (not shown).

A.5 Estimation of I-Q Imbalance at the Receiver with Separate Means

The above-described estimation is based on the operation described in Equation 5. According to further embodiments of the present invention, another implementation of the receiver compensation factor estimator 726 may be derived from the following slightly different operation whereby the mean is taken separately for the square of the received signal and the magnitude square of the received signal as shown below $$\frac{\text{mean}(w(t)^2)}{\text{mean}(|w(t)|^2)} = E_{R2} + jE_{I2}. \qquad \text{Equation (10)}$$

By expanding Equation 10, it can be shown that $\phi_r$ and $\gamma_r$ may be determined by solving the following set of equations:

$$E_{R2} = \frac{1-\gamma_r^2}{1+\gamma_r^2} \qquad \text{Equation (11)}$$

$$E_{I2} = \frac{-2\gamma_r \sin\phi_r}{1+\gamma_r^2}. \qquad \text{Equation (12)}$$

Again, there are many possible methods for solving $\phi_r$ and $\gamma_r$ in Equation 11 and Equation 12, including, but not limited to, applying Newton Raphson method; applying the two-dimensional Taylor's approximation to simplify Equation 11 and Equation 12; applying one-dimensional Taylor's approximation to represent $\cos\phi_r$ and $\sin\phi_r$ as polynomials; or a combination of the above-described methods.

When the one-dimensional Taylor's approximation is used to simplify $\sin\phi_r$ as $\phi_r$, it follows that the amplitude and phase mismatch at the receiver may be estimated as $$\gamma_r \approx \sqrt{\frac{1-E_{R2}}{1+E_{R2}}} \qquad \text{Equation (13)}$$

$$\phi_r \approx -E_{I2}\frac{1+\gamma_r^2}{2\gamma_r}. \qquad \text{Equation (14)}$$

Figure 23:
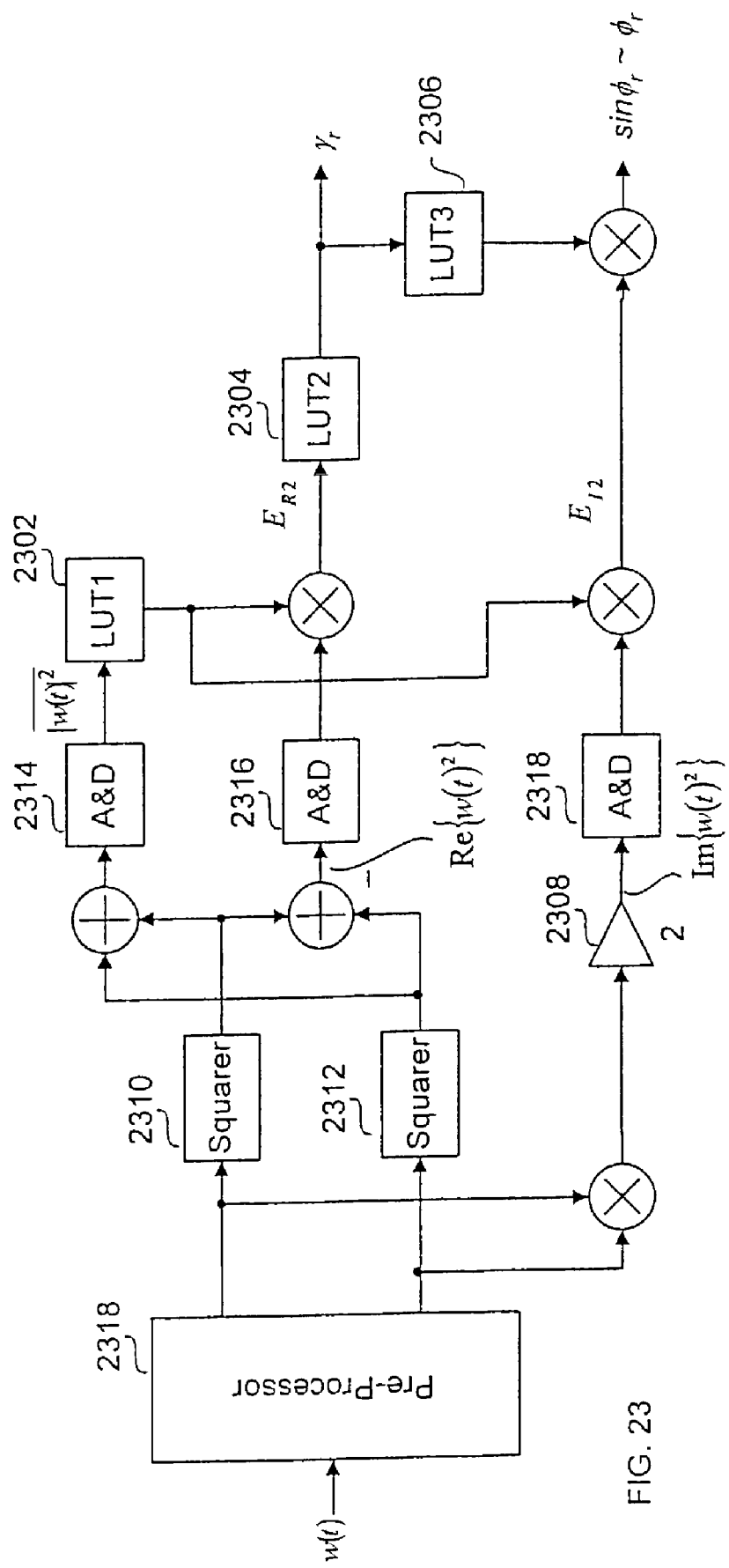

In one embodiment, the estimations shown in Equation 13 and Equation 14 may be implemented by the circuit shown in FIG. 23. The first look-up table (LUT1) block 2302 may be based on ROM that maps the input $\overline{|w(t)|^2}$ to its multiplicative inverse (i.e. $1/\overline{|w(t)|^2}$). The second look-up table (LUT2) block 2304 and third look-up table (LUT3) block 2306 may be ROMs that map their inputs $E_{R2}$ and $\gamma_r$ to $$\sqrt{\frac{1-E_{R2}}{1+E_{R2}}}$$

and $$-\frac{(1+\gamma_r^2)}{2\gamma_r},$$

respectively. The multiplication by 2 2308 may be implemented as a right shift by one bit position on the signal line. The accumulate-and-dump (A&D) blocks 2314, 2316, 2318, squarer blocks 2310, 2312 and pre-processor block 2318 perform similar functions to those described for similar blocks in relation to FIG. 19.

Figure 24:
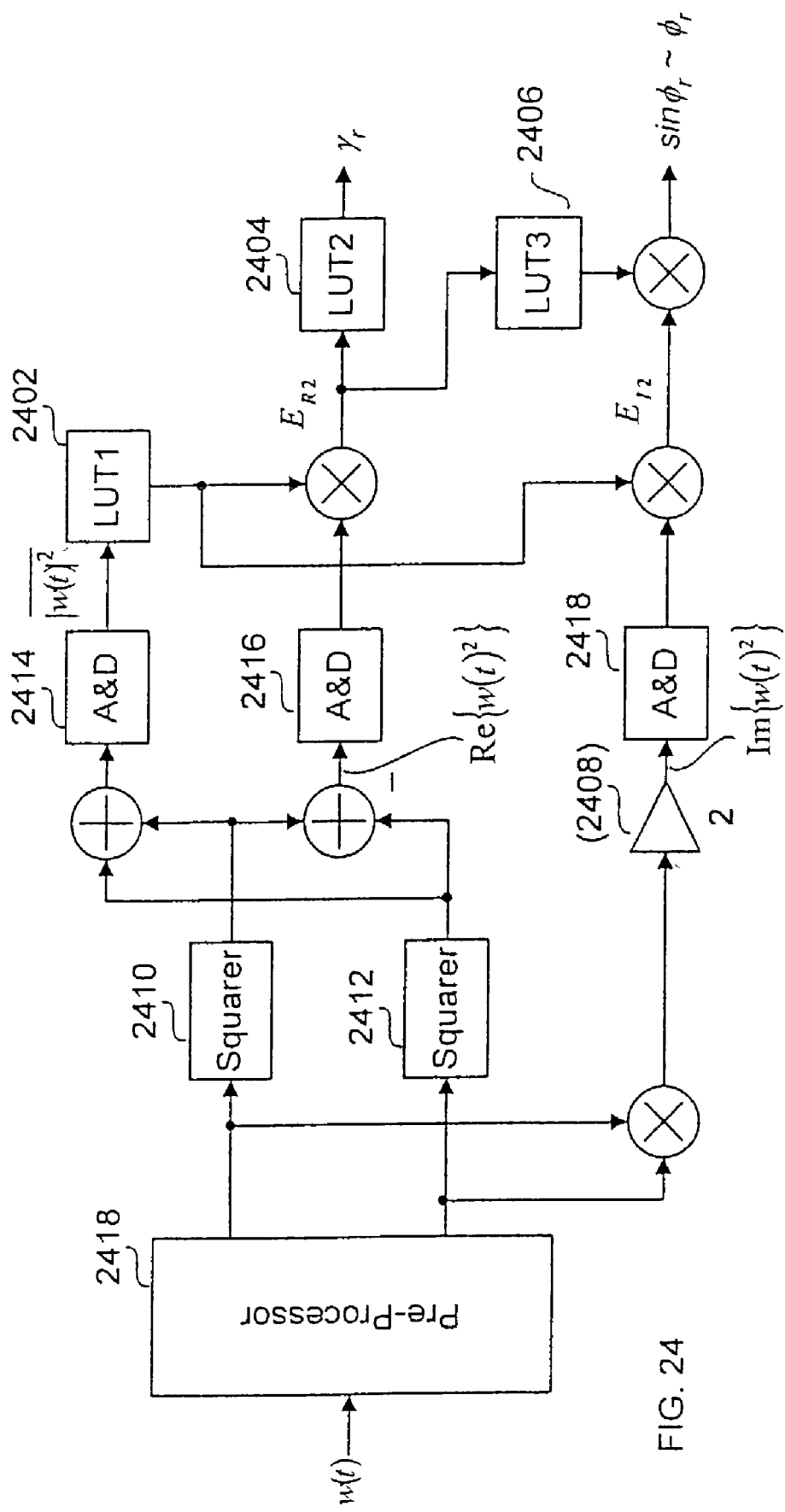

Many other variations exist in the implementation of Equation 13 and Equation 14. According to another embodiment of the present invention, one variation may be obtained by substituting Equation 13 into Equation 14, an implementation of which is shown in FIG. 24. The first look-up table block (LUT1) 2402 is a look-up table based on read-only memory (ROM) that maps the input $\overline{|w(t)|^2}$ to its multiplicative inverse (i.e. $1/\overline{|w(t)|^2}$). Note that $\overline{|w(t)|^2}$ denotes the mean of $|w(t)|^2$ and in general, a bar above a variable indicates the mean of the variable. The second and third look-up table blocks (LUT2) 2404 and (LUT3) 2406 are ROM's that map their input $E_{R2}$ to $$\sqrt{\frac{1-E_{R2}}{1+E_{R2}}}$$

and $$-\frac{1}{\sqrt{1-E_{R2}^2}},$$

respectively. The accumulate-and-dump (A&D) blocks 2414, 2416, 2418, squarer blocks 2410, 2412 and pre-processor block 2418 perform similar functions to those described for similar blocks in relation to FIG. 19.

Figure 25:
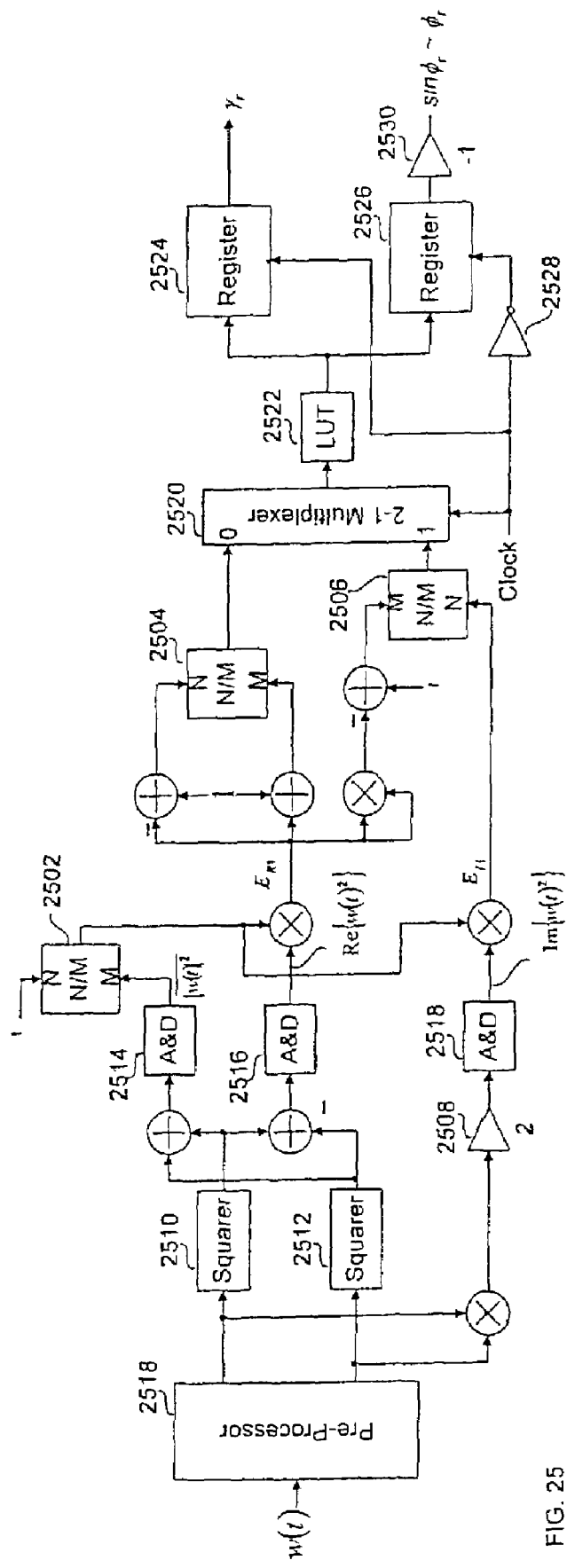

Yet another embodiment of the present invention is shown in FIG. 25. As shown in FIG. 25, another variation may be derived by implementing the divide function directly using dividers 2502, 2504 and 2506 rather than using the table-look-up approach illustrated in FIG. 23 and FIG. 24. The look-up table block (LUT) 2522 in FIG. 25 maps its output to the square root of its input. The 2-1 multiplexor 2520 and the two output registers 2524, 2526 allow the LUT block 2522 to be time shared by the rest of the circuit. The control line comprises a clock signal. The clock signal is provided directly to multiplexor 2520. The clock signal is also provided directly to register 2524 and is provided to register 2526 through inverter 2528. When the clock is low the input port with index zero of the 2-1 multiplexor 2520 is selected and when the clock is high the input port with index one of the 2-1 multiplexor 2520 is selected. The register 2524 latches in the LUT block 2522 result when the clock goes from low to high and the register 2526 latches in the LUT block 2522 result when the clock goes from high to low. To minimize clock skew, the delay of the inverter 2528 should be shorter than the delay of the LUT 2522. The accumulate-and-dump (A&D) blocks 2514, 2516, 2518, squarer blocks 2510, 2512 and pre-processor block 2518 perform similar functions to those described for similar blocks in relation to FIG. 19. Block 2530 performs a sign inversion of its input, converting its input from a positive number to a negative number, and vice versa.

Finally, if the application requires the receiver to operate with large phase mismatches, the phase may be more precisely computed by taking the arcsine of the expression in Equation 14. The arcsine may be implemented using for example a look-up table (not shown).

A.6 Compensation Factors for the Receiver

According to embodiments of the present invention, at the receiver the compensation factors may be computed from the estimated I-Q imbalance in a number of ways. Referring again to FIG. 16A, the compensation factors $\tan\phi_r$ and $\cos\phi_r$ may be obtained, for example, through look-up tables or they may be approximated as polynomials. Then, $(\gamma_r \cos \phi_r)^{-1}$ may be obtained through multiplying the estimated $\gamma_r$ with the output of the LUT for the cosine term and obtaining the multiplicative inverse through another LUT. Fewer LUT's may be used if further approximations are used. For example, with the following approximations $\tan\phi_r \approx \phi_r$ and $\cos \phi_r \approx 1$, the phase mismatch estimate $\phi_r$ may be used as a compensation factor in place of $\tan\phi_r$ and only one LUT is needed to obtain the multiplicative inverse of $\gamma_r$, which is an approximation of $(\gamma_r \cos \phi_r)^{-1}$.

Referring again to FIG. 16B, the alternative compensation factors $\gamma_r \sin\phi_r$ and $(\gamma_r \cos \phi_r)^{-1}$ may again be obtained, for example, through look-up tables or they may be approximated as polynomials. In this case, $\sin\phi_r$ does not need to be approximated because it may be obtained directly from the receiver compensation factor estimator 726. The receiver compensation factor estimator 726, in fact, generates as one of its two outputs $\sin\phi_r$ and uses it to estimate $\phi_r$. The other output produces the estimate for $\gamma_r$. Therefore, the two outputs of the receiver compensation factor estimator 726 may be multiplied to obtain $\gamma_r \sin\phi_r$. Finally, the compensation factor $(\gamma_r \cos \phi_r)^{-1}$ may be obtained as previously described.

A.8 Estimation of I-Q Imbalance at the Transmitter

According to embodiments of the present invention, estimation of I-Q imbalance at the transmitter may be performed once the receiver imbalance has been compensated. The received signal then becomes $$\frac{G_c a_r a_t e^{j(\alpha_t - \alpha_r)}(1 + j\gamma_t Q e^{j\phi_t})}{2} e^{j(\omega_{IF} t + \Delta\omega t + \Delta\theta)}, \quad \text{Equation (15)}$$

where the image has been eliminated. Because multiple unknown parameters still remain in the received signal, the transmitter imbalance cannot be directly estimated with one measurement. Rather, according to one embodiment, the following procedure, illustrated in the flowchart shown in FIG. 26, may be used to obtain the estimates with three separate measurements, whereby the I-Q symbols are set to three fixed values for each measurement. At S2602, I and Q symbols may be set to A and zero, respectively, where A is an arbitrary constant. However, this is not a requirement and may not be performed in some embodiments. The test signal is then transmitted. At S2604, a determination is made as to whether or not receiver I-Q compensation factors are available. If they are not (No), then the receiver imbalance is estimated at S2606. The receiver imbalance is then compensated at S2608. If it is determined that compensation factors are available at S2604 (Yes), then the receiver imbalance is compensated at S2608 using the available compensation factors without performing an estimation at S2606. At S2610, the value y is computed and stored. The I-Q symbols are then set to zero and A, respectively at S2612. The receiver imbalance is then compensated at S2614. At S2616, the value x is computed and stored. The I-Q symbols are then both set to A at S2618. The receiver imbalance is then compensated at S2620. At S2622, the value z is computed and stored.

As described above, each time a new symbol is transmitted as a test signal, the receiver imbalance is compensated, at S2608, S2614 and S2620, prior to computing the mean of the magnitude square of the received signal, at S2610, S2616 and S2622. The intermediate computations x, y, and z may be computed in any order. Once computed, the transmitter imbalance may be estimated by the following computation $$\gamma_t \approx \sqrt{\frac{x}{y}} \quad \text{Equation (16)}$$

$$\phi_t \approx \left(1 - \frac{z}{y} + \frac{x}{y}\right)\frac{1}{2\gamma_t}. \quad \text{Equation (17)}$$

Figure 27:
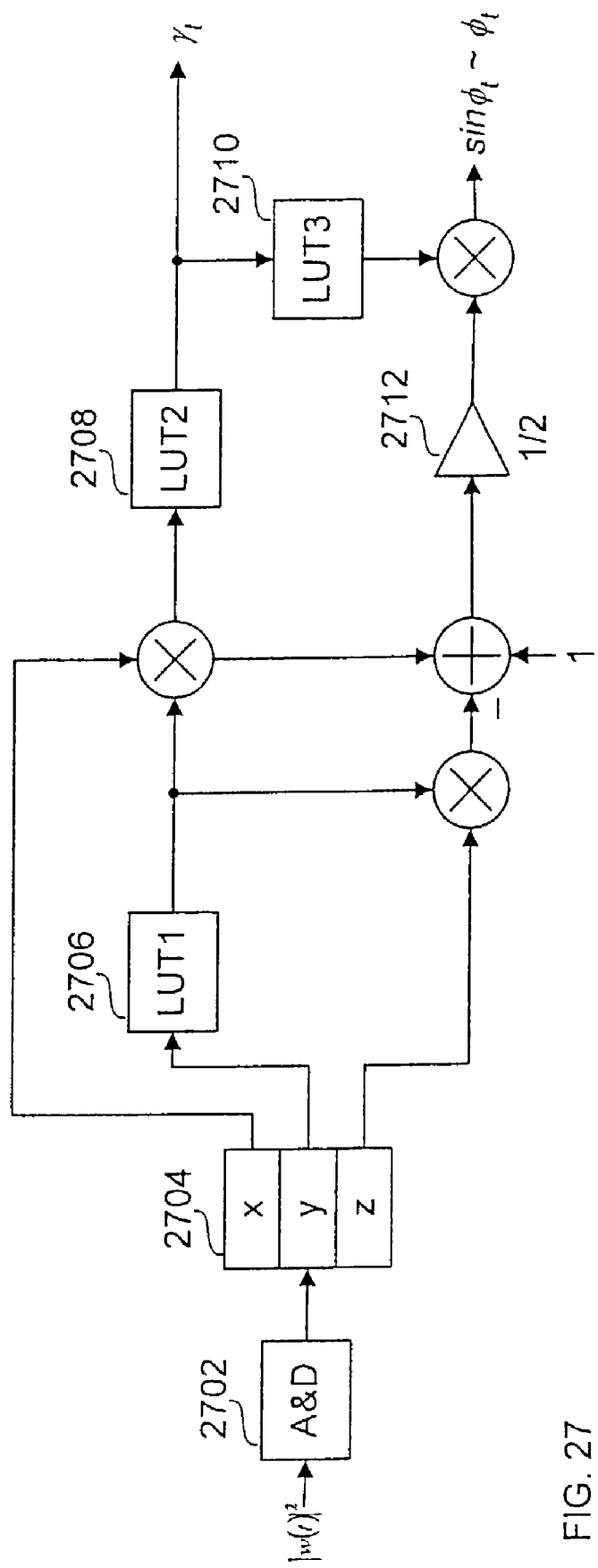
FIG. 27 illustrates an exemplary implementation of a transmitter compensation factor estimator, according to embodiments of the present invention.

Many implementations are possible for Equation 16 and Equation 17. In one embodiment, the estimations shown in Equation 16 and Equation 17 may be implemented by the circuit shown in FIG. 27, where the first look up table (LUT1) block 2706 and the third look up table (LUT3) block 2710 implement the multiplicative inverse and the second look up table (LUT2) block 2708 implements the square root. LUT1 2706, LUT2 2708, LUT3 2710 may be implemented by ROM's. The multiplication by ½ block 2712 may be implemented as a left shift by one bit. The input is assumed to have already been pre-processed by a pre-processor such as one of those shown in FIGS. 20A through 20E. The intermediate signals x, y, and z in block 2704 that are provided as an output of A&D block 2702 may be computed using some of the computation resources already available in the receiver compensation factor estimator. For instance, the squarers 1910 and 1912, and adder that generates $|w(t)|^2$, as well as the pre-processor 1918, may be reused.

A.9 Compensation Factors for the Transmitter

At the transmitter, the compensation factors may be computed from the estimated I-Q imbalance in a number of ways. For the case shown in FIG. 17A, $\tan\phi_t$ and $\cos \phi_t$ may be obtained through look-up tables or they may be approximated by polynomials. Then, $(\gamma_t \cos\phi_t)^{-1}$ may be obtained through multiplying the estimated $\gamma_t$ with the output of the LUT for the cosine term and obtaining the multiplicative inverse through another LUT. Fewer LUT's may be used if further approximations are used. For example, with the following approximations $\tan\phi_t \approx \phi_t$ and $\cos\phi_t \approx 1$, the phase mismatch estimate $\phi_t$ may be used as the compensation factor in place of $\tan\phi_t$, and only one LUT is needed to obtain the multiplicative inverse of $\gamma_t$, which is an approximation of $(\gamma_t \cos \phi_t)^{-1}$.

As an alternative, as shown in FIG. 17B, the compensation factors are $\gamma_t \sin\phi_t$ and $(\gamma_t \cos \phi_t)^{-1}$. Again, look-up tables and polynomial approximations may be used.

In this case, $\sin\phi_t$ does not need to be approximated because it may be obtained directly from the imbalance estimator. The estimator in fact generates as one of its two outputs $\sin\phi_t$ and uses it to estimate $\phi_t$. The other output of the estimator produces the estimate for $\gamma_t$. Therefore, the two outputs of the estimator may be multiplied to obtain $\gamma_t \sin\phi_t$. Finally, the compensation factor $(\gamma_t \cos \phi_t)^{-1}$ may be obtained as previously described.

A. 10 Convergence of Estimations

Figure 28:
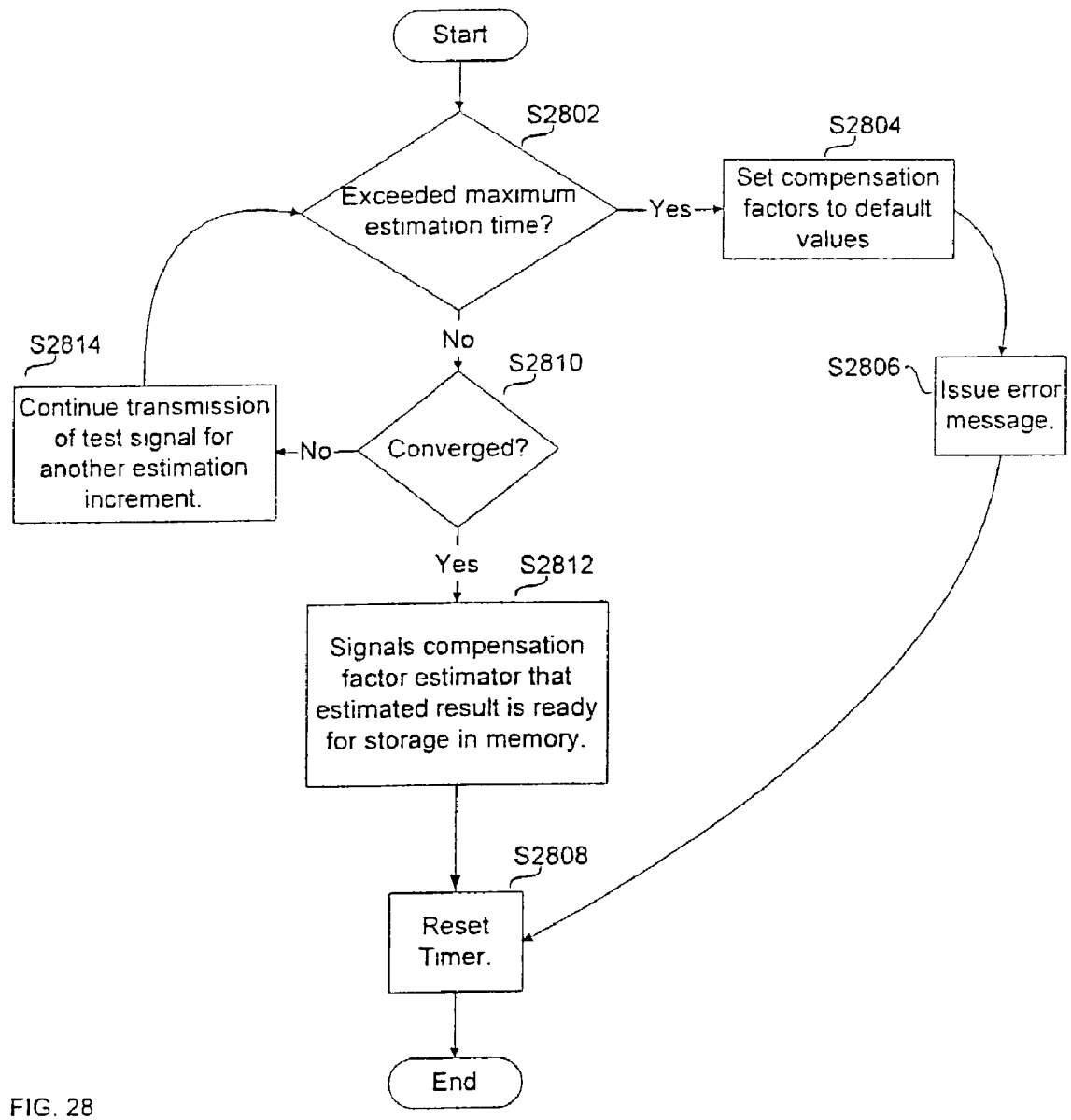
FIG. 28 shows a flowchart illustrating an example of a control flow for ensuring that compensation factors have converged to within a given tolerance, according to embodiments of the present invention.

In some embodiments it may be desirable to ensure that the compensation factors have converged to within a given tolerance. In that case, a procedure such as that illustrated by the flowchart shown in FIG. 28 may be used. For every estimation, a timer may be used to keep track of the amount of time spent so far in the estimation. It is determined at S2802 whether or not the estimation has exceeded the maximum time allowed. If so (Yes), then at S2804 the compensation factors are set to certain default values and an error message is issued at S2806, that informs the system that convergence is not obtainable during calibration. The timer is then reset at S2808. If the maximum time has not been exceeded (No at S2802), a convergence test is performed at S2810 to determine if the estimations have reached the given required tolerance. If the tolerance is reached (Yes), the controller signals the estimation block at S2812 that the estimated result is ready for storage in memory. The controller also resets the timer at S2808 and ends the convergence test. If the tolerance is not reached (No at S2810), the controller requests the transmitter at S2814 to continue transmission of the test signal for an incremental duration of $\Delta t_{inc}(n)$, where n indexes the number of increments. The procedure is then repeated.

Note that $\Delta t_{inc}(n)$ will be referred to as an estimation increment. The index n will be referred to as the estimation increment index. For each incremental duration, a new estimation result is generated based on the additional time allowed for the estimation. The amount of increment may be different each time. At the $n^{th}$ increment, the total estimation time is equal to the initial estimation time $t_0$ plus the sum total of all the estimation increments up to the $n^{th}$ increment; that is $$t_0 + \sum_{k=0}^{n} \Delta t_{inc}(k)$$

According to embodiments of the present invention, many ways are possible to test for convergence. Three example methods are described below.

A.10.1 First and Second Order Statistics of Input Signal

According to one embodiment, the input to the imbalance estimator may be denoted by $e_R + je_I$, where $e_R$ is the real part and $e_I$ is the imaginary part of the input. Then, the estimation has converged to a given tolerance $\delta$ if the following inequality is met $$f(\overline{e_R}, \overline{e_I}, \sigma(e_R), \sigma(e_I)) \leq \delta, \qquad \text{Equation (18)}$$

where $\overline{e_R}$ denotes the mean of $e_R$, $\overline{e_I}$ denotes the mean of $e_I$, $\tau(e_R)$ denotes the standard deviation of $e_R$, $\tau(e_I)$ denotes the standard deviation of $e_I$, and $f(\bullet)$ denotes a function that depends on the estimator and may be derived by applying partial differentiation to the set of equations that relate the estimator inputs to its outputs. The mean and standard deviations are performed over multiple estimation increments.

For instance, for the estimators shown in FIG. 19, FIG. 21, and FIG. 22, the inputs may be $e_R = E_{R1}$ and e, $e_I = E_{I1}$. By applying partial differentiation to Equation 8 and Equation 9, the conditions for convergence can be determined to be $$\frac{-2\sigma(E_{R1})}{(1+\overline{E_{R1}})^2} \leq \delta_\gamma \qquad \text{Equation (19)}$$

$$\frac{-2}{1-\overline{E_{R1}}^2}\sigma(E_{I1}) + \frac{4E_{R1}E_{I1}}{(1-\overline{E_{R1}}^2)^2}\sigma(E_{R1}) \leq \delta_\phi, \qquad \text{Equation (20)}$$

where $\delta_\gamma$ and $\delta_\phi 0$ are the tolerances for the gain and phase mismatches, respectively.

The inputs $e_R$ and $e_I$ can also be taken before the accumulate and dump blocks 914 and 916 in FIG. 19, or 2114 and 2116 in FIG. 21, or 2214 and 2216 in FIG. 22, respectively. In this case, the test for convergence does not depend on the accumulate and dump whose output runs at a rate that is N times lower than its input, where N is the number of input samples used to compute the mean of the input. Therefore, in this case, the convergence test can be performed more quickly.

Similarly, for the estimators shown in FIG. 23-25, the inputs may be $e_R = E_{R2}$ and $e_I = E_{I2}$. For quicker convergence, the inputs $e_R$ and $e_I$ may also be taken from the inputs of the accumulate and dump 2316 and 2318 in FIG. 23, or 2416 and 2418 in FIG. 24, and 2516 and 2518 in FIG. 25, respectively.

A.10.2 Standard Deviation of Estimates

According to other embodiments, instead of using the input to the estimator, the output of the estimator may be used to determine if the estimation has converged by taking the standard deviation of the estimated gain and phase mismatches. The estimation is declared to have reached convergence if its standard deviation is less than a threshold. In this case, multiple estimates are needed over multiple estimation increments to obtain the standard deviation and therefore could prolong the estimation process. Taking the statistics over the input signal before the accumulate and dumps as described in Section A.10.1 allows a faster convergence test because the statistics may be generated even with the initial estimation (without any increments).

A.10.3 Running Mean of Estimates

Similarly, a running mean of the estimator output may be computed over either a finite or infinite window to determine convergence. As an example, let x(n) be the running mean of the estimated results over multiple increments, where n indexes the number of estimation increments for a given test signal. Then, the convergence test may be based on the following $$x(n) - x(n-1) \leq \delta, \qquad \text{Equation (21)}$$

where $\delta$ is the required tolerance. Note for Equation (21), n should start from one and x(0) indicates the estimation result without any increments.

As an example, x could be $\gamma_r$ or $\sin\phi_r$ in FIG. 19 and FIG. 21-25 for the receive compensation factor estimator 726. As another example, x could also be $\gamma_t$ or $\sin\phi_t$ in FIG. 27 and FIG. 35.

B. Applicability to Other Architectures

Figure 29:
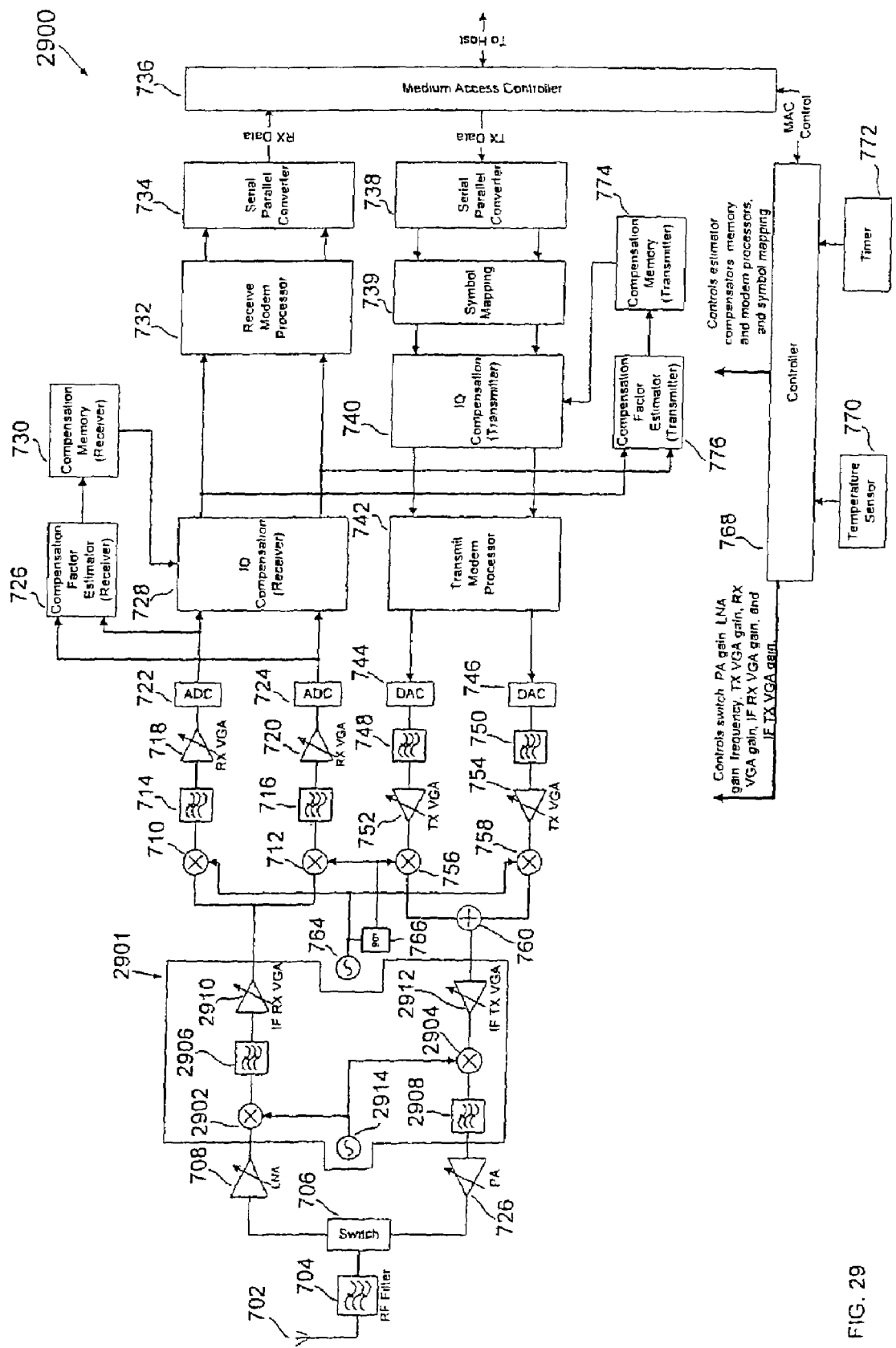
FIG. 29 illustrates a block diagram of a superheterodyne transceiver, according to embodiments of the present invention.

While the above compensation scheme is described using the direct-conversion architecture as an example, it is not so limited and may be applied to any other front-ends with quadrature converters. For example, FIG. 29 shows an embodiment of the invention's I-Q compensation method applied to a superheterodyne transceiver 2900, wherein similar features to those of FIG. 7 are represented by similar reference numbers. The front end of superheterodyne transceiver 2900 differs from transceiver 700 in that it includes intermediate frequency (IF) block 2901, which converts the received signal down to an IF and the transmitted signal up to a radio frequency (RF). IF block 2901 includes mixer 2902, 2904, oscillator 2914, filters 2906, 2908, IF receiver VGA 2910 and IF transmitter VGA 2912. Mixers 710, 712, 756, 758, oscillator 764 and phase shifter 766 all operate in the IF frequency rather than RF as in 700.

C. Remote Calibration in Real-time

Because the compensation factor estimator is not sensitive to frequency offset and transmitter imbalance, according to embodiments of the present invention the calibration process described above may be performed with a remote unit in real-time. For example, according to one embodiment, during a transmission, one or more test signals may be transmitted as part of a preamble, midamble, and/or postamble of a message.

FIGS. 30A-D show exemplary message formats, according to embodiments of the present invention. As shown in FIG. 30A, in one embodiment the message may include a data field 3002, a cyclic redundancy check (CRC) field 3004 and a preamble field 3006. The data field 3002 of the message may include, for example, user data and control data, as well as a header including information that may be used by the modem to perform certain reconfiguration functions. CRC 3004 ensures the integrity of the entire data field of the message. In addition to CRC 3004, the header may also contain its own CRC to ensure integrity of the control information contained in the header. In the embodiment shown in FIG. 30A, the test signal may be contained in the preamble field 3006 of the message.

In an alternative embodiment of a message format shown in FIG. 30B, the message includes two data fields 3008 and 3010, with a midamble field 3012 included therebetween. The message also includes CRC field 3014. In the embodiment shown in FIG. 30B, the test signal may be contained in the midamble field 3012 of the message.

In a further embodiment of a message format shown in FIG. 30C, the message includes a data field 3016, a CRC field 3018 and a postamble field 3020. In the embodiment shown in FIG. 30C, the test signal may be contained in the postamble field 3020 of the message.

In yet a further embodiment of a message format shown in FIG. 30D, the message includes multiple data fields 3022, 3024, and 3026. Although three data fields are shown in FIG. 30D, the present invention is not so limited. In other embodiments, there may be as many data fields as required. Similarly, in other embodiments, there may be as many midamble fields as required. The message further includes a CRC field 3028. In addition, the message includes a preamble field 3030, midamble fields 3032 and 3034, and postamble field 3036. In the embodiment shown in FIG. 30D, the test signal may be contained in any or each of the preamble field 3030, the midamble fields 3032 and 3034 and the postamble field 3036 of the message.

Using the test signals in the preamble, midamble, and/or postamble fields of the message, the receiving unit may estimate the receiver imbalance as described above in relation to FIGS. 12A and 12B. In cases where the message may be long in duration, more than one midamble, as shown in FIG. 30D, may be used so that the imbalance compensation, or other receiver processes such as AFC and synchronization, may be updated. For shorter messages, only one preamble, midamble, or postamble may be needed, as shown in FIGS. 30A, 30B and 30C. The estimated compensation factors may either be stored in receiver compensation memory 730 and transmitter compensation memory 774 for later use or determined for each transmission and applied immediately. Moreover, depending on the design of the modem, the test signal may also be used for synchronization, AGC, as well as AFC and phase recovery. Otherwise, other waveforms may be added to the test signal to provide means for the modem to obtain synchronization, AGC, AFC and phase recovery.

In embodiments where the test signal is transmitted as part of the preamble, the receiver may use the compensation factors estimated from the preamble immediately on the data that follows the preamble. In embodiments where the test signal is transmitted as part of the midamble and/or postamble, a message buffer may be needed to store the message so that the compensation factors may be determined first and then applied to the data field of the message stored in the buffer. According to one embodiment using a message buffer, the message buffer is implemented using double buffering that comprises two cascaded buffers. In this way, while the compensation processing is being performed on the second buffer, a new incoming message may be stored in the first buffer. After processing of the data in the second buffer is complete, the data in the first buffer may be transferred to the second buffer, allowing the next message to be stored in the first buffer.

Figure 26:
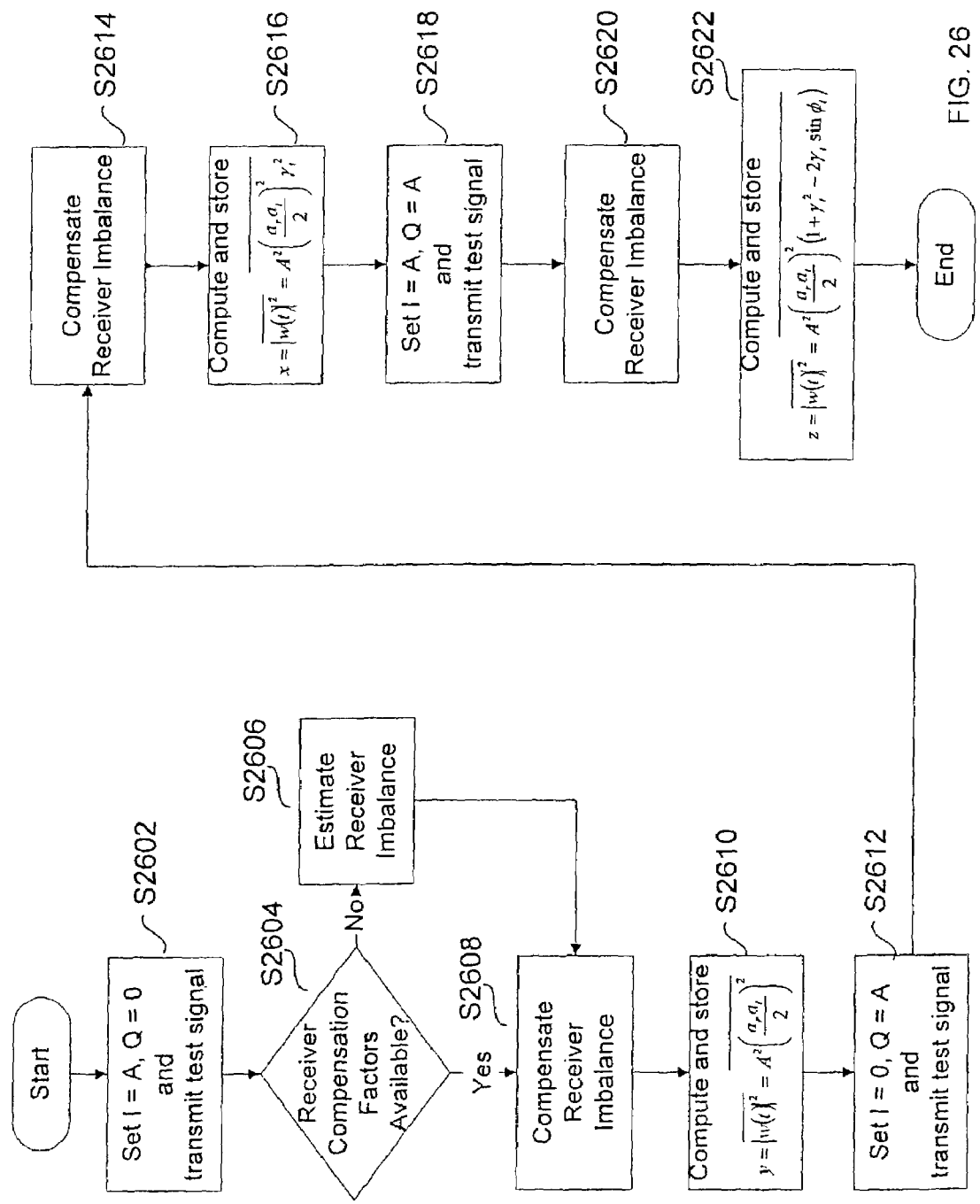
FIG. 26 shows a flowchart illustrating an example of a control flow for estimating transmitter compensation factors according to embodiments of the present invention.

According to embodiments of the present invention, for transmitter calibration three to four test signals may be used for each condition and should be sent with different baseband symbol values as described in relation to FIG. 26. The test signals used for calibrating the transmitter imbalance may also be used at the same time to calibrate the receiver imbalance.

One advantage of real-time calibration is that the compensation factors applied are most up to date with respect to the message being received and may therefore increase the robustness of the system in the presence of highly dynamic variation in the transmission environment, such as temperature changes. While the receiver mismatches may be readily estimated in the preamble based on the method described in Section A, according to embodiments of the present invention some modifications are required to compensate for the transmitter imbalance because previously described methods would estimate the transmitter imbalance of the remote unit and not the local unit. Several exemplary methods to solve this problem are described below. To simplify the discussion, the description of these methods primarily use the single preamble as an example, though they may easily be extended to multiple midambles, postambles, or any other combinations.

C.1 Protocol Exchange

According to embodiments of the present invention, in a peer-to-peer configuration, two units may pair up to perform calibration. First, one of the units (A) transmits to the other unit (B) with a message based on the formats illustrated in FIGS. 30A through 30D. Based on the test signal transmitted in the preamble, midamble, and/or postamble from unit A, unit B estimates the compensation factors for its own receiver as well as for the remote transmitter in unit A. Unit B may then transmit the estimated compensation factors for the remote transmitter as part of a return message from unit B to unit A. In one embodiment, in order to minimize the communication overhead, the compensation factors may be piggybacked on an existing return message from unit B to unit A, which may be an acknowledgment of the present message or a data packet destined to unit A.

Because the transmitter of unit B may not have been compensated yet, the return message should use robust modulation so that unit A may receive the message with low probability of error. Robust modulation may be obtained, for example, by using low-order modulation and/or forward-error correction (FEC). This constraint may be removed once unit B obtains the compensation factors through a reciprocal process, whereby unit A estimates the compensation factors for its own receiver as well as for the transmitter of unit B. The estimated transmitter compensation factors for unit B are then transmitted as part of a return message from unit A to unit B. The reciprocal process may be performed immediately on the return message from unit B to unit A. Robust modulation may also be applied to the message from unit A to unit B so that data may still be transmitted during calibration.

Once calibrated, high-order modulation, such as QAM, may be used because I-Q imbalance can be compensated. The receiving modem must be informed that a modulation change has occurred and to reconfigure its processing accordingly. According to some embodiments, control messages may be transmitted to allow a coordinated modulation change between the transmitter and the receiver, but at the cost of additional MAC overhead. Therefore, according to one embodiment, in order to minimize the overhead that is needed to dynamically change to the required modulation format, a header using a pre-determined robust modulation format may be introduced in the message that carries the compensation factors for the transmitter as well as modulation formats or other modem related parameters used in the data field of the transmission. The robust modulation format in the header allows the receiver to always demodulate the compensation factors and other configuration information for the modem even in the presence of imbalance from the remote transmitter without MAC level coordination. The configuration parameters contained in the header allow the modem to be reconfigured appropriately for the demodulation of the data field of the message.

An example message format with reconfiguration and control parameters in the header, according to embodiments of the present invention, is shown in FIG. 31. The content of each field is listed in Table 3. The preamble field 3102 may contain test signals that are used to estimate the compensation factors based on methods discussed earlier in Section A. The header field 3104 may contain control parameters needed for estimation as well as configuring the modem parameters on-the-fly. The estimation request may be used to inform the receiving radio that the transmitter compensation factors need to be estimated and returned to the originating transmitter. The request may also indicate if multiple estimations for different test conditions need to be performed in the present message. The estimation request may be sent in any message. For example, it may be sent as part of the return message so that calibration of the current transmitter may be started even if calibration of the other transmitter has not yet finished.

Once estimated, the transmitter compensation factors may be transmitted as part of a header field in a return message. The convergence status may be used to indicate to the originating transmitter the convergence result of the compensation factors in the header field. Alternatively, a pre-defined value such as −1 may be used to indicate indirectly that convergence for the compensation factors has not yet been achieved. In one embodiment, if multiple test signals for different test conditions are sent concurrently in one message, a multiple response identifier may be used to identify the test condition associated with the transmitter compensation factors in the header field.

Modem configurations allow the modem to reconfigure on the fly to different settings for the data field 3110 of the message. The midamble field 3108 may allow multiple test signals to be sent in one message for multiple estimations. Also, the midamble field 3108 may enable the originating transmitter to dynamically change the estimation duration by allocating additional estimation increments during the midamble field 3108 to achieve convergence. The CRC fields 3106, 3112 may contain the parity check for the associated fields within the message. The data field 3110 of the message may contain the MAC header and the MAC payload. The process to allow convergence and multiple estimation requests will be described in more detail in later sections.

TABLE 3

Fields in message format shown in FIG. 31.

| Field | Content |
| --- | --- |
| Preamble | Test signals |
| Header | Estimation request, transmitter compensation factors, convergence status, multiple response identifier, and/or modem configurations |
| Midamble | Additional test signals |
| CRC | Parity check |
| Data | MAC header and payload |

According to embodiments of the present invention, if it is desired to compensate the transmitter imbalance for different gain settings in the transmitter, the gain settings for the corresponding compensation factors in the return message may be determined from a sequence ID, packet ID, or tag ID in the return message. The compensation factors may be stored in a compensation memory so that additional return messages may be avoided once calibrated, unless an update is needed.

C.1.1 Switch Configuration

According to embodiments of the present invention, if no local calibration is performed, the switching unit 706 may be used in the same way as during normal operation. In addition, no special provisions are needed for the switching unit 706 in this case for either TDD or FDD modes. In TDD mode, a standard TDD switch shown in FIG. 8A may be used. In FDD mode, a standard frequency duplexor 778 may be used. However, if local calibration is also performed for the receiver, the switching unit 706 may be configured according to embodiments shown in FIGS. 8A through 8F as described in Section A.

C.1.2 Messaging with Multiple Estimation Requests

According to embodiments of the present invention, when it is desirable to have multiple estimations performed within one message, the sender unit may send a message that contains multiple test signals for different conditions, such as different frequencies and gain values. The receiving unit may then perform multiple estimations and send a return message to the sender that contains the estimates of the compensation factors for the sender's transmitter over the multiple conditions. According to embodiments of the present invention, to initiate multiple estimations the transmitter may transmit a message containing a request to perform multiple estimations. The request may be carried in the header field. The return message may contain the response to the forward message containing estimated compensation factors. A multiple response identifier may be used to indicate that the message contains multiple estimations of compensation factors.

Note that the compensation factors used by the receiving unit to receive the current message may be obtained either from previously stored results in, for example, receiver compensation memory 730, or estimated real-time from the test signals. Also, while an explicit response identifier may be used to keep track of the different estimations, in other embodiments an implicit sequence number may be used as well. Implicit numbering may be done, for example, by virtue of the position of the test signals in the initial request message and the position of the estimations in the return message.

C.1.3 Convergence of Estimations

According to embodiments of the present invention, error control may be applied to ensure that the compensation factors are received error free at the unit which needs the compensation factors to compensate for its transmitter. In the protocol exchange, this unit is the one that originally had initiated the estimation request. Moreover, convergence of the compensation factors both at the receiver and transmitter may be ensured by performing the convergence test shown in FIG. 28. However, in this case, the statistics needed for the convergence test may be computed based on one or more estimations performed over one or more messages exchanged.

In general, according to embodiments of the present invention, the units involved in calibration may do one or more of the following to ensure convergence and integrity of the compensation factors: (1) request for a retransmission of the message if the received message fails CRC; (2) request for a retransmission of the message but with an increment $\Delta t_{inc}(n)$ on the estimation period if the compensation factors have not converged, where n may be any positive integer including zero; and (3) keep an average of the estimated compensation factors for both the remote transmitter as well as the receiver over multiple messages between the same units until the compensation factors have converged. The compensation factors for the receiver may be stored in receiver compensation memory 730 only after passing the convergence test. The compensation factors for the remote transmitter may be sent in a return message and are stored in memory in the remote transmitter only after convergence. The convergence results for both the transmitter and receiver compensation factors are sent from the receiver to the sender in a return message. In all cases, the compensation factors may be applied immediately to the data field of the message once they have converged and are stored in memory.

FIGS. 32A and 32B show flowcharts illustrating embodiments of processes of two state machines in each radio unit for implementing the error control and convergence process described above. A process for the sender state machine shown in FIG. 32A is responsible for initiating new messages and re-transmitting the old messages as well as processing received messages. In the sender state machine, when a message is received, the convergence status is checked for the transmitter. If the transmitter compensation factors have converged, they are stored in memory. Then, the convergence status of both the transmitter and receiver is checked. If both have converged, the estimation increment index is reset to zero. Otherwise, the estimation time is increased by the estimation increment $\Delta t_{inc}(n)$. The sender state machine then determines if retransmission is required. If retransmission is required, the old message is retransmitted. Otherwise, the estimation increment index is reset and a new message is transmitted.

A process for the receiver state machine shown in FIG. 32B is responsible for processing the messages being sent by the sender as well as piggybacking the estimation and convergence results in return messages. In the receiver state machine, after a message is received both the receiver and transmitter compensation factors are tested for convergence. If the receiver compensation factors have converged, then they are stored in memory. The convergence results for both the transmitter and the receiver, as well as transmitter estimates, are then piggybacked on the return message which may be sent with a p-ACK or n-ACK depending on the result of the CRC. A p-ACK is a positive acknowledgment that is sent to the sender from the receiver indicating that the sent packet has been received successfully, while a n-ACK is a negative acknowledgment that is sent to the sender from the receiver indicating that the sent packet has not been received successfully.

More specifically, referring first to the process illustrated in FIG. 32B, the receiver state machine first receives a message at S3202. At S3203, convergence is tested for both the receiver and transmitter. It is then decided at S3204 whether or not there is convergence for the receiver. If there is convergence (Yes), then at S3206 the receiver compensation factor estimates are stored in memory. A transmitter compensation factor estimate and convergence results for both the transmitter and receiver are then piggybacked on a return message at S3208. It is then determined at S3210 whether or not the CRC has been passed. If the CRC has been passed (Yes), then at S3212 a return message with a p-ACK is transmitted. If the CRC is not passed (No), then at S3214 either a return message with a n-ACK is transmitted or no return message is transmitted. If there is no convergence at S3204 (No), then the process described above beginning at S3208 is carried out without storing receiver compensation factor estimates in memory.

Referring now to the process illustrated in FIG. 32A, the sender state machine first receives a message at S3216. It is then decided at S3218 whether or not there is convergence for the transmitter compensation factor estimates. If there is convergence (Yes), then at S3220 the transmitter compensation factor estimates are stored in memory. It is then determined at S3222 whether or not there is convergence for both the receiver and the transmitter. If there is convergence for both (Yes), then at S3224 the estimation increment index is reset. It is then determined at S3226 whether or not the message is to be retransmitted. If so (Yes), then the old message is retransmitted at S3228. If not (No), then at S3230 the estimation increment index is reset and a new message is transmitted at S3232. If at S3222 it is determined that both the receiver and the transmitter are not converged (No), then at S3234 the estimation time is increased by $\Delta t_{inc}(n)$ before proceeding to S3226. If there is no convergence for the transmitter at S3218 (No), then the process described above beginning at S3222 is carried out without storing transmitter compensation factor estimates in memory.

In the receiver state machine, an explicit n-ACK may not need to be sent, in which case, according to embodiments of the present invention, the sender state machine may implement a timeout policy whereby the old message is retransmitted after a certain timeout period. In terms of the retransmission control, any protocol well known in the art may be used, including but not limited to stop-and-wait and go-back N.

In contrast to local calibration, the total estimation time for the $n^{th}$ increment is $$(n+1)t_0 + \sum_{k=0}^{n} \Delta t_{inc}(k),$$

where n is a non-negative integer, since the test signal cannot be sent in a continuous mode but must be sent discretely over each transmitted message. Convergence is tested using all estimated results over multiple increments based on methods described in Section A.10.

According to embodiments of the present invention, in some systems, soft convergence may be acceptable where the estimations are applied immediately to the data field of the message even if they have not converged. The compensation factors are still stored only after convergence. However, prior to that, the data field of the message does not need to be modulated with robust modulation. In the event that the imbalance is not adequately compensated for prior to convergence, the corrupted message may be simply dropped and/or retransmitted. One advantage of this method is that, on average, the throughput performance may improve due to the ability to transmit with high-order modulation in the data field of the message before convergence is reached. This again may be applicable to certain applications where the SNR may be high, or if the data can tolerate higher bit-error rate, for example speech data. In systems where data integrity may not be necessary, for example video or speech, retransmission may be eliminated altogether.

C.1.4 Compatibility with Different Medium Access Protocols

In a networked system, messages are transmitted under the control of a medium access protocol, which may be based on random access, scheduled access, or both. An example of random access is carrier-sense multiple access (CSMA) and an example of scheduled access is time-division multiple access (TDMA). A hybrid scheme would be slotted CSMA. Embodiments of the calibration procedure described above may be used with any medium access protocol, because the compensation process may be accomplished on existing messages that are being transmitted by the system.

C.1.5 Initialization

In order that an initial exchange when the transmitter compensation factor has not yet been determined may be avoided, embodiments of the protocol exchange method described above may be applied in concert with embodiments of the local calibration method discussed in Section A. As discussed above, an initial exchange should be performed using robust modulation which results in lower throughput. According to embodiments of the present invention, local calibration may be applied to set up the compensation memory to avoid this problem. In that case, remote calibration may be applied on a need basis for updates during normal operation.

According to embodiments of the present invention, in some applications a special period of time may be allowed for network initialization or setup. In that case, it is possible to determine the compensation factors during the initialization period and store the factors in memory for use after the network is fully setup. Examples of such applications are ad-hoc networks and wireless LAN's. In further embodiments, different protocols may be used to setup the network, including, but not limited to, clustering, flooding, and controlled flooding. Calibration preambles, test signals, and estimations may all be piggybacked onto existing control messages used by these protocols.

When new units want to enter the network, they must request admission, which is handled by admission protocols. The protocol exchange may be again applied to the messages used during admission to the network to initialize the compensation factors for the new units. Calibration preambles, test signals, and estimations may all be piggybacked onto existing control messages used by the admission control protocol.

C.1.6 Update

Embodiments of the protocol exchange procedure described above may be applied to every transmitted message or it may be done with reduced duty cycle once the compensation factors have been determined and stored in memory, if available. Increase in duty cycle to update may be initiated by either a certain amount of change in temperature or time elapsed since the last update as discussed in relation to FIG. 11 and FIG. 15. Update could also be supplemented by local calibration as discussed in relation to FIG. 10.

C.1.7 Compensation Memory

The compensation factors for the transmitter are estimated at the remote unit and sent back via return messages. Therefore, according to embodiments of the invention the architecture illustrated in FIG. 7 and FIG. 29 may be modified. In an example embodiment, the compensation factor estimator block for the transmitter may be disconnected from the transmitter compensation memory because the estimated values reside in the return message and may be provided to the memory by the controller.

C.1.8 Application to Local Calibration

Embodiments of the invention using local calibration may easily be employed together with remote calibration using protocol exchange.

C.2 Feed-Forward Calibration of Transmitter Imbalance

According to embodiments of the present invention, in protocol exchange the compensation factors for the transmitter's I-Q imbalance are estimated at the remote receiving unit. Therefore, the remote receiving unit needs to send the compensation factors back to the transmitter through a return message. According to an alternative embodiment of the present invention employed with the exemplary architecture shown in FIG. 33, remote real-time calibration is possible without the requirement that a return message carrying the compensation factors be sent to the remote transmitter. According to embodiments of the present invention employing this architecture, each transmitted message may again have a preamble, midamble, and/or postamble. A preamble may be used in a preferred embodiment because it does not require a buffer.

Figure 33:
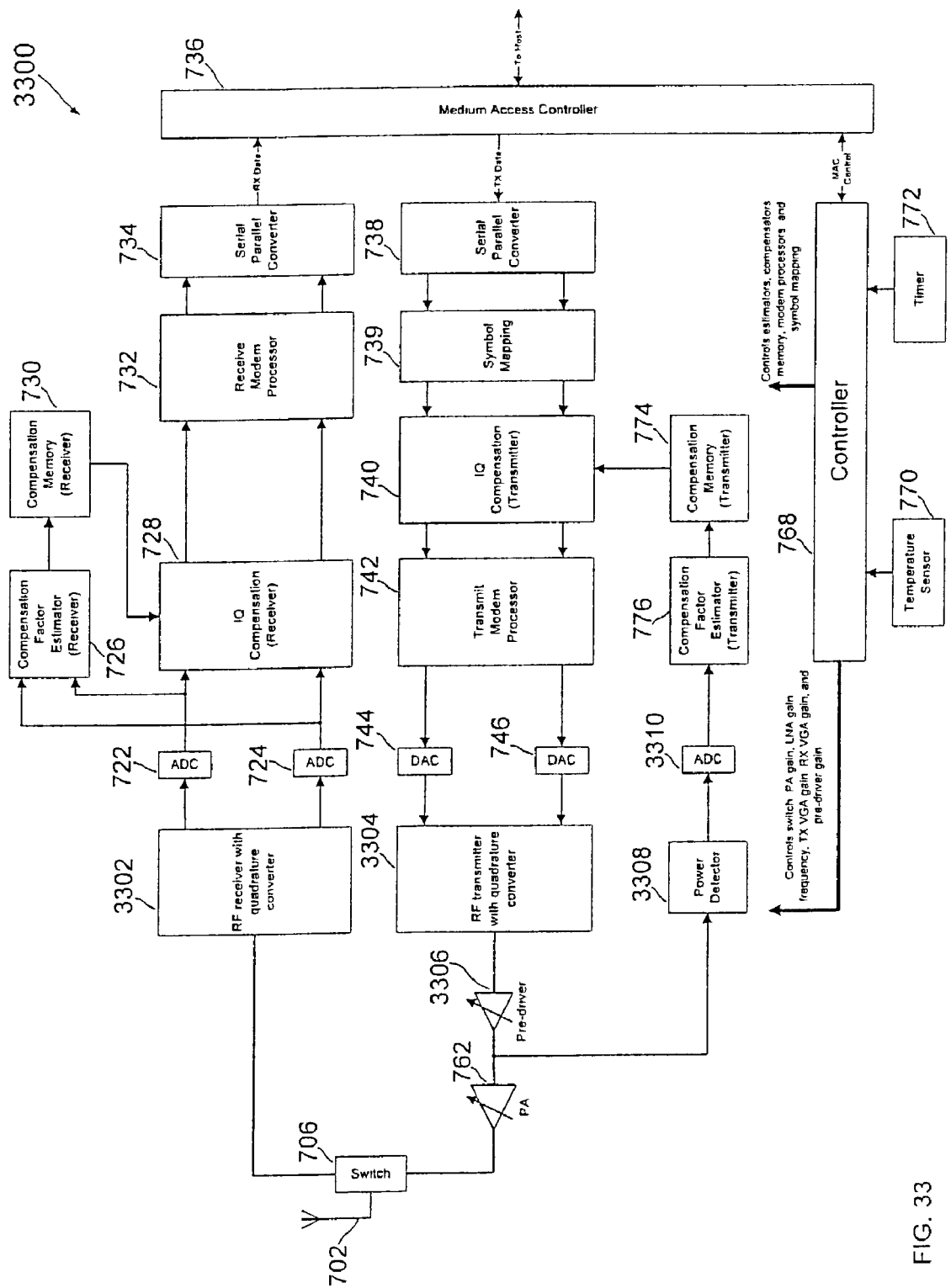
FIG. 33 illustrates an exemplary transceiver architecture for performing real-time remote calibration based on feed-forward calibration of I-Q imbalance, according to embodiments of the present invention.

FIG. 33 shows transceiver 3300, wherein like reference numbers refer to like elements shown in FIG. 7. Transceiver 3300 includes an RF receiver 3302 with a quadrature converter and a RF transmitter 3304 with a quadrature converter. Transceiver 3300 further includes pre-driver 3306, the input of which is coupled to the output of RF transmitter 3304. The output of pre-driver 3306 is coupled to the input of PA 762 and to the input of power detector 3308. The output of power detector 3308 is coupled to the input of ADC 3310. The output of ADC 3310 is coupled to an input of transmitter compensation factor estimator 776.

Figure 34:
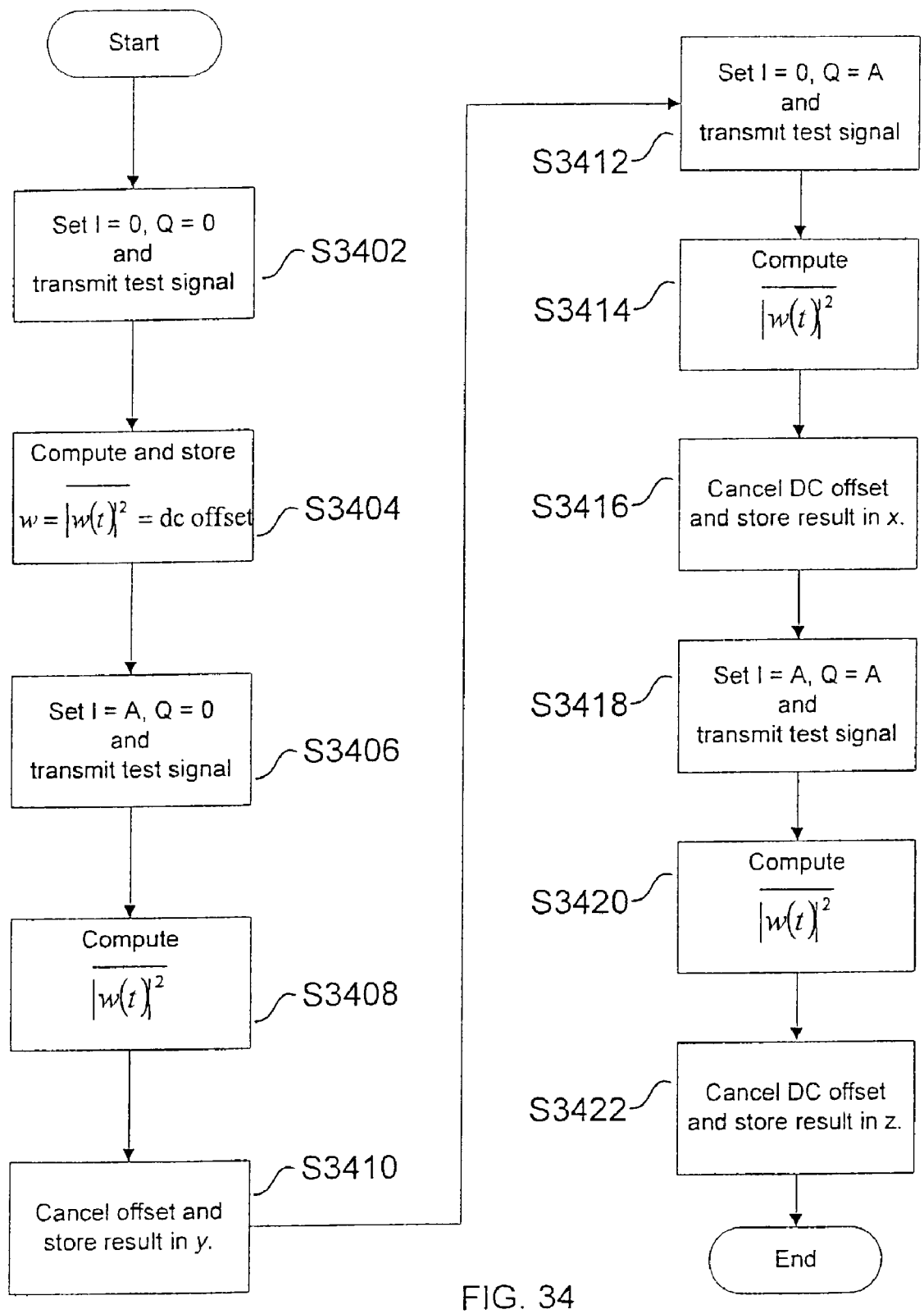
FIG. 34 shows a flowchart illustrating an exemplary control flow for transmitter compensation factor estimation with feed-forward calibration of I-Q imbalance, according to embodiments of the present invention.

According to an embodiment employed with the architecture shown in FIG. 33, four test signals are introduced into a preamble that allows the transmitter to perform the estimation via the power detector 3308, which effectively performs the magnitude squared operation to generate $|w(t)|^2$ used to estimate the intermediate values w, x, y, and z required to compute the transmitter imbalance. FIG. 34 shows a flowchart illustrating an exemplary embodiment of this process. According to embodiments of the present invention, an additional test signal with the baseband signals set to I=Q=0 is required to estimate the DC offset in the transmitted signal, as shown at S3402. At S3404, the value w is computed and stored. The I-Q symbols are then set to A and zero, respectively at S3406. $|w(t)|^2$ is then computed at S3408. At S3410, the offset is then cancelled and the result is stored in y. The I-Q symbols are then set to zero and A, respectively at S3412. $|w(t)|^2$ is then computed at S3414. At S3416, the offset is then cancelled and the result is stored in x. The I-Q symbols are then both set to A at S3418. $|w(t)|^2$ is then computed at S3420. At S3422, the offset is then cancelled and the result is stored in z.

Figure 35:
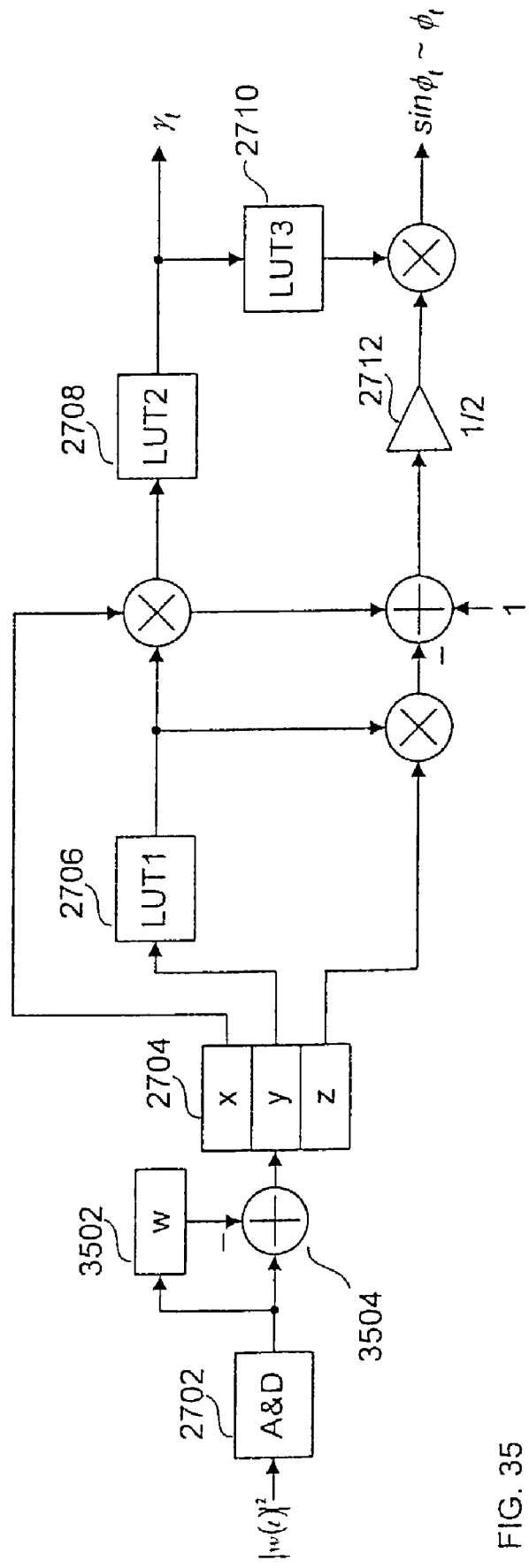
FIG. 35 illustrates an exemplary implementation of a transmitter compensation factor estimator for feed-forward calibration of I-Q imbalance, according to embodiments of the present invention.

As illustrated by the process shown in FIG. 34, the computed DC offset may be stored in w and later used to cancel the DC offsets in measurements of x, y, and z. An example circuit for implementing this process is shown in FIG. 35, which depicts the compensation factor estimator for the transmitter when used in feed-forward calibration. FIG. 35 is similar to FIG. 27 and like reference numbers refer to like elements in FIG. 27. FIG. 35 differs from FIG. 27 in that FIG. 35 includes a signal w 3502 which is equal to the DC offset, and adder 3504 for canceling the DC offset.

Once the transmitter imbalance has been estimated, the compensation factors may be derived by using the computations of the transmitter I-Q imbalance compensator shown in FIGS. 17A and 17B. As shown in FIG. 18, multiple estimators could also be used if the test signal comprises multiple test tones. The compensation factors may then be applied to the data field of the message before transmission. The local receiver in this case is not needed during estimation of the transmitter compensation factors and therefore may be turned off.

When receiving a message, the receiver may use the test signals sent in the preamble to perform the estimation of the receiver imbalances based on the estimation process described in FIG. 12 and FIG. 19 through FIG. 25. As shown in FIG. 18, multiple estimators may also be used if the test signal comprises multiple test tones. The local transmitter in this case is not needed during estimation of the receiver compensation factors and therefore may be turned off.

C.2.1 Switch Configuration

According to embodiments of the present invention, if no local calibration is performed, the switching unit 706 may be used in the same way as during normal operation. In addition, no special provisions are needed for the switching unit 706 in this case for either TDD or FDD modes. In TDD mode, a standard TDD switch shown in FIG. 8A may be used. In FDD mode, a standard frequency duplexor 778 may be used. However, if local calibration is also performed for the receiver, the switching unit 706 may be configured according to embodiments shown in FIGS. 8A through 8F as described in Section A.

C.2.2 Convergence of Estimations

Figure 36B:
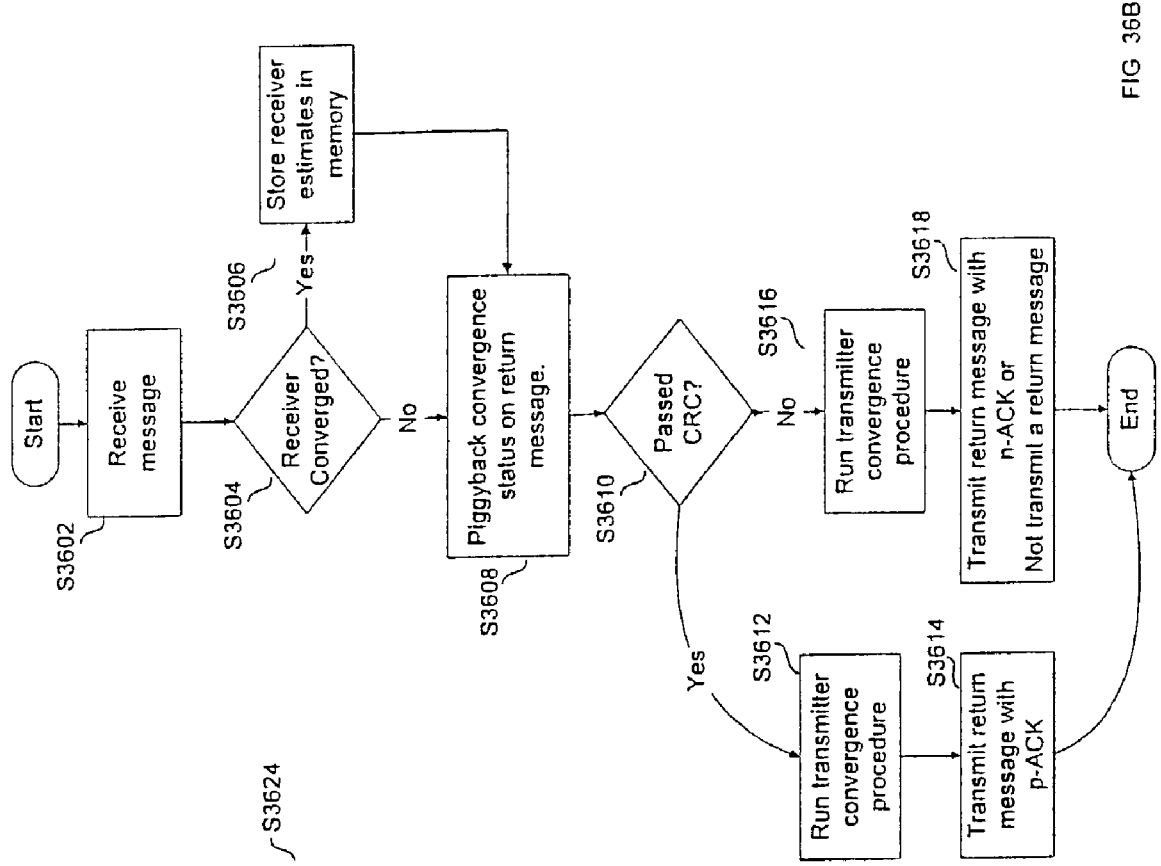
FIG. 36B shows a flowchart illustrating an exemplary control flow for a receiver state machine for error control and convergence testing for feed-forward calibration of I-Q imbalance, according to embodiments of the present invention.
Figure 36A:
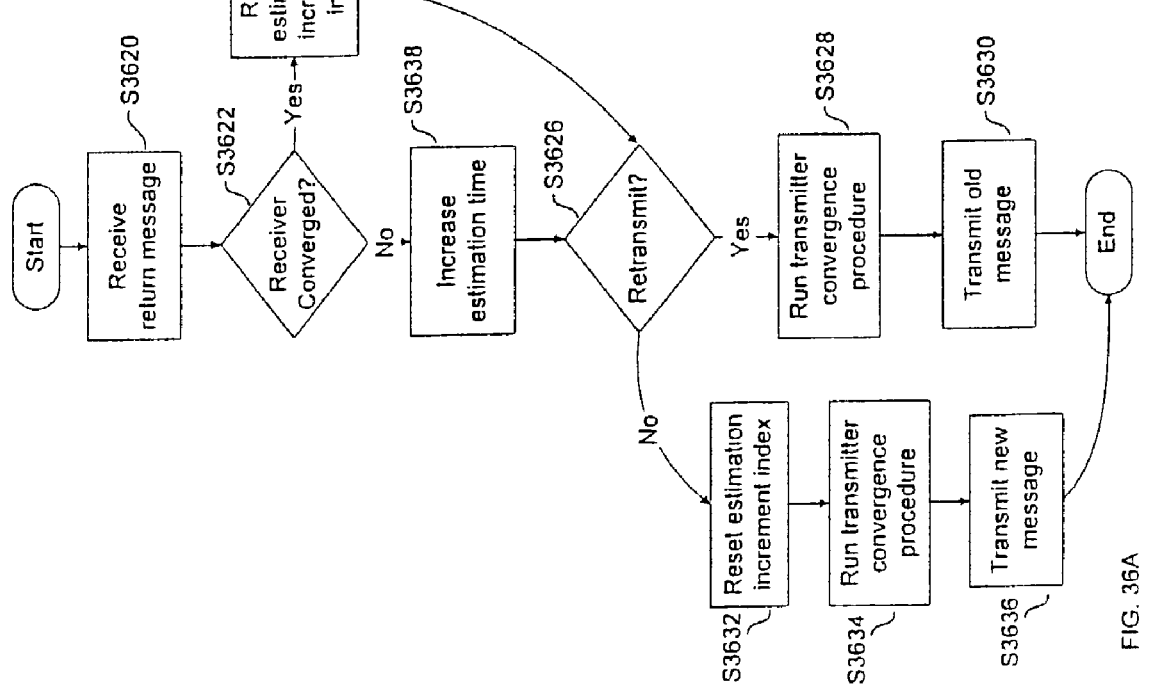
FIG. 36A shows a flowchart illustrating an exemplary control flow for a sender state machine for error control and convergence testing for feed-forward calibration of I-Q imbalance, according to embodiments of the present invention.

According to embodiments of the present invention, convergence at the receiver and transmitter may be ensured in a closed-loop fashion as illustrated by example processes shown in FIGS. 36A and 36B for the sender state machine and the receiver state machine, respectively. Referring first to FIG. 36B, whereby the receiver state machine checks the convergence of the receiver compensation factors, the receiver state machine first receives a message at S3602. It is then decided at S3604 whether or not there is convergence. If there is convergence (Yes), then at S3606 the receiver compensation factor estimates are stored in memory. A convergence result is then piggybacked on a return message at S3608. It is then determined at S3610 whether or not the CRC has been passed. If the CRC has been passed (Yes), then at S3612 a transmitter convergence procedure is executed. Then, at S3614 a return message with a p-ACK is transmitted. If the CRC is not passed (No), then at S3616 a transmitter convergence procedure is executed. Then, at 3618 either a return message with a n-ACK is transmitted or no return message is transmitted. If there is no convergence at S3604 (No), then the process described above beginning at S3608 is carried out without storing receiver compensation factor estimates in memory.

Referring now to FIG. 36A, the sender state machine first receives a return message at S3620. It is then decided at S3622 whether or not there is receiver convergence. If there is receiver convergence (Yes), then at S3624 the estimation increment index is reset. It is then determined at S3626 whether or not the message is to be retransmitted. If so (Yes), then at S3628 the transmitter convergence procedure is executed. The old message is then retransmitted at S3630. If the message is not to be retransmitted, then at S3632 the estimation increment index is reset and the transmitter convergence procedure is executed at S3634. A new message is then transmitted at S3636. If there is no convergence at S3622 (No), then the estimation increment index is not reset and the estimation time is increased by $\Delta t_{inc}(n)$ at S3638 before proceeding to S3626.

As can be seen from FIGS. 36A and 36B, if the results have converged, they are stored in memory. The receiver convergence status is sent to the remote transmitter, directing it to increase the estimation time by $\Delta t_{inc}(n)$ if convergence is not met or by resetting the estimation increment index if convergence is met.

Convergence at the receiver may also be done locally for each transmitted message by using the preamble and/or midamble of the transmitted message for estimation of receiver compensation factors through switch configurations discussed earlier for local calibration. Finally, soft convergence may be employed for the receiver on a per packet basis whereby estimated compensation factors are applied to the data field of the message without regard to convergence. However, estimates may still be stored into memory (if available) only after convergence. If converged estimates are available in memory, then the receiver may have the option of using the converged estimates rather than the estimate derived from the current message.

Convergence of transmitter estimates may be performed locally. Therefore, the process of piggybacking the transmitter estimates may be eliminated in the receiver state machine discussed in relation to FIG. 32B. Rather the procedure required for transmitter convergence may be performed prior to every transmission as shown in FIG. 36A. The sender state machine checks if retransmission is required. If it is required, the old message is sent. Otherwise, the estimation increment index is reset and a new message is sent. Prior to sending a message, the sender state machine runs a convergence procedure for the transmitter. Similarly, in the receiver state machine, a return message is sent with p-ACK or n-ACK, depending on whether the current message has passed CRC. Before sending the return message, the same convergence procedure is run for the transmitter. According to embodiments of the present invention, the procedure for transmitter when convergence fails may be any one of the following: (1) abort the transmission and try again, (2) increase the estimation time by $\Delta t_{inc}(n)$ and try again, (3) use modulation that is robust to imbalance for the data portion of the current transmission and increase the estimation time by $\Delta t_{inc}(n)$ in the next transmission, and (4) apply soft convergence whereby data is compensated with current estimation regardless of convergence but always have the option of applying converged estimates if available in memory.

C.2.3 Application to Local Calibration

Embodiments of the invention using local calibration may easily be employed with the architecture shown in FIG. 33. All discussion in Section A applies except that the transmitter estimation should follow the procedure illustrated in FIG. 34 and use the estimator shown in FIG. 35.

C.2.4 Initialization

Initialization is not an issue here because the transmitter compensation factors may be estimated locally.

C.2.5 Update

Embodiments of the estimation procedure described for feed-forward calibration may be applied to every transmitted message or it may be done with reduced duty cycle once the compensation factors have been determined and stored in memory, if available. Increase in duty cycle to update may be initiated by either a certain amount of change in temperature or time elapsed since the last update as discussed in relation to FIG. 11 and FIG. 15. Update may also be supplemented by local calibration as discussed in relation to FIG. 10.

C.3 Feed-Forward Compensation of Remote Transmitter Imbalance at Receiver

Figure 37:
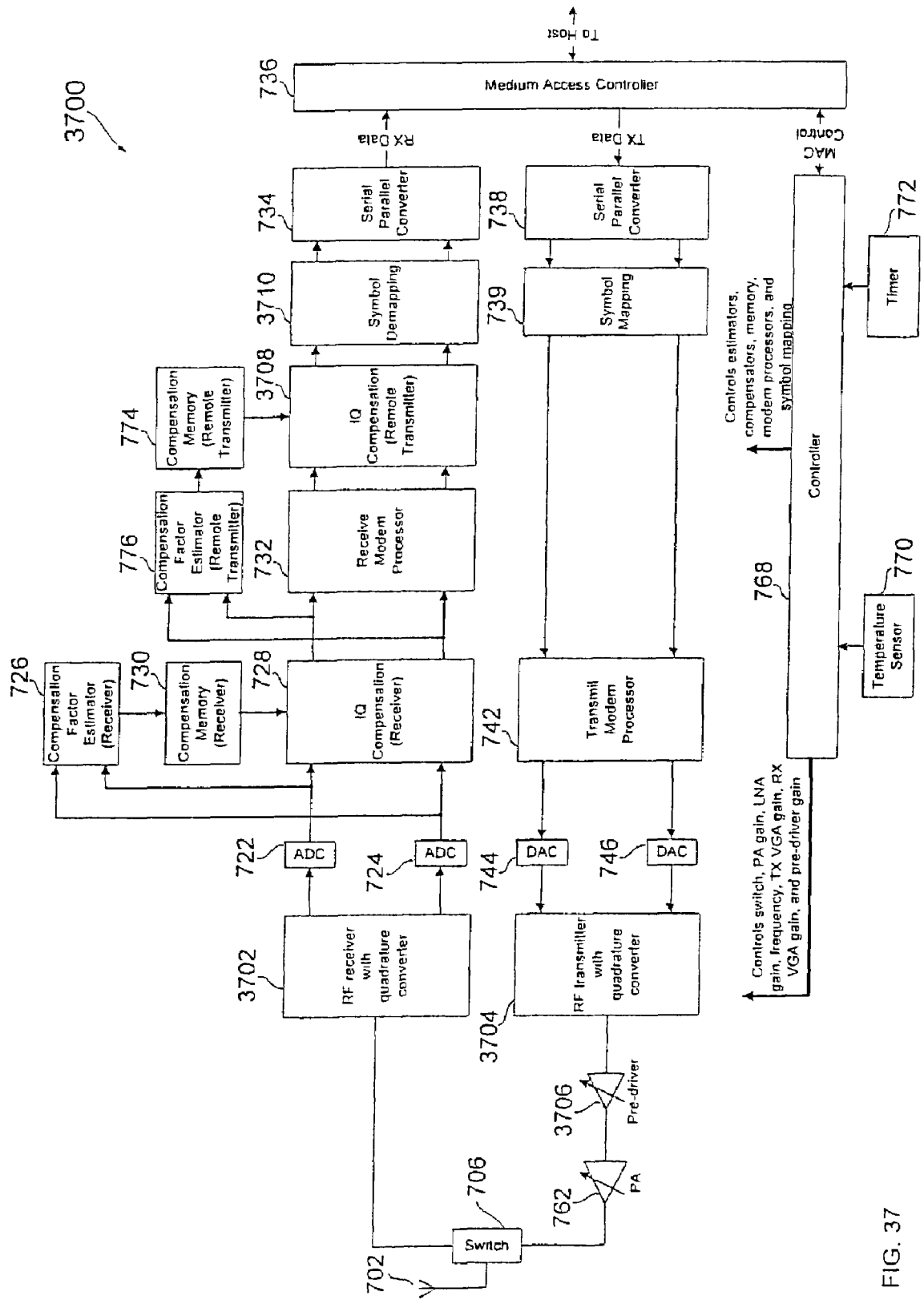
FIG. 37 illustrates an exemplary transceiver architecture for performing, at a local receiver, feed-forward compensation of a remote transmitter I-Q imbalance, according to embodiments of the present invention.

Thus far, embodiments of the present invention have performed the compensation of the transmitter imbalance at the local radio unit. According to other embodiments of the present invention, a different approach shown in FIG. 37 may be implemented that allows compensation of the transmitter imbalance at the remote receiver. FIG. 37 shows transceiver 3700, wherein like reference numbers refer to like elements shown in FIG. 7. Transceiver 3700 includes an RF receiver 3702 with a quadrature converter and a RF transmitter 3704 with a quadrature converter. Transceiver 3700 further includes pre-driver 3706, the input of which is coupled to the output of RF transmitter 3704. The output of pre-driver 3706 is coupled to the input of PA 762. As shown in FIG. 37, the outputs of receive modem processor 732 are coupled to inputs of remote transmitter I-Q compensation block 3708. Outputs of I-Q compensation block 3708 are coupled to inputs of symbol demapping block 3710. Outputs of symbol demapping block 3710 are coupled to inputs of serial-parallel converter 734.

In this case, compensation for both the imbalance caused by the transmission and reception of the signal is performed solely at the receiver. According to embodiments of the present invention employing this architecture, each transmitted message may again have a preamble, midamble, and/or postamble. A preamble is preferred because it does not require a buffer.

The estimation of the imbalances at both the receiver and transmitter may be performed based on methods already described in Section A, and illustrated in FIG. 12 and FIG. 19 through FIG. 28. Once the transmitter and receiver imbalances have been estimated, the compensation factors may be derived by using the computations shown in FIGS. 16A and 16B for the receiver and FIGS. 17A and 17B for the transmitter, respectively. As shown in FIG. 18, multiple estimators could also be used if the test signal comprises multiple test tones.

The receiver compensation factors are applied to the data portion of the received message prior to processing the received data by the modem. In this case, the output of the modem should be soft-decision values of the I/Q symbols. Before demapping the symbols to their bit representations, the transmitter compensation factors are applied to the I/Q symbols to compensate for the I-Q imbalance introduced by the remote transmitter.

According to embodiments of the present invention as shown in FIG. 37, during the reception of the message, no processing is performed by the transmitter. Therefore, the transmitter may be turned off during this time. During transmission of a message, no calibration is performed at the local transmitter and the receiver may therefore be turned off during this time.

C.3.1 Switch Configuration

According to embodiments of the present invention, if no local calibration is performed, the switching unit 706 may be used in the same way as during normal operation. In addition, no special provisions are needed for the switching unit 706 in this case for either TDD or FDD modes. In TDD mode, a standard TDD switch shown in FIG. 8A may be used. In FDD mode, a standard frequency duplexor 778 may be used. However, if local calibration is also performed for the receiver, the switching unit 706 may be configured according to embodiments shown in FIGS. 8A through 8F as described in Section A.

C.3.2 Convergence of Estimations

Figure 38B:
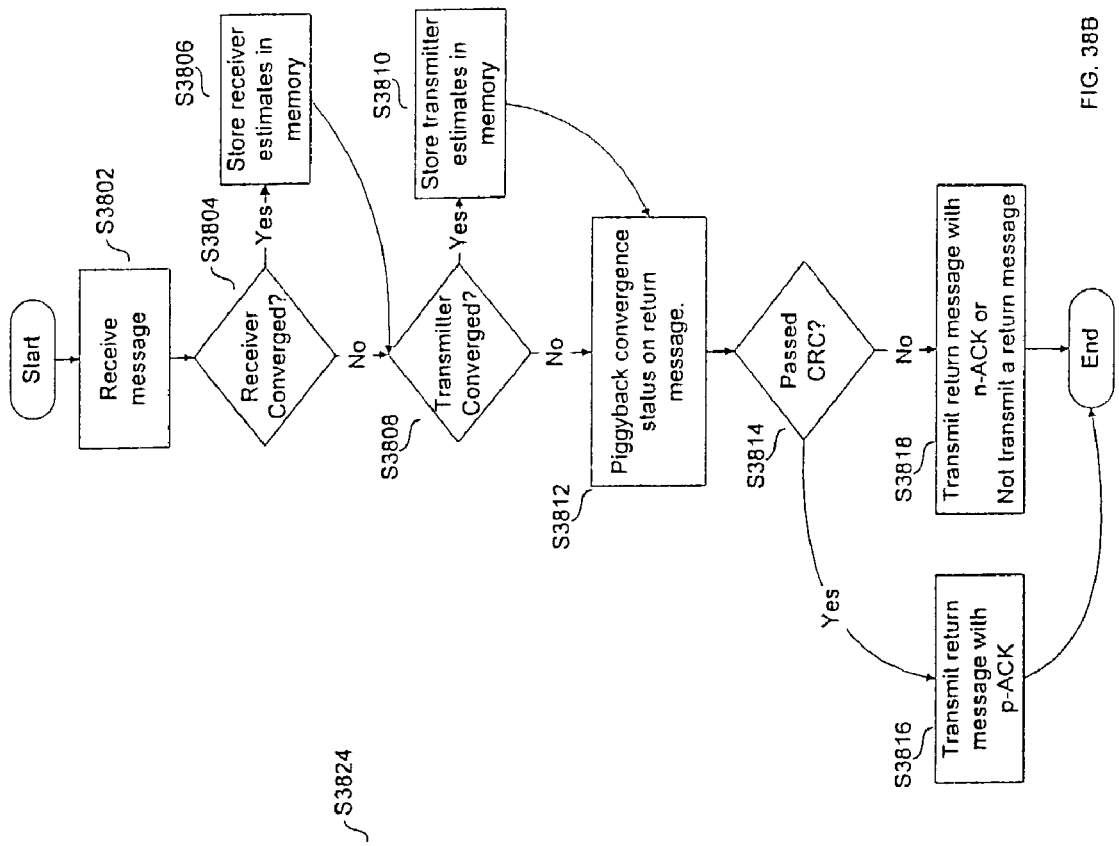
FIG. 38B shows a flowchart illustrating an exemplary control flow for a receiver state machine for error control and convergence testing for feed-forward compensation of a remote transmitter I-Q imbalance, according to embodiments of the present invention.
Figure 38A:
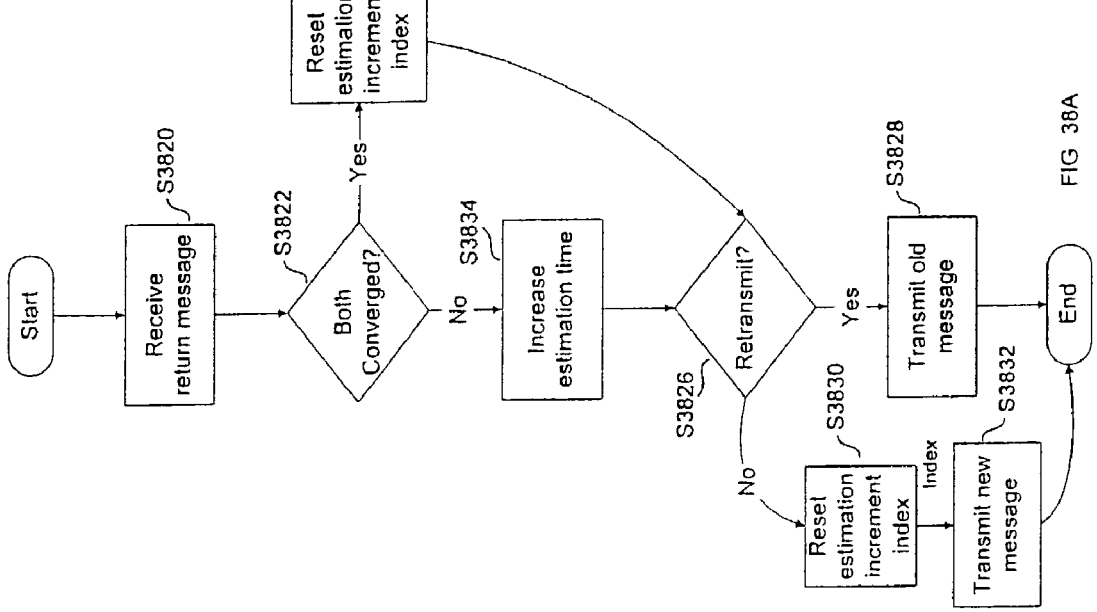
FIG. 38A shows a flowchart illustrating an exemplary control flow for a sender state machine for error control and convergence testing for feed-forward compensation of a remote transmitter I-Q imbalance, according to embodiments of the present invention.

Convergence at the receiver and transmitter may be ensured in a closed-loop fashion as illustrated by the processes shown in FIGS. 38A and 38B for the sender state machine and the receiver state machine, respectively. Referring first to the process illustrated in FIG. 38B, whereby the receiver state machine checks the convergence of the receiver compensation factors, the receiver state machine first receives a message at S3802. It is then decided at S3804 whether or not there is receiver convergence. If there is receiver convergence (Yes), then at S3806 the receiver compensation factor estimates are stored in memory. It is then determined at S3808 whether or not there is transmitter convergence. If there is transmitter convergence (Yes), then at S3810 the transmitter compensation factor estimates are stored in memory. A convergence result is then piggybacked on a return message at S3812. It is then determined at S3814 whether or not the CRC has been passed. If the CRC has been passed (Yes), then at S3816 a return message with a p-ACK is transmitted. If the CRC is not passed (No), then at S3818 either a return message with a n-ACK is transmitted or no return message is transmitted. If there is no receiver convergence (No at S3804), then it is determined at S3808 whether or not there is transmitter convergence without storing receiver estimates in memory. If there is no transmitter convergence (No at S3808), then no transmitter estimates are stored in memory and the process described above beginning at S3812 is carried out.

Referring now to the process illustrated in FIG. 38A, the sender state machine first receives a return message at S3820. It is then determined at S3822 whether or not there is convergence for both the receiver and the transmitter. If there is convergence for both (Yes), then at S3824 the estimation increment index is reset. It is then determined at S3826 whether or not the message is to be retransmitted. If so (Yes), then the old message is retransmitted at S3828. If not (No), then at S3830 the estimation increment index is reset and a new message is transmitted at S3832. If at S3822 it is determined that both the receiver and the transmitter are not converged (No), then no transmitter compensation factor estimates are stored in memory and the estimation time is increased by the estimation increment $\Delta t_{inc}(n)$ at S3834 before proceeding to S3826.

As can be seen from the embodiments of the processes described above, if the results have converged, they are stored in memory. Both the receiver and transmitter convergence status is sent to the remote transmitter where the sender state machine increases the estimation time by $\Delta t_{inc}(n)$ if convergence is not met or resets the estimation increment index if convergence is met.

Convergence at the receiver may also be done locally for each transmitted message by using the preamble and/or midamble of the transmitted message for estimation of receiver compensation factors through switch configurations discussed earlier for local calibration. Finally, soft convergence may be employed for the receiver on a per packet basis whereby estimated compensation factors are applied to the data portion of the message without regard to convergence. However, estimates are still stored into memory (if available) only after convergence. If converged estimates are available in memory, then the receiver has the option of using the converged estimates rather than the estimate derived from the current message.

Convergence of transmitter estimates may be performed locally. Therefore, the process of piggybacking the transmitter estimates may be eliminated in the receiver state machine shown in FIG. 32B. Instead, the convergence of the transmitter compensation factors is checked as shown in FIGS. 38A and 38B. In the receiver state machine, if the transmitter compensation factors have converged, they are stored in memory. The convergence results for both the transmitter and receiver are sent as part of a return message. The return message is sent with p-ACK or n-ACK, depending on whether the current message has passed CRC. At the remote unit, the sender checks if retransmission is required. If it is required, the old message is sent. Otherwise, the estimation increment index is reset and a new message is sent.

It may happen that the estimation process does not converge to a certain required tolerance for the transmitter. In that case, according to embodiments of the present invention, one of the following could be performed: (1) use modulation that is robust to imbalance for the data portion of the current transmission and increase the estimation time by $\Delta t_{inc}(n)$ in the next transmission, and (2) apply soft convergence whereby data is compensated with current estimation regardless of convergence but always have the option of applying converged estimates if available in memory.

C.3.3 Application to Local Calibration

The architecture shown in FIG. 37 can be applied for local calibration of the receiver but cannot be applied to local calibration of the transmitter since the transmitter is not compensated locally.

C.3.4 Initialization

Initialization is not an issue here since the remote transmitter compensation factors may be estimated locally.

C.3.5 Update

The estimation procedure described in relation to the architecture shown in FIG. 37 may be applied to every received message or it could be done with reduced duty cycle once the compensation factors have been determined and stored in memory, if available. Increase in duty cycle to update may be initiated by either a certain amount of change in temperature or time elapsed since the last update as discussed in relation to FIG. 11 and FIG. 15. Update could also be supplemented by local calibration for the receiver as discussed in relation to FIG. 10.

C.3.6 Memory

According to the embodiment of the invention shown in FIG. 37, the transmitter compensation factors are associated with the remote transmitter. Therefore, when the transmitter compensation factors are stored in memory, it may be required that an identification number of the remote radio unit also be stored in memory. If the compensation factors are to be stored for different gain settings and temperature for the remote transmitter, then these parameters must be transmitted as part of the message so that the stored values may be correctly matched to the corresponding gain and temperature. According to one embodiment, these parameters may be placed in the header of the message.

C.4 Digital IF Transmitter

Figure 39:
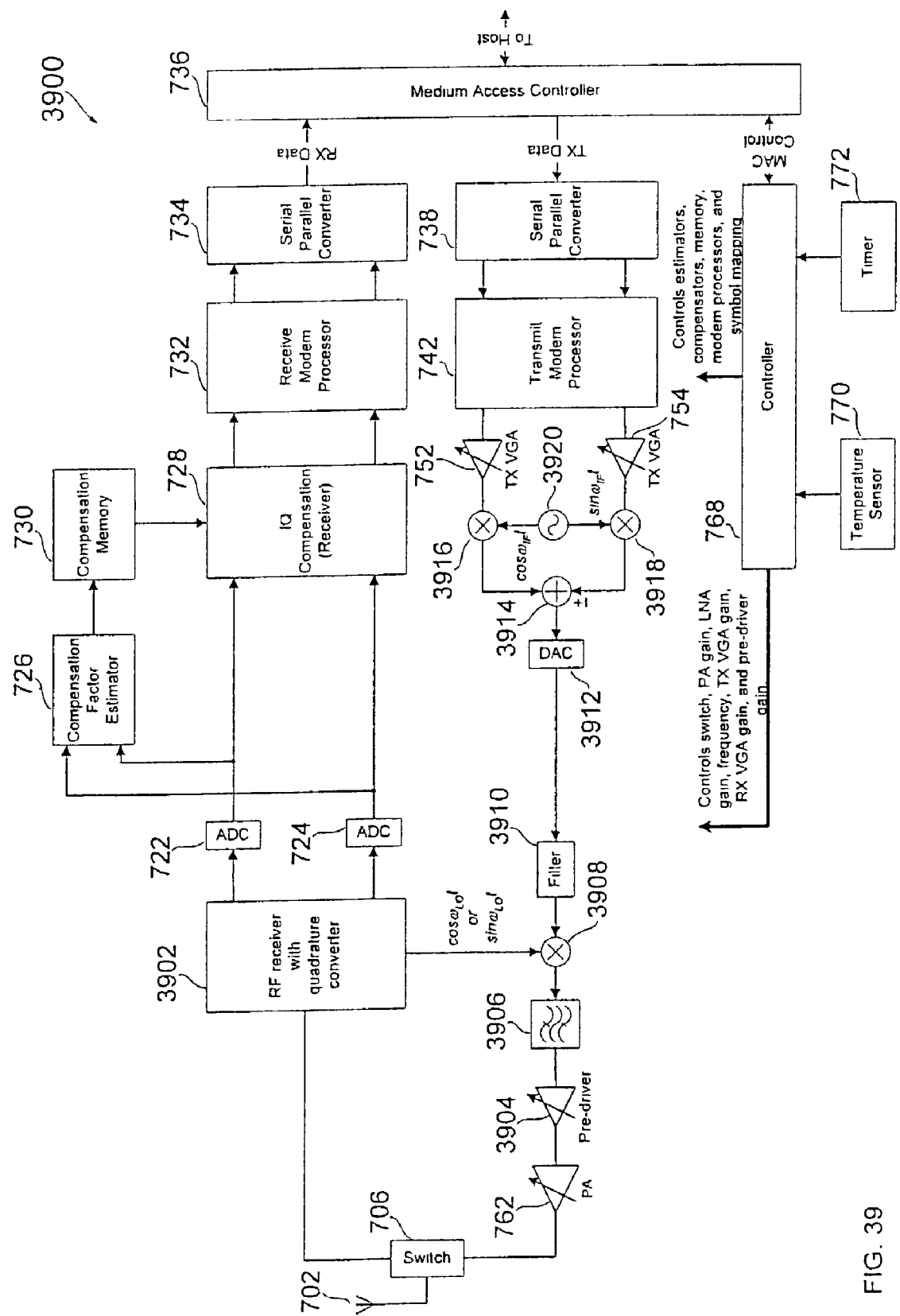
FIG. 39 illustrates an exemplary transceiver architecture having a digital transmitter which implements the quadrature up-converter in the digital domain, according to embodiments of the present invention.

According to embodiments of the present invention, the I-Q imbalance at the transmitter may be eliminated by use of a digital transmitter which implements the quadrature up-converter completely in the digital domain. FIG. 39 shows transceiver 3900, wherein like reference numbers refer to like elements shown in FIG. 7. Transceiver 3900 includes a digital up-converter 3916, 3918, 3914, and 3920. The I and Q channels are summed at adder 3914. The summation of the I and Q channels may be an addition, as shown in FIG. 39, or a negation. The difference is a constant phase shift that may be resolved at the demodulator using techniques well known in the art.

The summed signal is converted back to analog by DAC 3912 and may be amplified and sent to the antenna 702 if the digital up-converter operates at the carrier frequency. Usually, however, the digital up-converter operates at an IF frequency so that the DAC 3912 may be more easily implemented.

After being converted to analog, the IF signal may be filtered by filter 3910 to remove the images of the digital signal at multiples of the sampling rate. The filtered signal may then be up-converted to RF, for example with a double-sideband mixer 3908, provided to switching unit 706 through pre-driver 3904 and PA 762 and transmitted.

Because the double sideband mixing results in an image, a bandpass filter 3906 may be needed at the output of the mixer 3908 to reject either the image at $f_{LO}-f_{IF}$ or the signal at $f_{LO}+f_{IF}$ to produce the RF signal, where $f_{LO}$ is the local oscillator from the synthesizer in the RF receiver. Because the RF receiver still contains a quadrature converter, the synthesizer may generate both an in-phase and a quadrature component. For the purposes of the transmitter in this case, either the in-phase or the quadrature component may be used for double sideband mixing. Note that the digital IF transmitter is not limited to remote calibration, but also may be applied to the local calibration (discussed in Section A) to eliminate the need to compensate for the transmitter I-Q imbalance.

C.4.1 Digital Implementation

According to embodiments of the present invention, the digital hardware may be simplified by using a sampling frequency that is M/N times the IF frequency $f_{IF}$, for example $Mf_{IF/N}$. Then, the generation of the in-phase and quadrature sine waves may be implemented with a ROM table sampled at $Mf_{IF}/N$ and having only $\lceil M/4 \rceil$ entries to store the values of a quarter cycle of cosine and sine. The complete cycle of a sinusoid may be constructed from a quarter cycle by virtue of quarter-wave symmetry inherent in the sinusoidal signal. In some cases, fewer entries could be used since some of the entries are either zeros or ones. For instance, with N=1 and M=4, the entries are 0, +1, 0, and −1 for sine and +1, 0, −1, and 0 for cosine. In this case, no ROM is needed. For N=1 and M=8, the entries are 0, $1/\sqrt{2}$, 1, $1/\sqrt{2}$, 0, $-1/\sqrt{2}$, −1, and $-1/\sqrt{2}$ for sine and 1, $1/\sqrt{2}$, 0, $-1/\sqrt{2}$, −1, $-1/\sqrt{2}$, 0, and $1/\sqrt{2}$ for cosine. In this case, a single entry ROM is needed to store $1/\sqrt{2}$. The other value $-1/\sqrt{2}$ may be obtained through a negation operation on $1/\sqrt{2}$. Further ROM table reduction could be achieved by using methods such as the fine/coarse ROM and other methods well known in the art.

The modulated IF output is computed by multiplying the I and Q channel inputs with the cosine and sine waveforms and adding or subtracting them depending on the sign at the adder 3914 shown in FIG. 39. Since the I and Q channel inputs operate more slowly than the sinusoidal signals, they must be over-sampled. One method of over-sampling is to repeat the signals at the higher sampling rate, in this case at $Mf_{IF}/N$. In the example where M=4, N=1, and I/Q sampling rate is the same as $f_{IF}$, the IF output is I, −Q, −I, and Q for every sample of I and Q signals at the input. Thus, the I and Q signals are oversampled by a factor of four. Similarly, in the case of M=8, N=1, and I/Q sampling rate is the same as $f_{IF}$, the IF output is a time series of I, $1/\sqrt{2}(I-Q)$, −Q −1/$\sqrt{2}(I+Q)$, −I, $-1/\sqrt{e}(I-Q)$, Q, $/\sqrt{2}(I+Q)$ for every sample of I and Q signals input. Thus, the I and Q signals are over-sampled by a factor of eight. These two cases assume subtraction of the Q channel from the I channel at the IF output. A simple sign inversion may be used to obtain the case with addition of the I and Q channels.

FIG. 40A shows a general implementation where the cosine wave is represented by a set of numbers {A} and the sine wave is represented by a set of numbers {B}. The modulated output may then be computed by multiplying the Q-channel with {B} and adding it to or subtracting it from the product of the I-channel with {A}. The I and Q channels should be appropriately over-sampled by re-clocking the samples at the faster sampling rate of $Mf_{IF}/N$. If the ratio of the IF frequency to the I/Q sample rate is denoted by L, then there are LM number of IF samples per I/Q sample, consisting of L repetitions of M samples generated by the modulation process of A×I±B×Q.

The output of the computation block 4002 that computes A×I±B×Q contains one full period of the IF modulated output with M samples. These samples of this period are indexed from 0 to M−1 and output to the corresponding index of the input of an M-to-1 multiplexor (MUX) 4004. The MUX 4004 is clocked out at a rate of $Mf_{IF}/N$ while an external controller generates a select signal that sequences from 0 to M−1 at unit increments. After reaching M−1, the sequence resets to 0 and starts over. The process repeats L times to generate all ML samples of the IF signal for every I/Q input sample. Registers 4006, 4008 operate as latches.

FIG. 40B shows an example implementation of a digital IF modulator with N=1 and M=4. The computation block that computes A×I±B×Q in this case is shown in the dashed box 4010 and comprises simple negation and additions. The four outputs are tied to the four corresponding inputs of the 4-to-1 MUX 4012. The clock rate in this case is four times the IF frequency. The output of the MUX 4012 is sequenced through L times, depending on the I/Q input sampling rate.

FIG. 40C shows an example implementation of a digital IF modulator with N=1 and M=8. The computation block that computes A×I±B×Q in this case is shown in the dashed box 4014 and comprises simple negation, scaling by $1/\sqrt{2}$, and additions. A single ROM may be used to store $1/\sqrt{2}$ or alternatively a canonical signed digit (CSD) or other radix $2^k$ representation, where k is an integer, could be used to implement $1/\sqrt{2}$ as hardwired shifts and additions/subtractions. The eight outputs are tied to the eight corresponding inputs of the 8-to-1 MUX 4016. The clock rate in this case is eight times the IF frequency. The output of the MUX 4016 is sequenced through L times, depending on the I/Q input sampling rate.

C.4.2 Pseudo Digital Implementation

According to embodiments of the present invention, the M-to-1 MUX may be implemented by many methods well known in the art, including but not limited to pass gates, transmission gates, combinational logic, and dynamic logic. Moreover, if it is desired to eliminate the DAC, pseudo digital implementation may be used for the MUX for instance using current mode logic.

C.4.3 Switch Configuration

According to embodiments of the present invention, if no local calibration is performed, the switching unit 706 may be used in the same way as during normal operation. In addition, no special provisions are needed for the switching unit 706 in this case for either TDD or FDD modes. In TDD mode, a standard TDD switch shown in FIG. 8A may be used. In FDD mode, a standard frequency duplexor 778 may be used. However, if local calibration is also performed for the receiver, the switching unit 706 may be configured according to embodiments shown in FIGS. 8A through 8F as described in Section A.

C.4.4 Application to Digital RF

According to embodiments of the present invention, by replacing the IF frequency $f_{IF}$ with the RF frequency, the implementation of the digital IF modulator may be easily extended to a direct-conversion RF modulator. As a result of the change from IF to RF frequency, the sampling rate and L become larger. In this case, the architecture shown in FIG. 39 may be modified by removing the final double sideband up-conversion mixer 3908 and the image-reject bandpass filter 3906.

C.4.5 Convergence of Estimations

Convergence at the receiver may be ensured in a closed-loop fashion as shown in FIG. 32B whereby the receiver state machine checks the convergence of the receiver compensation factors. If the results have converged, they are stored in memory. The receiver convergence status is sent to the remote transmitter directing it to increase the estimation time by $\Delta t_{inc}(n)$ if convergence is not met or to reset the estimation increment index if convergence is met as shown in FIG. 32A.

Convergence at the receiver may also be done locally for each transmitted message by using the preamble and/or midamble of the transmitted message for estimation of receiver compensation factors through switch configurations discussed earlier for local calibration. Finally, soft convergence may be employed for the receiver on a per packet basis whereby estimated compensation factors are applied to the data portion of the message without regard to convergence. However, estimates are still stored into memory (if available) only after convergence. If converged estimates are available in memory, then the receiver has the option of using the converged estimates rather than the estimate derived from the current message.

Note that since the transmitter convergence is not applicable in this embodiment, in the process illustrated in FIG. 32A the test for transmitter convergence (S3218) and storing the compensation factors in memory (S3220) may be eliminated so that the after receiving the return message (S3216), the process flow proceeds directly to checking for convergence status (S3222). In this case, the convergence status only has to be checked for the receiver and not for both the transmitter and receiver. Also, in FIG. 32B, piggybacking the transmitter estimation on the return message (S3208) may be eliminated.

C.4.6 Application to Local Calibration

The architecture shown in FIG. 39 may easily be applied to local calibration as well but only for the receiver since no compensation is needed for the transmitter.

C.4.7 Initialization

Initialization is not an issue here since the transmitter compensation factors are not required.

C.4.8 Update

According to embodiments of the present invention, the estimation procedure described for calibration with digital IF may be applied to every transmitted message or it may be done with reduced duty cycle once the compensation factors have been determined and stored in memory, if available. Increase in duty cycle to update may be initiated by either a certain amount of change in temperature or time elapsed since the last update as discussed in relation to FIG. 11 and FIG. 15. Update could also be supplemented by local calibration of the receiver as discussed in relation to FIG. 10. Again estimation does not need to be done for the transmitter since the digital IF transmitter provides balanced I-Q signals.

D. Application to Multi-Carrier Transmission

According to embodiments of the present invention, all aspects of the present invention may be applied to multi-carrier transmission, which transmits modulated symbols to multiple sub-carriers during one transmission. Examples of multi-carrier transmission include OFDM and multi-carrier code-division multiple access (MC-CDMA). With multi-carrier transmission, the transmitter I-Q compensation may be further optimized by allowing for compensation at the sub-carrier level.

Figure 41A:
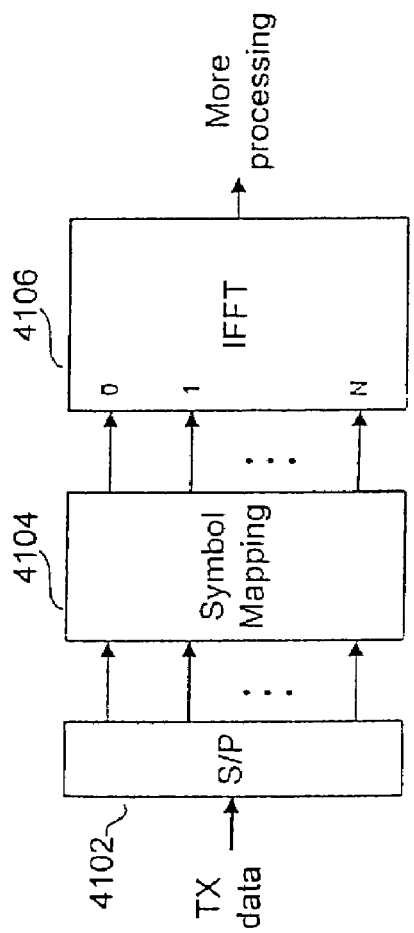
FIG. 41A illustrates a conventional multi-carrier modulation system.

A conventional multi-carrier modulation system is shown in FIG. 41A. It includes a serial-to-parallel (S/P) converter 4102 that demultiplexes the serial data stream onto N sub-channels indexed from 0 to N-1. A symbol mapping block 4104 maps the serial data stream on each of the sub-channels into modulated symbol values. In practice, some of the sub-channels near the band edge of the multi-carrier signal may not be used to provide guard bands so that the amount of transmitted power spilled into the adjacent channels may be reduced. The N sub-channels are then input to an N-point inverse Fast Fourier Transform (IFFT) 4106 to generate the multi-carrier signal.

Figure 41B:
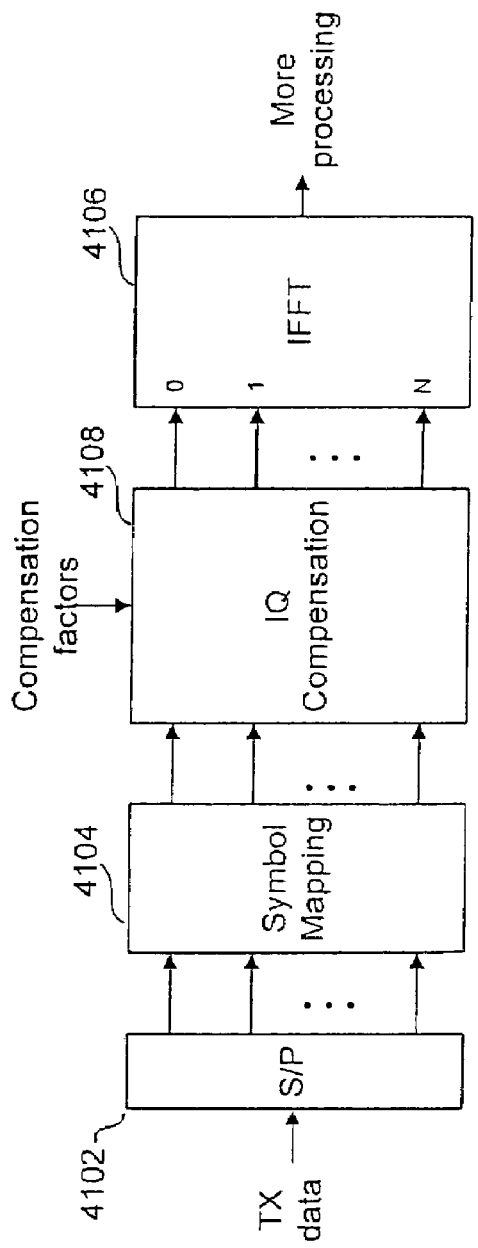
FIG. 41B illustrates a multi-carrier modulation system, according to embodiments of the present invention.

In the present invention, an I-Q compensation block 4108 is inserted between the symbol mapping block 4104 and the IFFT 4106 as shown in FIG. 41B. The I-Q compensation block 4108 compensates for each of the sub-channels with compensation factors estimated as before using test signals. For highest accuracy, a test tone should be used for each sub-carrier to estimate its compensation factor. In alternative embodiments, a set of test tones may be applied that samples the N sub-channels sufficiently so that the estimated compensation factors for a particular test tone may be applied to neighboring sub-channels via a number of methods, including, but not limited to, interpolation, averaging, or direct application. In interpolation, sub-channels situated between two sub-channels with estimated compensation factors may derive their compensation factors by interpolating between the two estimated results. In averaging, sub-channels situated between two sub-channels with estimated compensation factors may derive their compensation factors by using the average of the two estimated results. In direct application, estimated factors derived from a particular tone are simply applied to a set of neighboring sub-channels. To prevent conflicts, the sets of neighboring channels should be non-overlapping for different test tones.

An example of test tones is a set of tones that uniformly samples the N sub-channels with certain frequency spacing R. Assuming that both negative and positive frequencies are being used for transmission and that N is 16 and R is 3, then one possible set of test tones is $e^{-j8f_{sc}t}$, $e^{-j5f_{sc}t}$, $e^{-j2f_{sc}t}$, $e^{jf_{sc}t}$, and $e^{j4f_{sc}t}$, and $e^{j7f_{sc}t}$, where $f_{sc}$ is the sub-carrier spacing. The test signals could either be sent sequentially and estimated one after the other, or a group may be transmitted simultaneously and estimated using a multi-tone estimator as shown in FIG. 18.

F. Memory

According to embodiments of the present invention, the compensation memory may be implemented by methods well known in the art, including but not limited to registers, dynamic random access memory (DRAM), static random access memory (SRAM), and flash memory. According to other embodiments, in implementations where memory is not available, the compensation factor estimator block outputs shown in FIG. 7, FIG. 29, FIG. 33, FIG. 37 and FIG. 39 may be directly input into the I-Q compensation blocks.

G. Performance

Simulation results show that the present invention provides significant performance enhancement to a transceiver system. In particular, the performance here is measured in terms of error vector magnitude (EVM), which represents the mean of the square of the error in the received symbols. For a given transmission waveform (e.g. modulation and error correction), the receiver requires a certain EVM to meet the specified error rate performance required by the system. For high-order modulation schemes, EVM must be small to accommodate for the increase in constellation size. For instance, 64-QAM would require an EVM of a few percent.

Another metric measured in the simulations is the image-reject ratio which is important for certain RF architectures, such as the low-IF receiver. In a low-IF architecture, the adjacent channels may become images to the receiver. In this case, the images may have large signal power compared to the desired signal. Therefore, the image-rejection ratio together with external filtering must be high enough to suppress the strong adjacent channels. Typically, an image-rejection ratio of greater than 60 dB is desired though typically less than 40 dB is achievable.

Figure 42:
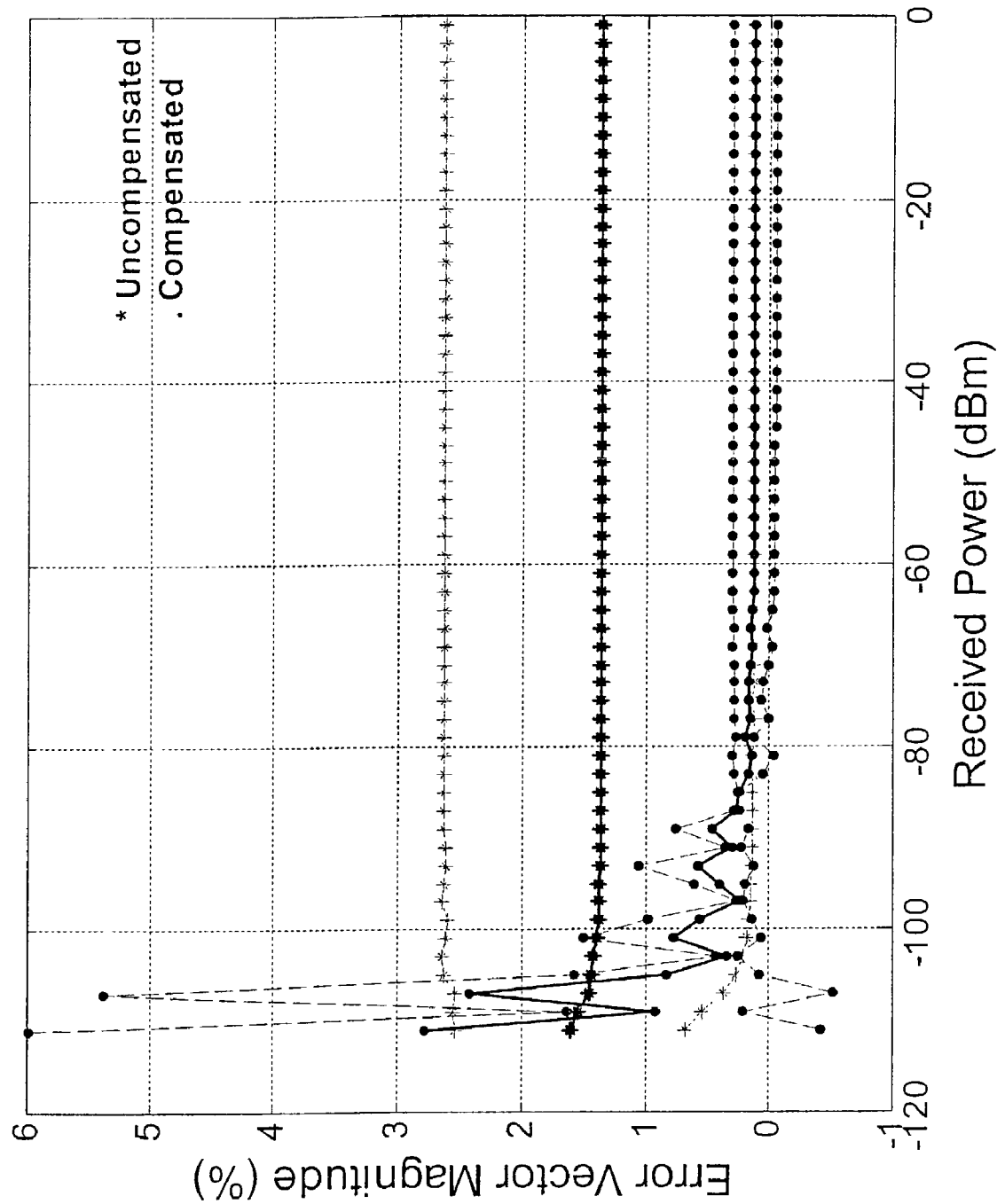
FIG. 42 illustrates a plot of error vector magnitude versus received power for a gain imbalance of 1 percent and a phase imbalance of 1 degree.

In the simulation, the receiver is assumed to have a noise figure of 10 dB and the imbalance estimators are assumed to have a noise bandwidth of 200 kHz, achieved using filtering at the input of the estimator. Also, the solid curve indicates the mean and the two dashed curves indicate the standard deviation around the mean. The uncompensated curves are marked by "*" and the compensated curves are marked by dots. As shown in FIG. 42 for a gain mismatch of 1% and gain mismatch of 1 degree, the EVM may be reduced significantly to a fraction of a percent with the present invention whereas the uncompensated is at least an order of magnitude higher. The uncompensated case also exhibits a larger variance which is not desirable since it increases the required design margin.

For input received power lower than −105 dBm, noise begins to dominate and causes the EVM to increase. This receive power is well within typical operation ranges of most radio systems, thus making this method suitable for remote calibration. When applied to local calibration, the received power is much greater than −105 dBm and therefore tighter error variance may be achieved.

Figure 43:
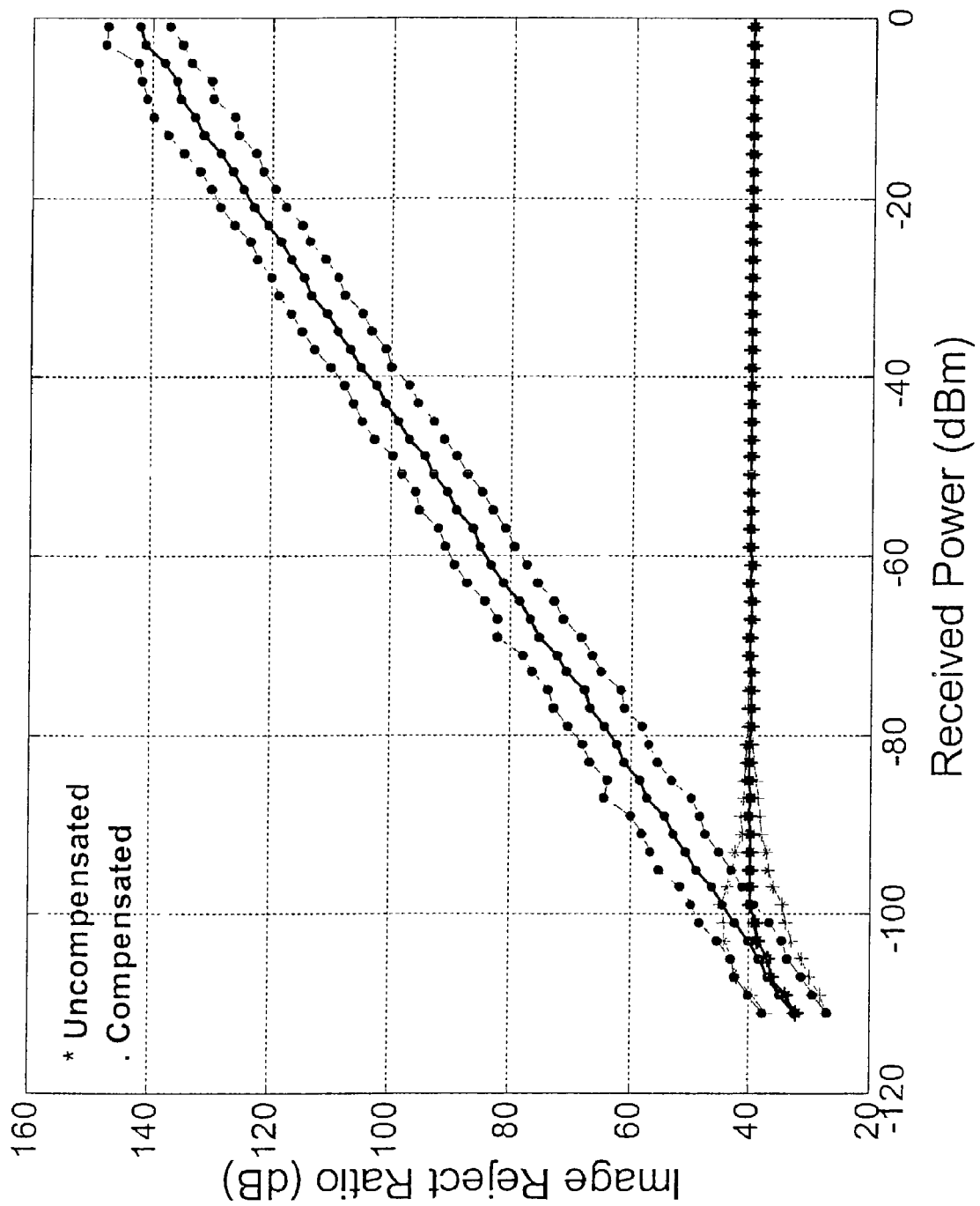
FIG. 43 illustrates a plot of image rejection ratio versus received power for a gain imbalance of 1 percent and a phase imbalance of 1 degree.

In FIG. 43, the image rejection ratio (IRR) is plotted versus the received power. It can be seen that high IRR greater than 100 dB could be achieved for high received power whereas for the uncompensated case only 40 dB is achieved. At lower power levels (<−100 dBm), the IRR becomes similar for both with and without compensation. Thus, for remote calibration, the noise bandwidth should be tightened by narrowing the bandwidth of the filters in the pre-processor shown in FIG. 20. For some applications such as wireless LAN, where the sensitivity is on the order of −90 dBm or less, 10-20 dB improvement may still be achieved with current settings.

Figure 44:
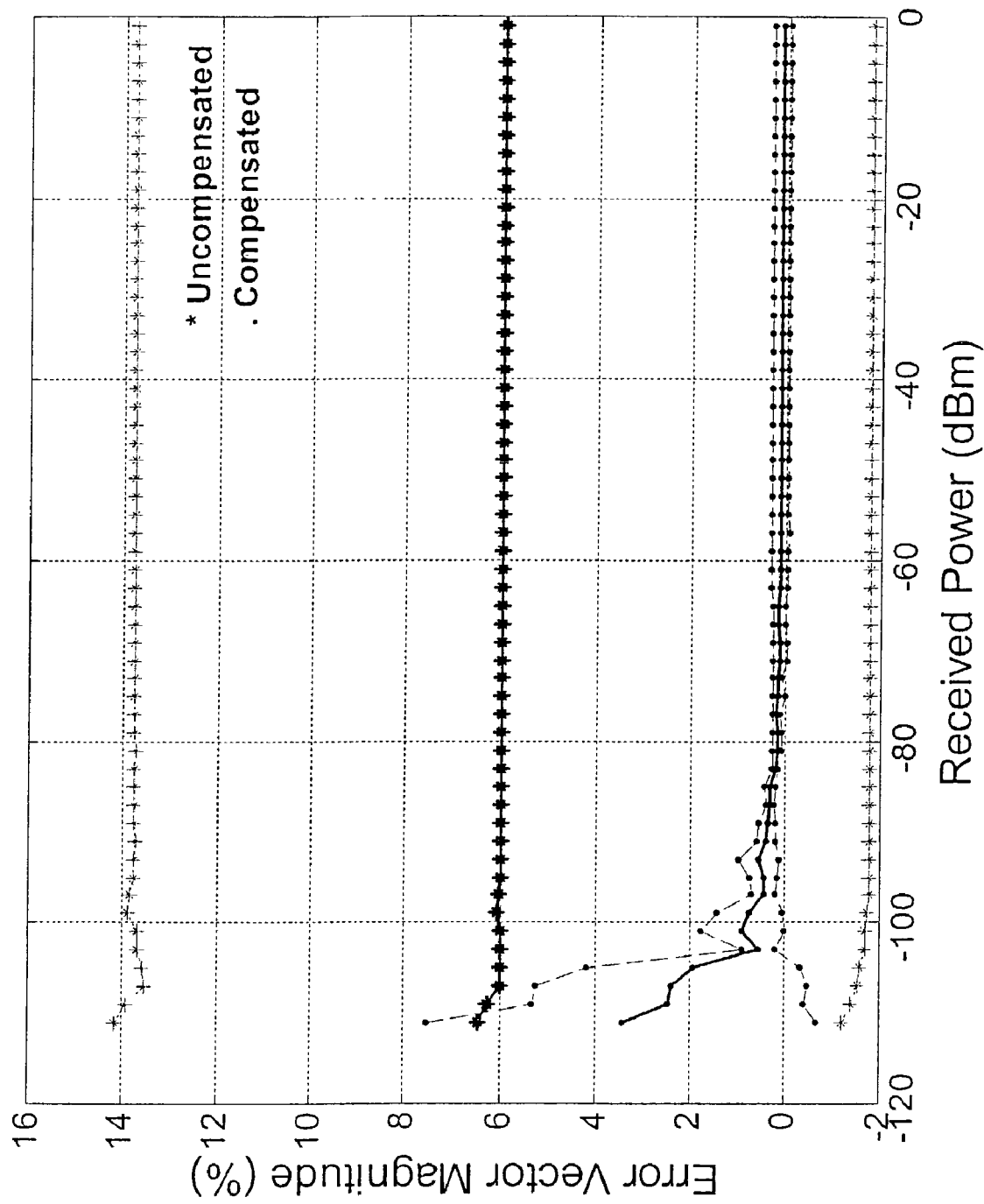
FIG. 44 illustrates a plot of error vector magnitude versus received power for a gain mismatch of 5 percent and a phase mismatch of 5 degrees.
Figure 45:
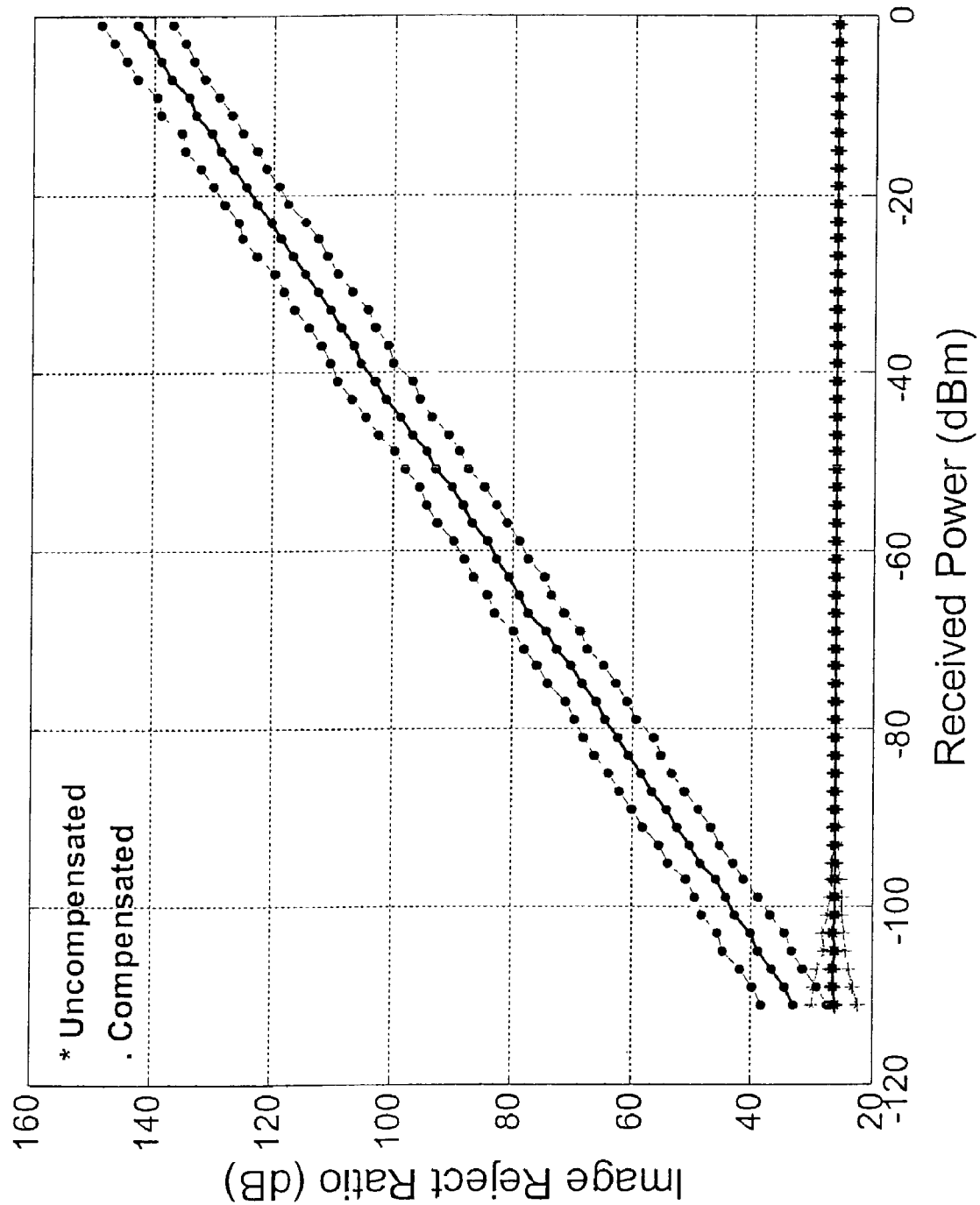
FIG. 45 illustrates a plot of image rejection ratio versus received power for a gain mismatch of 5 percent and a phase mismatch of 5 degrees.

FIG. 44 and FIG. 45 show EVM and IRR for a gain mismatch of 5% and a phase mismatch of 5 degree. While the uncompensated case shows significant degradation in both the EVM and IRR, the compensated case shows similar performance as in the case with smaller gain and phase mismatches, indicating the robustness of the present invention.

Figure 46:
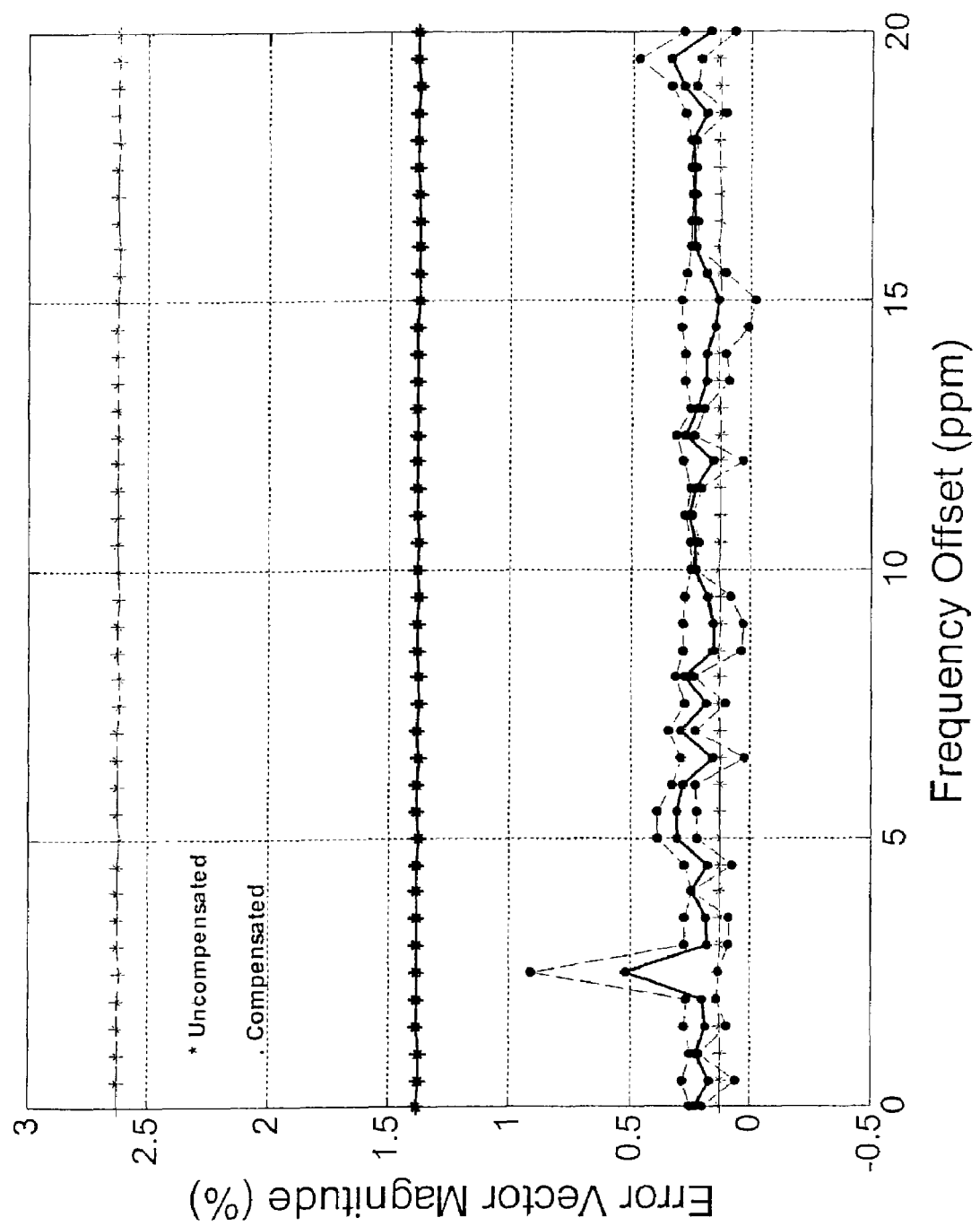
FIG. 46 illustrates a plot of error vector magnitude versus frequency offset for a gain mismatch of 1 percent and a phase mismatch of 1 degree.
Figure 47:
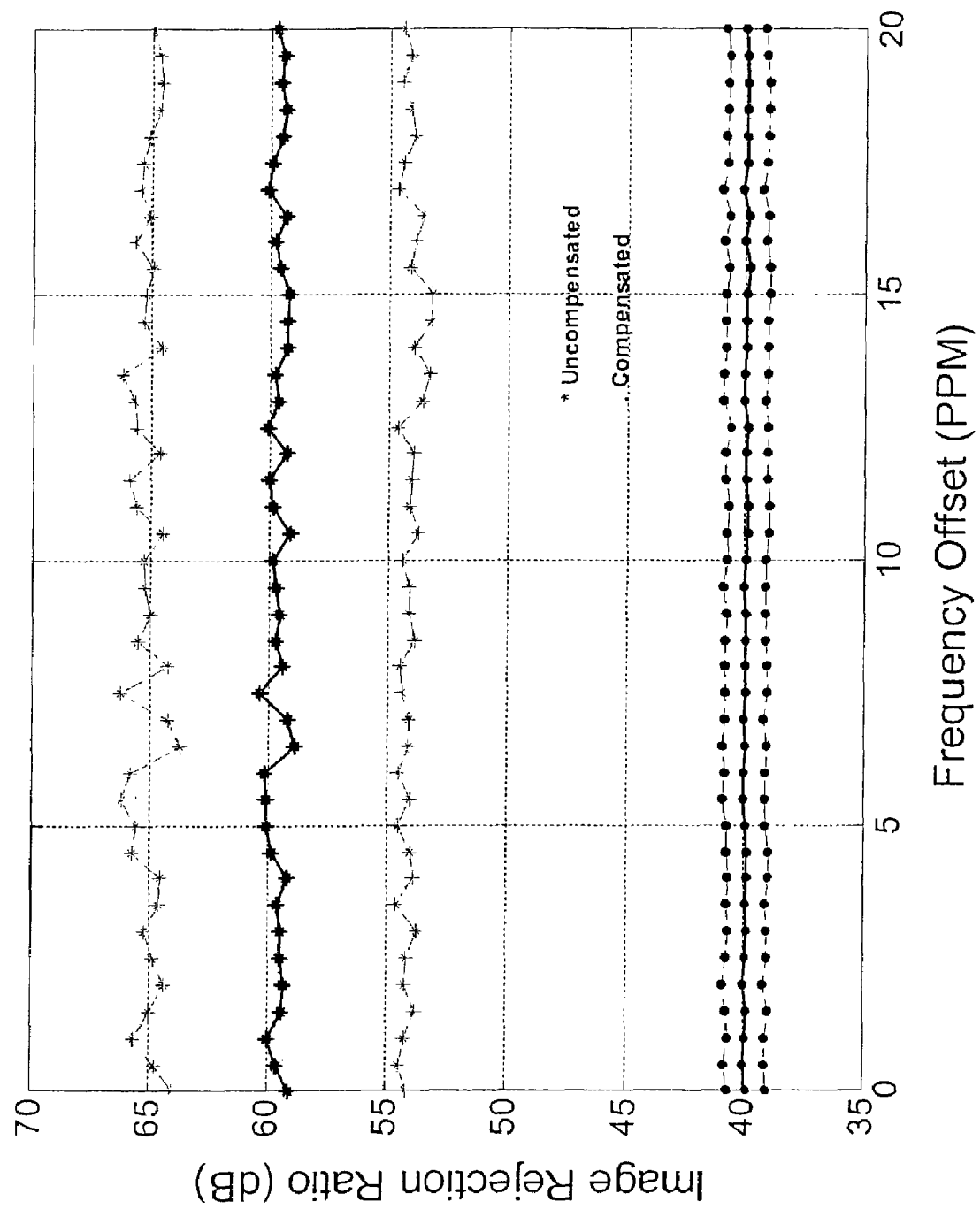
FIG. 47 illustrates a plot of image rejection ratio versus frequency offset for a gain mismatch of 1 percent and a phase mismatch of 1 degree.

Finally, for remote calibration, the compensation must be insensitive to frequency offsets. FIG. 46 and FIG. 47 show that the performance is indeed insensitive to frequency offsets between the transmitter and receiver, measured in parts per million (ppm) of the carrier frequency. In this case, the carrier frequency is set at 5.25 GHz.

Thus, embodiments of the present invention for providing compensation for I-Q imbalance in digital transceivers have been described. Embodiments of the present invention may be applied to multi-carrier transmission systems, such as OFDM, to compensate for the images prior to the Fast Fourier Transform (FFT) so that inter-channel interference (ICI) may be avoided. Embodiments of the present invention may also be applied to OFDM at the transmitter whereby outputs of each sub-channel may be compensated by compensation factors determined during calibration over in-band test tones centered on the sub-carrier frequencies. Phase and amplitude imbalance at sub-carriers not covered by the test tones may be determined via interpolation. Embodiments of the present invention may be employed with a variety of adaptation approaches, such as least mean squared (LMS) algorithms in time and frequency domains, or interference cancellation schemes, by providing the initialization vectors to decrease the convergence time and to increase the accuracy of the adaptation and interference cancellation loops.

Furthermore, embodiments of the present invention require low complexity with no need for complex quadrature direct-digital frequency synthesizer (DDFS) and quadrature mixers. In addition, embodiments of the present invention employing the switch configuration shown in FIG. 8A do not require additional switches for calibration when used in time-division duplex (TDD) mode. However, other embodiments may require a modified switch configuration, including but not limited to those shown in FIGS. 8B-F.

Embodiments of the present invention are insensitive to frequency offset and phase offset and therefore make it possible to correct for IQ imbalance prior to automatic frequency control (AFC) and phase recovery. Because IQ imbalance adversely affects the degree in which the frequency and phase may be corrected, by compensating for the IQ imbalance the accuracy of the AFC and phase recovery loop are improved so that the overall system performance is enhanced. Moreover, being insensitive to frequency and phase offset, IQ compensation may occur over-the-air between two physically separate radio units.

Furthermore, according to embodiments of the present invention, compensation of IQ imbalance at the receiver is independent of the amount of transmitter imbalance. Therefore, the receiver imbalance may be compensated prior to compensating the transmitter imbalance. This allows for more accurate compensation for the transmitter because distortions due to images have already been reduced.

It is to be understood that even though numerous characteristics and advantages of various embodiments of the present invention have been set forth in the foregoing description, together with details of the structure and function of various embodiments of the invention, this disclosure is illustrative only. Changes may be made in detail, especially matters of structure and management of parts within the principles of the present invention to the full extent indicated by the broad general meaning of the terms in which the appended claims are expressed.

What is claimed is:

1. A radio transceiver, comprising:
   at least one antenna;
   a receiver section having a quadrature demodulator for receiving various signals and converting the various signals into in-phase and quadrature phase signals;
   a transmitter section for transmitting at least one known signal to an input of the quadrature demodulator for conversion by the quadrature demodulator;
   a switching unit configurable for providing an amount of isolation between an output port of the transmitter section and an input port of the receiver section such that when the at least one known signal is nresent at the outout port at a first power level, the at least one known signal is also present at the input port at a second power level lower than the first power level and is converted by the quadrature demodulator; and
   at least one receiver compensation factor estimation unit coupled to an output of the quadrature demodulator for estimating, after conversion of the at least one known signal into in-phase and quadrature phase signals, at least one receiver compensation factor for compensating the receiver section for an imbalance in subsequently received in-phase and quadrature phase signals, the at least one receiver compensation factor estimated based upon a mean value of the subsequently received in-phase and quadrature phase signals;

wherein the transmitter section comprises a transmitter compensation factor estimation unit coupled to the output of the at least one receiver compensation factor estimation unit for determining at least one transmitter compensation factor for compensating the transmitter for an imbalance in transmitted in-phase and quadrature phase signals; and wherein the transmitter section further comprises an inverse Fast Fourier Transform (IFFT) unit for generating a multi-carrier signal and wherein the transmitter compensation factor estimation unit estimates, after conversion of the multi-carrier signal into in-phase and quadrature phase signals, at least one transmitter compensation factor for compensating the transmitter for an imbalance in transmitted in-phase and quadrature phase signals.

2. The radio transceiver recited in claim 1, wherein the receiver section further comprises a receiver I-Q compensation unit coupled to the at least one receiver compensation factor estimation unit for applying the at least one receiver compensation factor to subsequent in-phase and quadrature phase signals.

3. The radio transceiver recited in claim 2, wherein the receiver section further comprises a receiver memory coupled to the at least one receiver compensation factor estimation unit and the receiver I-Q compensation unit for storing the at least one receiver compensation factor and for providing the at least one receiver compensation factor to the receiver I-Q compensation unit.

4. The radio transceiver recited in claim 2, wherein the receiver I-Q compensation unit determines the receiver compensation factors using $\tan\phi_r$ and $(\gamma_r \cos\phi_r)^{-1}$, where $\gamma_r$ is a value of amplitude imbalance and $\phi_r$ is a value of phase imbalance.

5. The radio transceiver recited in claim 2, wherein the receiver I-Q compensation unit determines the receiver compensation factors using $\gamma_r \sin\phi_r$ and $(\gamma_r \cos\phi_r)^{-1}$, where $\gamma_r$ is a value of amplitude imbalance and $\phi_r$ is a value of phase imbalance.

6. The radio transceiver recited in claim 2, wherein the receiver section further comprises:
   a low pass filter having an input coupled to the output of the quadrature demodulator;
   a receiver variable gain amplifier having an input coupled to an output of the low pass filter; and
   an analog-to-digital converter having an input coupled to an output of the receiver variable gain amplifier and an output coupled to inputs of the at least one receiver compensation factor estimation unit and the receiver I-Q compensation unit.

7. The radio transceiver recited in claim 2, wherein the receiver section further comprises:
   a receive modem processor for receiving and processing an output of the receiver I-Q compensation unit; and
   a first serial/parallel converter for receiving and converting an output of the receive modem processor.

8. The radio transceiver recited in claim 1, wherein the imbalance is at least one of a gain imbalance and a phase imbalance.

9. The radio transceiver recited in claim 1, wherein the at least one compensation factor includes at least one of a gain compensation factor and a phase compensation factor.

10. The radio transceiver recited in claim 1, wherein the at least one receiver compensation factor estimation unit estimates an amplitude imbalance ($\gamma_r$) according to the equation $$\gamma_r \approx \frac{1 - E_{R1}}{1 + E_{R1}},$$

and derivatives thereof, where $$E_{R1} = \frac{1 - \gamma_r^2}{1 + 2\gamma_r \cos\phi_r + \gamma_r^2}.$$

11. The radio transceiver recited in claim 10, wherein the at least one receiver compensation factor estimation unit estimates a phase imbalance ($\phi_r$) according to the equation $$\phi_r \approx -E_{I1}\frac{(1 + \gamma_r)^2}{2\gamma_r},$$

and derivatives thereof, where $$E_{I1} = \frac{-2\gamma_r \sin\phi_r}{1 + 2\gamma_r \cos\phi_r + \gamma_r^2}.$$

12. The radio transceiver recited in claim 1, wherein the at least one receiver compensation factor estimation unit estimates an amplitude imbalance ($\gamma_r$) according to the equation $$\gamma_r \approx \sqrt{\frac{1 - E_{R2}}{1 + E_{R2}}},$$

and derivatives thereof, where $$E_{R2} = \frac{1 - \gamma_r^2}{1 + \gamma_r^2}.$$

13. The radio transceiver recited in claim 12, wherein the at least one receiver compensation factor estimation unit estimates a phase imbalance ($\phi_r$) according to the equation $$\phi_r \approx -E_{I2}\frac{1 + \gamma_r^2}{2\gamma_r},$$

and derivatives thereof, where $$E_{I2} = \frac{-2\gamma_r \sin\phi_r}{1 + \gamma_r^2}.$$

14. The radio transceiver recited in claim 1, further comprising a pre-processor coupled to the at least one receiver compensation factor estimation unit for at least one of removing DC offsets and reducing noise.

15. The radio transceiver recited in claim 1, further comprising a transceiver controller for controlling the transceiver such that during a local calibration mode the switching unit is configured to provide the amount of isolation.

16. The radio transceiver recited in claim 15, wherein the receiver compensation factor estimation unit estimates a plurality of receiver compensation factors and wherein the transceiver controller determines if the plurality of compensation factors have converged to within a given tolerance.

17. The radio transceiver recited in claim 1, wherein the switching unit comprises a first switch for coupling the output port to the at least one antenna and a second switch for coupling the input port to the at least one antenna.

18. The radio transceiver recited in claim 17, wherein the switching unit further comprises a third switch for coupling the at least one antenna to ground.

19. The radio transceiver recited in claim 18, wherein the switching unit further comprises a fourth switch for coupling the output port to a pre-defined impedance.

20. The radio transceiver recited in claim 19, wherein the pre-defined impedance is 50 ohms.

21. The radio transceiver recited in claim 18, wherein the switching unit further comprises a fourth switch for directly coupling the output port to the input port.

22. The radio transceiver recited in claim 21, wherein the switching unit further comprises a fifth switch for coupling the output port to a pre-defined impedance.

23. The radio transceiver recited in claim 1, wherein the radio transceiver comprises:
   a plurality of antennas and wherein the switching unit comprises a first plurality of switches for coupling the plurality of antennas to at least one of the input port and the output port; and
   a second plurality of switches for coupling the plurality of antennas to ground.

24. The radio transceiver recited in claim 1, wherein the switching unit comprises at least one of a micro-electromechanical system (MEMS), a field effect transistor (FET), bipolar junction transistors (BJT's), hetero junction transistors (HBT's), GaAs transistors, and a pin-diode.

25. The radio transceiver recited in claim 1, wherein the amount of isolation is approximately 20-40 dB.

26. The radio transceiver recited in claim 1, wherein the at least one known signal is at least one of a single complex tone $c_1 e^{jw_1 t}$ and a single complex tone $c_1 e^{-jw_1 t}$, where ($c_1$) is a constant.

27. The radio transceiver recited in claim 1, wherein the radio transceiver comprises a plurality of receiver compensation factor estimation units.

28. The radio transceiver recited in claim 27, wherein the at least one known signal is at least one of a plurality of complex tones $\{c_k e^{jw_j t}\}$ and a plurality of complex tones $\{c_j e^{-jw_j 1}\}$, where $c_k$ and $c_j$ are constants, and j and k index at least one of different frequencies and different constants.

29. The radio transceiver recited in claim 1, wherein the receiver section further comprises a low noise amplifier for amplifying the various received signals, the low noise amplifier having an input connectable to the switching unit and an output coupled to the input of the quadrature demodulator.

30. The radio transceiver recited in claim 1, wherein the at least one transmitter compensation factor estimation unit estimates an amplitude imbalance ($\gamma_t$) according to the equation $$\gamma_t \approx \sqrt{\frac{x}{y}},$$

and derivatives thereof, where $x=c\gamma_t^2$ and $y=c$, where c is a constant.

31. The radio transceiver recited in claim 1, wherein the at least one transmitter compensation factor estimation unit estimates a phase imbalance ($\phi_t$) according to the equation $$\phi_t \approx \left(1 - \frac{z}{y} + \frac{x}{y}\right)\frac{1}{2\gamma_t},$$

and derivatives thereof, where $x=c\gamma_t^2$, $y=c$, and $z=c\overline{(1+\gamma_t^2-2\gamma_t \sin\phi)}$, where c is a constant.

32. The radio transceiver recited in claim 1, wherein the transmitter section further comprises a transmitter I-Q compensation unit for applying the at least one transmitter compensation factor to the transmitted in-phase and quadrature phase signals.

33. The radio transceiver recited in claim 32, wherein the transmitter I-Q compensation unit determines the at least one transmitter compensation factor using $\tan\phi_t$ and $(\gamma_t \cos\phi_t)^{-1}$, where $\gamma_t$ is a value of amplitude imbalance and $\phi_t$, is a value of phase imbalance.

34. The radio transceiver recited in claim 32, wherein the transmitter I-Q compensation unit determines the at least one transmitter compensation factor using $\gamma_t \sin\phi_t$ and $(\gamma_t \cos\phi_t)^{-1}$, where $\gamma_t$ is a value of amplitude imbalance and $\phi_t$, is a value of phase imbalance.

35. The radio transceiver recited in claim 32, wherein the transmitter section further comprises a transmitter memory coupled to the transmitter compensation factor estimation unit and the transmitter I-Q compensation unit for storing the at least one transmitter compensation factor and for providing the at least one transmitter compensation factor to the transmitter I-Q compensation unit.

36. The radio transceiver recited in claim 32, wherein the transmitter section further comprises:
   a second serial/parallel converter for converting transmission data; and
   a symbol mapping unit having an input coupled to an output of the second serial/parallel converter and an output coupled to an input of the transmitter I-Q compensation unit for receiving and mapping the converted transmission data to the transmitted in-phase and quadrature phase signals and providing the transmitted in-phase and quadrature phase signals to the input of the transmitter I-Q compensation unit.

37. The radio transceiver recited in claim 32, wherein the transmitter section further comprises a transmit modem processor for receiving and processing an output of the transmitter I-Q compensation unit.

38. The radio transceiver recited in claim 32, wherein the transmitter section further comprises:
   a digital-to-analog converter having an input coupled to an output of the transmitter I-Q compensation unit;
   a filter having an input coupled to an output of the digital-to-analog converter;
   a transmitter variable gain amplifier having an input coupled to an output of the filter; and
   a quadrature up-converter having an input coupled to an output of the transmitter variable gain amplifier.

39. The radio transceiver recited in claim 38, wherein the transmitter section further comprises a power amplifier having an input coupled to an output of the quadrature up-converter and an output coupled to the switching unit.

40. The radio transceiver recited in claim 39, further comprising a transceiver controller for controlling the transmit modem processor to generate the at least one known signal and for controlling the transmitter section to transmit the at least one known signal to the output port of the transmitter section at a power level suitable for an input range of the receiver section.

41. The radio transceiver recited in claim 40, wherein the transceiver controller controls the transmitter section to transmit the at least one known signal to the output port of the transmitter section at a power level suitable for an input range of the receiver section by setting gains of the transmitter variable gain amplifier and the power amplifier.

42. The radio transceiver recited in claim 40, wherein the receiver section includes a low noise amplifier and a variable gain amplifier and wherein the transceiver controller adjusts gain of at least one of the low noise amplifier and the variable gain amplifier during reception of the at least one known signal.

43. The radio transceiver recited in claim 40, wherein the transceiver controller sets the at least one known signal to a specified amplitude value generated digitally in the transmit modem processor.

44. The radio transceiver recited in claim 41, wherein a determination of gain settings is performed using at least one of an existing power control loop in the transmitter and an existing AGC control loop in the receiver.

45. The radio transceiver recited in claim 41, wherein a determination of gain settings is performed using a look up table having entries determined apriori based on transceiver gain and power specifications.

46. The radio transceiver recited in claim 39, wherein the switching unit comprises a duplexor for coupling the at least one antenna to the output of the power amplifier for a first frequency band and to the input of the low noise amplifier for a second frequency band.

47. The radio transceiver recited in claim 46, wherein the switching unit further comprises a first switch for coupling the output of the quadrature up-converter to the input of the power amplifier.

48. The radio transceiver recited in claim 47, further comprising a second switch for bypassing the duplexor by directly coupling the output of the quadrature up-converter to the input of the low noise amplifier.

49. The radio transceiver recited in claim 48, further comprising a third switch for coupling the input of the power amplifier to ground.

50. The radio transceiver recited in claim 1, wherein the receiver section comprises a direct conversion receiver.

51. The radio transceiver recited in claim 1, wherein the receiver section comprises a wideband intermediate frequency receiver.

52. The radio transceiver recited in claim 1, wherein the receiver section comprises a superheterodyne receiver.

53. The radio transceiver recited in claim 1, wherein the receiver section comprises a low intermediate frequency receiver.

54. In a communication system comprising at least one antenna. a transmitter and a receiver having a quadrature demodulator for receiving various signals and converting the various signals into in-phase and quadrature phase signals, an output of the transmitter connectable to an input of the receiver by a controllable switching unit, a method for compensating for I-Q imbalance in the in-phase and quadrature phase signals, the method comprising:
providing at least one compensation factor estimation unit for estimating at least one compensation factor;
controlling the switching unit to provide an amount of isolation between an outout of the transmitter and an input of the receiver;
controlling the transmitter to generate at least one known signal at the output of the transmitter;
setting a gain of the communication system such that the at least one known signal is coupled from the output of the transmitter to the input of the receiver at a power level that is within an operating range of the input;
converting the at least one known signal into in-phase and quadrature phase signals at the quadrature demodulator;
estimating at least one compensation factor at the at least one compensation factor estimation unit based on an imbalance in the at least one known signal, the at least one compensation factor estimated based upon a mean value of the at least one known signal; and
applying the at least one compensation factor to subsequently received signals, transmitted signals or both received and transmitted signals; and
storing the at least one compensation factor in a memory;
wherein setting a gain of the communication system comprises setting an initial gain of the communication system and wherein the method further comprises:
before controlling the transmitter to generate the at least one known signal, setting a value for at least one of an initial temperature of the communication system and an initial frequency of the at least one known signal;
after estimating the at least one compensation factor, storing the at least one compensation factor in the memory;
after storing the at least one compensation factor in the memory, performing at least one of setting a new gain value of the communication system, setting a new temperature value and setting a new frequency value; and
estimating at least one additional compensation factor based on the at least one new value.

55. The method recited in claim 54, further comprising estimating a plurality of additional compensation factors for at least one of a plurality of gain settings of the communication system, a plurality of temperatures of the communication system and a plurality of frequencies of the at least one known signal.

56. The method recited in claim 54, wherein applying the at least one compensation factor to subsequently received signals comprises:
controlling the switching unit to couple the input of the receiver to the at least one antenna;
synchronizing with radio frequency signals received from a remote transmitter;
performing automatic gain control to determine an appropriate receiver gain setting;
retrieving from the memory an appropriate compensation factor for the receiver based on at least one of a current gain setting, a frequency, and a temperature;
converting the received radio frequency signals into in-phase and quadrature phase signals at the quadrature demodulator; and
performing I-Q compensation based on the appropriate compensation factor to compensate for an imbalance in the in-phase and quadrature phase signals resulting from converting the received radio frequency signals.

57. The method recited in claim 56, further comprising performing automatic frequency control, phase recovery, and channel estimation.

58. The method recited in claim 57, wherein at least one of synchronization, automatic gain control, I-Q compensation, automatic frequency control and phase recovery are performed in a separate control channel.

59. The method recited in claim 56, further comprising:
after performing I-Q compensation, again performing automatic gain control;
after again performing automatic gain control, determining if a receiver gain setting has changed; and
if the receiver gain setting has changed, again performing I-Q compensation.

60. The method recited in claim 54, wherein controlling the transmitter to generate at least one known signal at the output of the transmitter comprises:
controlling the switching unit to couple the output of the transmitter to the at least one antenna;
performing power control to determine an appropriate transmitter gain setting;
retrieving from the memory an appropriate compensation factor for the transmitter based on at least one of a current gain setting, a frequency, and a temperature; and
performing I-Q compensation based on the appropriate compensation factor.

61. The method recited in claim 60, further comprising:
after performing I-Q compensation, again performing power control;
after again performing power control, determining if a transmitter gain setting has changed; and
if the transmitter gain setting has changed, again performing I-Q compensation.

62. The method recited in claim 54, wherein the switching unit is controlled to provide an isolation of approximately 20-40 dB between the output of the transmitter and the input of the receiver.

63. The method recited in claim 54, wherein the at least one known signal is at least one of a single complex tone $c^1 e^{jw_1 t}$ and a single complex tone $c_1 e^{-jw_1 t}$, where $c_1$ is a constant.

64. The method recited in claim 54, wherein the at least one compensation factor estimation unit comprises a plurality of compensation factor estimation units.

65. The method recited in claim 54, wherein the at least one known signal is at least one of a plurality of complex tones $\{c_k e^{jw_k t}\}$ and a plurality of complex tones $\{c_j e^{-jw_j t}\}$, where $c_k$ and $c_j$ are constants, and j and k index at least one of different frequencies and different constants.

66. The method recited in claim 54, wherein controlling the transmitter to generate the at least one known signal at the output of the transmitter comprises controlling a transmit modem processor to generate the at least one known signal.

67. The method recited in claim 54, wherein setting a gain of the communication system comprises setting gains of a variable gain amplifier and a power amplifier in the transmitter such that the at least one known signal is coupled from the output of the transmitter to the input of the receiver at a power level that is within an operating range of a low noise amplifier at the input of the receiver.

68. The method recited in claim 67, further comprising adjusting a gain of the low noise amplifier and a variable gain amplifier in the receiver during reception of the at least one known signal.

69. The method recited in claim 54, wherein setting a gain of the communication system comprises setting the at least one known signal to a specified amplitude value generated digitally.

70. The method recited in claim 54, wherein a determination of gain settings is performed using at least one of an existing power control loop in the transmitter and an existing AGC control loop in the receiver.

71. The method recited in claim 54, wherein a determination of gain settings is performed using a look up table having entries determined apriori based on transceiver gain and power specifications.

72. The method recited in claim 54, wherein estimating at least one compensation factor comprises estimating at least one of a gain compensation factor and a phase compensation factor.

73. The method recited in claim 72, wherein the at least one compensation factor estimation unit estimates a receiver gain compensation factor ($\gamma_r$) according to the equation $$\gamma_r \approx \frac{1 - E_{RI}}{1 + E_{RI}},$$

and derivatives thereof, where $$E_{RI} = \frac{1 - \gamma_r^2}{1 + 2\gamma_r \cos\phi_r + \gamma_r^2}.$$

74. The method recited in claim 72, wherein the at least one compensation factor estimation unit estimates a receiver phase compensation factor ($\phi_r$) according to the equation $$\phi_r \approx -E_{II} \frac{(1 + \gamma_r)^2}{2\gamma_r},$$

and derivatives thereof, where $$E_{II} = \frac{-2\gamma_r \sin\phi_r}{1 + 2\gamma_r \cos\phi_r + \gamma_r^2}.$$

75. The method recited in claim 54, wherein the at least one compensation factor estimation unit estimates a transmitter amplitude imbalance ($\gamma_t$) according to the equation $$\gamma_t \approx \sqrt{\frac{x}{y}},$$

and derivatives thereof, where $x=\overline{c\gamma_t^2}$ and $y=c$, where c is a constant.

76. The method recited in claim 54, wherein the at least one compensation factor estimation unit estimates a transmitter phase imbalance ($\phi_t$) according to the equation $$\phi \approx \left(1 - \frac{z}{y} + \frac{x}{y}\right)\frac{1}{2\gamma_t},$$

and derivatives thereof, where $x=\overline{c\gamma_t^2}$, $y=c$, and $z=c(1+\gamma_t^2-2\gamma_t\sin\phi_t)$, where c is a constant.

77. The method recited in claim 54, wherein the receiver compensation factor estimation unit estimates a plurality of compensation factors and wherein estimating the at least one compensation factor includes determining if the plurality of compensation factors have converged to within a given tolerance.

78. The method recited in claim 77, wherein determining if the plurality of compensation factors have converged to within a given tolerance comprises determining if a predetermined time has elapsed.

79. The method recited in claim 54, wherein the at least one compensation factor estimation unit estimates a receiver gain compensation factor ($\gamma_r$) according to the equation $$\gamma_r \approx \sqrt{\frac{1 - E_{R2}}{1 + E_{R2}}},$$

and derivatives thereof, where $$E_{R2} = \frac{1 - \gamma_r^2}{1 + \gamma_r^2}.$$

80. The method recited in claim 79, wherein the at least one compensation factor estimation unit estimates a receiver phase compensation factor ($\phi_r$) according to the equation $$\phi_r \approx -E_{I2} \frac{1 + \gamma_r^2}{2\gamma_r},$$

and derivatives thereof, where $$E_{I2} = \frac{-2\gamma_r \sin \phi_r}{1 + \gamma_r^2}.$$

81. In a communication system comprising at least a first transmitter and a first receiver having a quadrature demodulator for receiving various signals and converting the various signals into in-phase and quadrature phase signals, a method for compensating for I-Q imbalance in the in-phase and quadrature phase signals, the method comprising:
transmitting from the first transmitter to the first receiver a data packet having at least one known signal for conversion by the quadrature demodulator;
estimating, after conversion by the quadrature demodulator of the at least one known signal into in-phase and quadrature phase signals, at least one compensation factor for compensation for an imbalance in the in-phase and quadrature phase signals, the at least one compensation factor estimated based upon a mean value of the subsequently received in-phase and quadrature phase signals; and
storing the data portion in a buffer;
wherein the data packet further comprises at least one of a data portion, a header portion and a cyclic redundancy check portion; and
wherein the at least one known signal is included in at least one of the midamble portion and the postamble portion such that the data portion is first stored in the buffer before estimation of the at least one compensation factor.

82. The method recited in claim 81, wherein after estimation of the at least one compensation factor, the at least one compensation factor is applied to the data portion.

83. The method recited in claim 81, wherein the at least one compensation factor is used to compensate for an imbalance in in-phase and quadrature phase signals in at least one of the first receiver and the first transmitter.

84. The method recited in claim 81, wherein the at least one compensation factor estimation unit estimates a receiver gain compensation factor ($\gamma_r$) according to the equation $$\gamma_r \approx \sqrt{\frac{1 - E_{R2}}{1 + E_{R2}}},$$

and derivatives thereof, where $$E_{R2} = \frac{1 - \gamma_r^2}{1 + \gamma_r^2}.$$

85. The method recited in claim 81, wherein the at least one compensation factor estimation unit estimates a receiver phase compensation factor ($\phi_r$) according to the equation $$\phi_r \approx -E_{I2} \frac{1 + \gamma_r^2}{2\gamma_r},$$

and derivatives thereof, where $$E_{I2} = \frac{-2\gamma_r \sin \phi_r}{1 + \gamma_r^2}.$$

86. In a communication system comprising at least a first transmitter and a first receiver having a quadrature demodulator for receiving various signals and converting the various signals into in-phase and quadrature phase signals, a method for compensating for I-Q imbalance in the in-phase and quadrature phase signals, the method comprising:
transmitting from the first transmitter to the first receiver a data packet having at least one known signal for conversion by the quadrature demodulator; and
estimating, after conversion by the quadrature demodulator of the at least one known signal into in-phase and quadrature phase signals, at least one compensation factor for compensating for an imbalance in the in-phase and quadrature phase signals, the at least one compensation factor estimated based upon a mean value of the subsequently received in-phase and quadrature phase signals;
wherein the communication system further comprises a second transmitter located locally with the first receiver and wherein the method further comprises using the at least one compensation factor to compensate for an imbalance in in-phase and quadrature phase signals in the second transmitter.

87. The method recited in claim 86, wherein the data packet further includes at least one of a preamble portion, a midamble portion and a postamble portion for including the at least one known signal.

88. The method recited in claim 86, wherein the first transmitter is located remotely from the first receiver.

89. The method recited in claim 88, wherein the at least one compensation factor is used to compensate for an imbalance in in-phase and quadrature phase signals in at least one of the first receiver and the first transmitter.

90. The method recited in claim 86, wherein the at least one compensation factor is used to compensate for an imbalance in in-phase and quadrature phase signals in at least one of the first receiver and the first transmitter.

91. The method recited in claim 88, wherein the at least one compensation factor estimation unit estimates a receiver gain compensation factor ($\gamma_r$) according to the equation $$\gamma_r \approx \sqrt{\frac{1-E_{R2}}{1+E_{R2}}},$$

and derivatives thereof, where $$E_{R2} = \frac{1-\gamma_r^2}{1+\gamma_r^2}.$$

92. The method recited in claim 88, wherein the at least one compensation factor estimation unit estimates a receiver phase compensation factor ($\phi_r$) according to the equation $$\phi_r \approx -E_{I2}\frac{1+\gamma_r^2}{2\gamma_r},$$

and derivatives thereof, where $$E_{I2} = \frac{-2\gamma_r \sin \phi_r}{1+\gamma_r^2}.$$

93. The method recited in claim 86, further comprising storing the at least one compensation factor in memory.

94. The method recited in claim 93, wherein the at least one compensation factor estimation unit estimates a receiver gain compensation factor ($\gamma_r$) according to the equation $$\gamma_r \approx \sqrt{\frac{1-E_{R2}}{1+E_{R2}}},$$

and derivatives thereof, where $$E_{R2} = \frac{1-\gamma_r^2}{1+\gamma_r^2}.$$

95. The method recited in claim 93, wherein the at least one compensation factor estimation unit estimates a receiver phase compensation factor ($\phi_r$) according to the equation $$\phi_r \approx -E_{I2}\frac{1+\gamma_r^2}{2\gamma_r},$$

and derivatives thereof, where $$E_{I2} = \frac{-2\gamma_r \sin\phi_r}{1+\gamma_r^2}.$$

96. The method recited in claim 93, wherein the at least one compensation factor is used to compensate for an imbalance in in-phase and quadrature phase signals in at least one of the first receiver and the first transmitter.

97. The method recited in claim 86, wherein the data packet further comprises at least one of a data portion, a header portion and a cyclic redundancy check portion.

98. The method recited in claim 86, wherein the at least one known signal is included in the preamble portion such that after estimation of the at least one compensation factor, the at least one compensation factor is immediately applied to the data portion.

99. The method recited in claim 86, further comprising storing the data portion in a buffer.

100. The method recited in claim 86, wherein the at least one known signal is further used to perform automatic gain control, automatic frequency control and phase recovery.

101. The method recited in claim 86, wherein the at least one compensation factor estimation unit estimates a receiver gain compensation factor ($\gamma_r$) according to the equation $$\gamma_r \approx \sqrt{\frac{1-E_{R2}}{1+E_{R2}}},$$

and derivatives thereof, where $$E_{R2} = \frac{1-\gamma_r^2}{1+\gamma_r^2}.$$

102. The method recited in claim 86, wherein the at least one compensation factor estimation unit estimates a receiver phase compensation factor ($\phi_r$) according to the equation $$\phi_r \approx -E_{I2}\frac{1+\gamma_r^2}{2\gamma_r},$$

and derivatives thereof, where $$E_{I2} = \frac{-2\gamma_r \sin\phi_r}{1+\gamma_r^2}.$$

103. The method recited in claim 86, wherein the communication system further comprises a second receiver located locally with the first transmitter and wherein the method farther comprises transmitting from the second transmitter to the second receiver a return message including the at least one compensation factor.

104. The method recited in claim 103, wherein the at least one compensation factor is used to compensate for an imbalance in in-phase and quadrature phase signals in the first transmitter.

105. The method recited in claim 103, wherein the at least one compensation factor is used to compensate for an imbalance in in-phase and quadrature phase signals in the second receiver.

* * * * *